US010538150B2

(12) United States Patent
Zichettello et al.

(10) Patent No.: US 10,538,150 B2
(45) Date of Patent: Jan. 21, 2020

(54) FLEXIBLE TONNEAU COVER ASSEMBLY

(71) Applicant: Honda Motor Co., Ltd., Tokyo (JP)

(72) Inventors: Alexander Zichettello, Hilliard, OH (US); Michael T. Binfet, Bellefontaine, OH (US); Douglas R. Kaltenmark, Powell, OH (US); Babuji K. Tamarapoo, Powell, OH (US); Brock J. Stull, Columbus, OH (US); Todd Yoder, Wyandotte, MI (US); Paul Finch, Northville, MI (US)

(73) Assignee: Honda Motor Co., Ltd., Tokyo (JP)

( * ) Notice: Subject to any disclaimer, the term of this patent is extended or adjusted under 35 U.S.C. 154(b) by 92 days.

(21) Appl. No.: 15/936,668

(22) Filed: Mar. 27, 2018

(65) Prior Publication Data
US 2018/0281572 A1  Oct. 4, 2018

Related U.S. Application Data

(60) Provisional application No. 62/478,418, filed on Mar. 29, 2017.

(51) Int. Cl.
*B60J 7/08* (2006.01)
*B60J 7/10* (2006.01)
(Continued)

(52) U.S. Cl.
CPC .............. *B60J 7/085* (2013.01); *B60J 7/068* (2013.01); *B60J 7/104* (2013.01); *B60J 7/12* (2013.01); *B60J 7/198* (2013.01); *B60P 7/04* (2013.01)

(58) Field of Classification Search
CPC ... B60J 7/061; B60J 7/068; B60J 7/085; B60J 7/104; B60J 7/12; B60J 7/1291; B60J 7/198; B60P 7/04
(Continued)

(56) References Cited

U.S. PATENT DOCUMENTS 2,853,758 A  9/1958  Topf
3,707,919 A  1/1973  Adler
(Continued)

FOREIGN PATENT DOCUMENTS

DE  3109542  9/1982
DE  10024645  1/2001
(Continued)

OTHER PUBLICATIONS

"The Downey SST (Sland Side Tonneau)", Downey Products USA, Inc., 2019, http://downeyproductsnortheast.com/order-online/.
(Continued)

*Primary Examiner* — Jason S Daniels
(74) *Attorney, Agent, or Firm* — Rankin, Hill & Clark LLP

(57) ABSTRACT

A flexible tonneau cover assembly is provided that includes a side rail and a rear rail that is removably securable to the side rail. The rear rail is rotatable between a closed position wherein a flexible cover secured thereto is under tension, and an open position wherein the flexible cover is untensioned. Optionally, the assembly includes a securing member that is securable in a fixed position with respect to the side rail and defines a channel, and the rear rail is rotatable between the open position and the closed position when the rear rail is positioned in the channel of the securing member. Optionally, the flexible cover includes a cable operatively connected to the rear rail, and the side rail receives the cable therein when the rear rail is in the closed position to secure the flexible cover to the side rail.

23 Claims, 38 Drawing Sheets

(51) Int. Cl.
  *B60P 7/04*  (2006.01)
  *B60J 7/06*  (2006.01)
  *B60J 7/19*  (2006.01)
  *B60J 7/12*  (2006.01)

(58) Field of Classification Search
  USPC ........................ 296/100.01, 100.18
  See application file for complete search history.

(56) References Cited

U.S. PATENT DOCUMENTS

| | | |
|---|---|---|
| 3,768,540 A | 10/1973 | McSwain |
| 3,812,640 A | 5/1974 | Knott |
| 4,032,186 A | 6/1977 | Pickering et al. |
| 4,036,521 A | 7/1977 | Clenet |
| 4,273,377 A | 6/1981 | Alexander |
| 4,444,427 A | 4/1984 | Martin |
| 4,480,675 A | 11/1984 | Berkemeier |
| 4,542,610 A | 9/1985 | Weimar |
| 4,563,034 A | 1/1986 | Lamb |
| 4,639,033 A | 1/1987 | Wheatley et al. |
| 4,673,208 A | 6/1987 | Tsukamoto |
| 4,757,854 A | 7/1988 | Rippberger |
| 4,792,178 A | 12/1988 | Kokx |
| 4,923,240 A | 5/1990 | Swanson |
| 4,958,875 A | 9/1990 | Zamzow |
| 5,058,652 A | 10/1991 | Wheatley et al. |
| 5,076,338 A | 12/1991 | Schmeichel et al. |
| 5,152,574 A | 10/1992 | Tucker |
| 5,186,514 A | 2/1993 | Ronai |
| 5,224,748 A | 7/1993 | Decker et al. |
| 5,273,382 A | 12/1993 | Yearick |
| 5,324,091 A | 6/1994 | Baker |
| 5,353,826 A | 10/1994 | Davis, Sr. |
| 5,360,250 A | 11/1994 | Wood et al. |
| 5,460,423 A | 10/1995 | Kersting et al. |
| 5,472,256 A | 12/1995 | Tucker |
| 5,480,206 A | 1/1996 | Hathaway et al. |
| 5,487,585 A | 1/1996 | Wheatley |
| 5,531,497 A | 7/1996 | Cheng |
| 5,560,666 A | 10/1996 | Vieira et al. |
| 5,636,893 A | 6/1997 | Wheatley et al. |
| 5,676,415 A | 10/1997 | Ament et al. |
| 5,690,377 A | 11/1997 | Denyer |
| 5,702,147 A | 12/1997 | Essig |
| 5,706,753 A | 1/1998 | Menne et al. |
| 5,758,922 A | 6/1998 | Wheatley |
| 5,788,315 A | 8/1998 | Tucker |
| 5,813,449 A | 9/1998 | Patmore et al. |
| 5,881,793 A | 3/1999 | Righter et al. |
| 5,906,407 A | 5/1999 | Schmeichel |
| 5,921,603 A | 7/1999 | Karrer |
| 5,934,735 A | 8/1999 | Wheatley |
| 5,961,172 A | 10/1999 | Ament et al. |
| 5,984,400 A | 11/1999 | Miller et al. |
| 5,988,472 A | 11/1999 | McPhail et al. |
| 6,024,401 A | 2/2000 | Wheatley et al. |
| 6,053,556 A | 4/2000 | Webb |
| 6,053,558 A | 4/2000 | Weldy et al. |
| 6,086,709 A | 7/2000 | Hills |
| 6,113,176 A | 9/2000 | Bernardo |
| 6,125,908 A | 10/2000 | Ament et al. |
| 6,131,782 A | 10/2000 | De Silva et al. |
| 6,224,139 B1 | 5/2001 | Weyand |
| 6,234,561 B1 | 5/2001 | Huotari |
| 6,257,306 B1 | 7/2001 | Weldy |
| 6,257,647 B1 | 7/2001 | Ninness et al. |
| 6,286,888 B1 | 9/2001 | Essig |
| 6,293,608 B1 | 9/2001 | Dicke et al. |
| 6,309,006 B1 | 10/2001 | Rippberger |
| 6,322,129 B2 | 11/2001 | Huotari |
| 6,422,635 B1 | 7/2002 | Steffens et al. |
| 6,427,500 B1 | 8/2002 | Weinerman et al. |
| 6,454,337 B2 | 9/2002 | Steffens et al. |
| 6,474,654 B1 | 11/2002 | Schmeichel |
| 6,499,791 B2 | 12/2002 | Wheatley |
| 6,520,559 B1 | 2/2003 | Steffens et al. |
| 6,527,278 B1 | 3/2003 | Norris |
| 6,527,330 B1 | 3/2003 | Steffens et al. |
| 6,543,836 B1 | 4/2003 | Wheatley |
| 6,565,141 B1 | 5/2003 | Steffens et al. |
| 6,568,740 B1 | 5/2003 | Dimmer |
| 6,575,520 B1 | 6/2003 | Spencer |
| 6,604,898 B2 | 8/2003 | Price |
| 6,607,234 B1 | 8/2003 | Schmeichel |
| 6,619,719 B1 | 9/2003 | Wheatley |
| 6,669,264 B1 | 12/2003 | Tucker |
| 6,676,189 B2 | 1/2004 | Schall et al. |
| 6,685,240 B2 | 2/2004 | Bacon |
| 6,685,251 B2 | 2/2004 | Dumas |
| 6,688,668 B2 | 2/2004 | Stevens et al. |
| 6,719,353 B1 | 4/2004 | Isler et al. |
| 6,752,449 B1 | 6/2004 | Wheatley |
| 6,773,019 B2 | 8/2004 | Schmeichel |
| 6,808,220 B2 | 10/2004 | Wheatley |
| 6,808,221 B2 | 10/2004 | Wheatley |
| 6,811,203 B2 | 11/2004 | Wheatley |
| 6,814,388 B2 | 11/2004 | Wheatley |
| 6,814,389 B2 | 11/2004 | Wheatley |
| 6,824,191 B2 | 11/2004 | Wheatley |
| 6,832,803 B2 | 12/2004 | Elliott |
| 6,893,073 B2 | 5/2005 | Wheatley |
| 6,959,848 B2 | 11/2005 | Schmeichel |
| 6,976,724 B2 | 12/2005 | Wheatley |
| 7,025,403 B2 | 4/2006 | Wheatley |
| 7,045,612 B2 | 5/2006 | Gravel |
| 7,063,944 B1 | 6/2006 | Gravel |
| 7,182,384 B2 | 2/2007 | Schmeichel |
| 7,188,888 B2 | 3/2007 | Wheatley et al. |
| 7,204,540 B2 | 4/2007 | Wheatley |
| 7,261,328 B2 | 8/2007 | Minix |
| 7,316,445 B2 | 1/2008 | Sugimoto |
| 7,318,618 B1 | 1/2008 | Yue |
| 7,363,786 B2 | 4/2008 | TerHaar et al. |
| 7,392,834 B2 | 7/2008 | Davenport et al. |
| 7,427,095 B2 | 9/2008 | Wheatley |
| 7,484,790 B2 | 2/2009 | Wheatley |
| 7,578,098 B2 | 8/2009 | Furuzawa et al. |
| 7,604,272 B2 | 10/2009 | Day |
| 7,604,282 B2 | 10/2009 | Spencer et al. |
| 7,607,714 B2 | 10/2009 | Wheatley |
| 7,621,582 B2 | 11/2009 | Schmeichel et al. |
| 7,815,239 B1 | 10/2010 | Schmeichel et al. |
| 7,823,957 B2 | 11/2010 | Williamson et al. |
| 7,854,465 B2 | 12/2010 | LeBlanc et al. |
| 7,954,876 B2 | 6/2011 | Kosinski |
| 8,047,600 B2 | 11/2011 | Leblanc et al. |
| 8,104,821 B2 | 1/2012 | Hu et al. |
| 8,128,149 B1 | 3/2012 | Wolf et al. |
| 8,146,981 B2 | 4/2012 | Huotari et al. |
| 8,146,982 B2 | 4/2012 | Williamson et al. |
| 8,240,740 B2 | 8/2012 | Chenowth et al. |
| 8,336,946 B2 | 12/2012 | Schrader et al. |
| 8,366,173 B2 | 2/2013 | Xu |
| 8,465,079 B2 | 6/2013 | Saito et al. |
| 8,480,154 B2 | 7/2013 | Yue |
| 8,544,934 B2 | 10/2013 | Maimin et al. |
| 8,573,678 B2 | 11/2013 | Yue |
| 8,632,114 B2 | 1/2014 | Yue |
| 8,702,150 B2 | 4/2014 | Saito et al. |
| 8,714,622 B2 | 5/2014 | Spencer et al. |
| 8,777,293 B2 | 7/2014 | Garska |
| 8,814,249 B2 | 8/2014 | Rossi |
| 8,857,887 B1 | 10/2014 | Schmeichel |
| 8,960,764 B2 | 2/2015 | Spencer |
| 9,032,668 B2 | 5/2015 | Blackwood et al. |
| 9,067,481 B2 | 6/2015 | Xu |
| 9,120,413 B2 | 9/2015 | Fink |
| 9,908,391 B2 * | 3/2018 | Williamson ............ B60J 7/068 |
| 10,239,394 B2 * | 3/2019 | Lutzka ............ B60J 7/141 |
| 10,286,765 B2 * | 5/2019 | Williamson ............ B60J 7/141 |
| 2001/0020792 A1 | 9/2001 | Huotari |
| 2002/0096909 A1 | 7/2002 | Schmeichel |
| 2004/0212212 A1 | 10/2004 | Spencer et al. |

(56) References Cited

U.S. PATENT DOCUMENTS

| | | |
|---|---|---|
| 2005/0057069 A1 | 3/2005 | McNamara |
| 2005/0191701 A1 | 9/2005 | Gravel et al. |
| 2010/0123331 A1 | 5/2010 | Buelna et al. |
| 2010/0133872 A1 | 6/2010 | Kosinski |
| 2014/0246877 A1 | 9/2014 | Spencer et al. |
| 2015/0001877 A1 | 1/2015 | Fink |
| 2015/0082704 A1 | 3/2015 | Gamble et al. |

FOREIGN PATENT DOCUMENTS

| | | |
|---|---|---|
| EP | 2223818 | 9/2010 |
| JP | 2006335238 | 12/2006 |

OTHER PUBLICATIONS

Renninger, Jennifer. "Understanding Damping Techniques for Noise and Vibration Control." EAR Aearo Technologies, 2000, https://earglobal.com/media/9891/understandingdampingtechniques.pdf.
Dodge Forum: Tonneau cover vibration?, 2019, https://dodgeforum.com/forum/4th-gen-ram-tech/337026-tonneau-cover-vibration.html.
2005-2014 Nissan Frontier Roll Up Tonneau Covers—Access 22030179—Access TonnoSport Tonneau Cover.pdf.
Extang Tuff Tonno Pickup Truck Cover—Tonneau Bed Covers.
Office Action of U.S. Appl. No. 15/862,698 dated Oct. 23, 2019, 31 pages.

\* cited by examiner

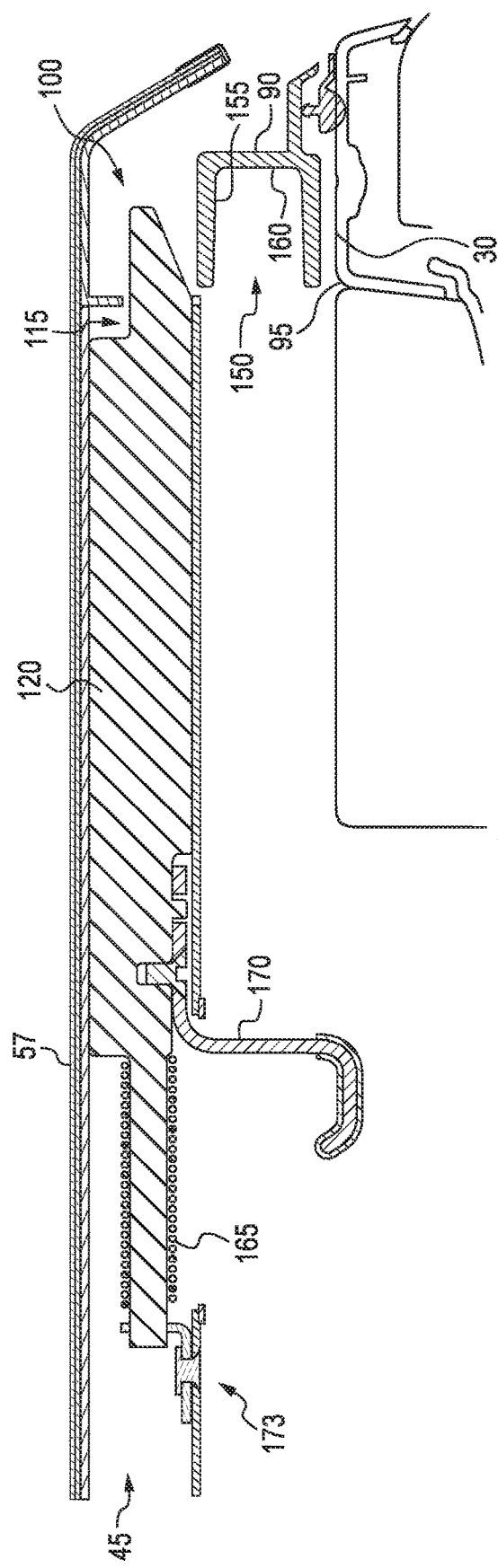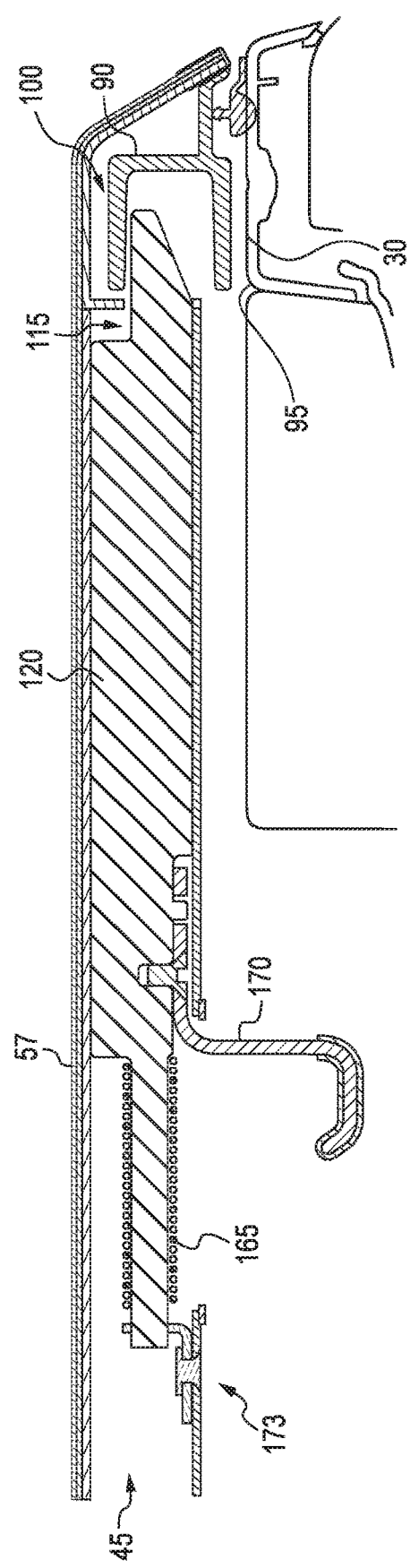

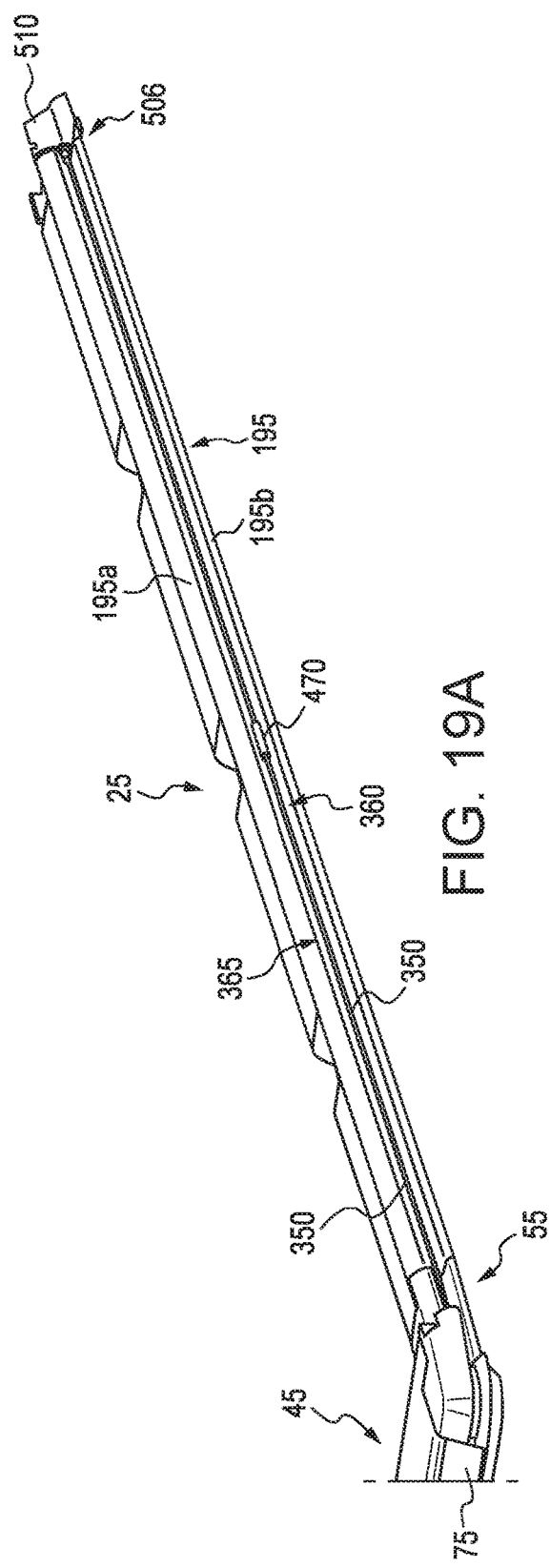
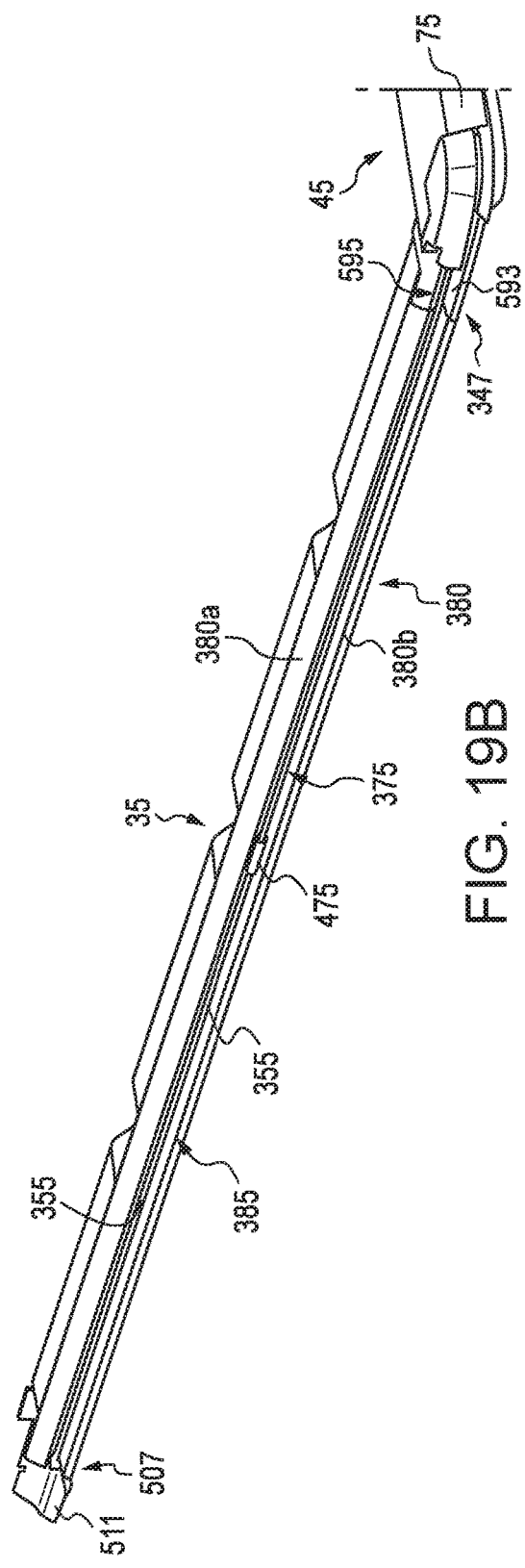

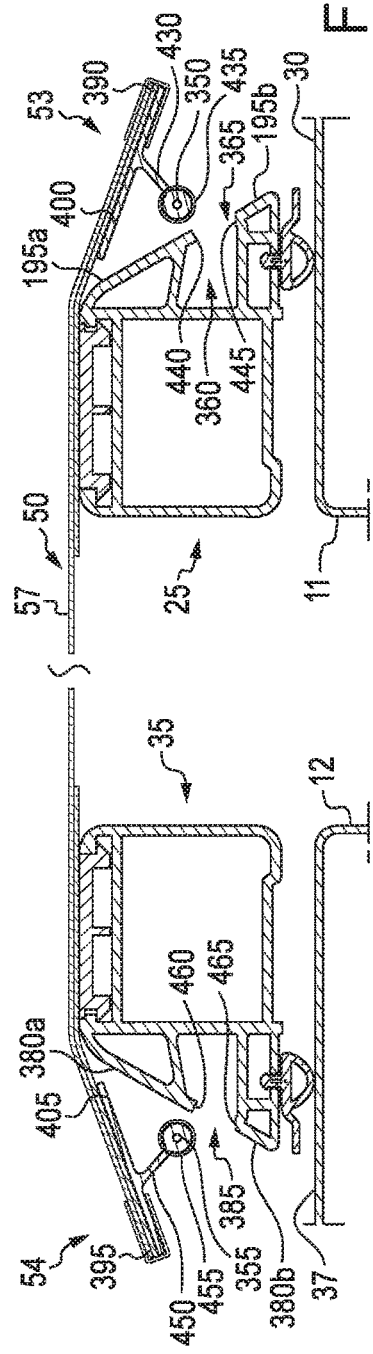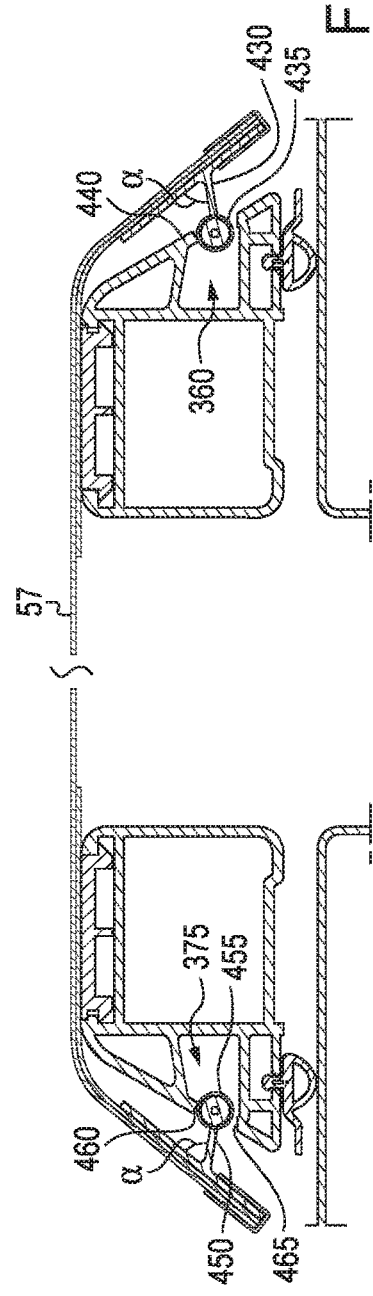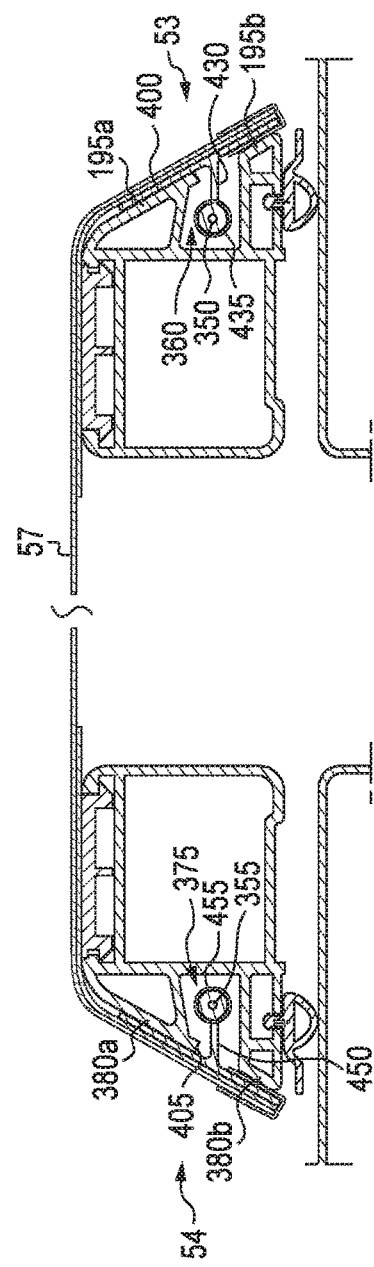

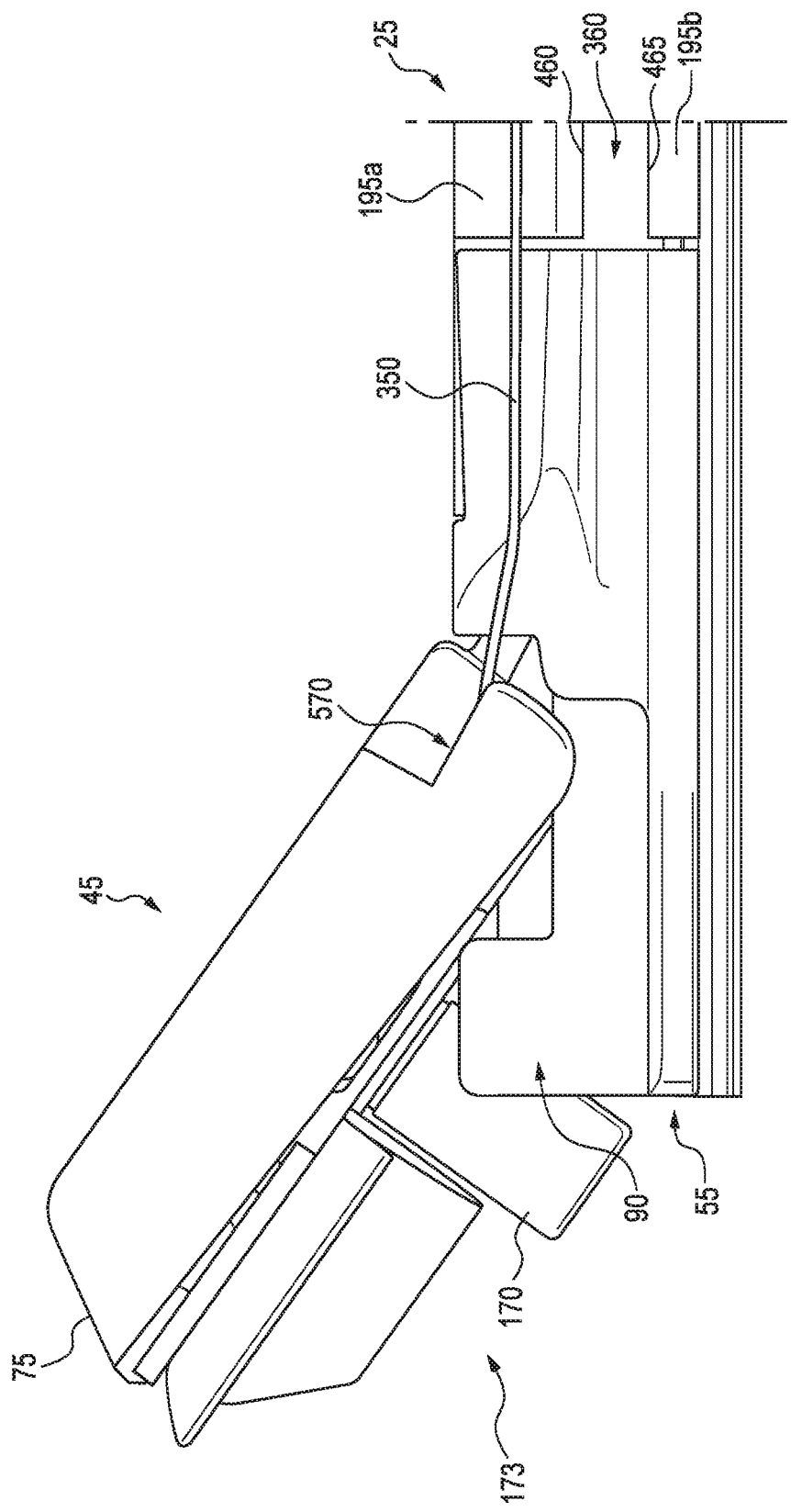

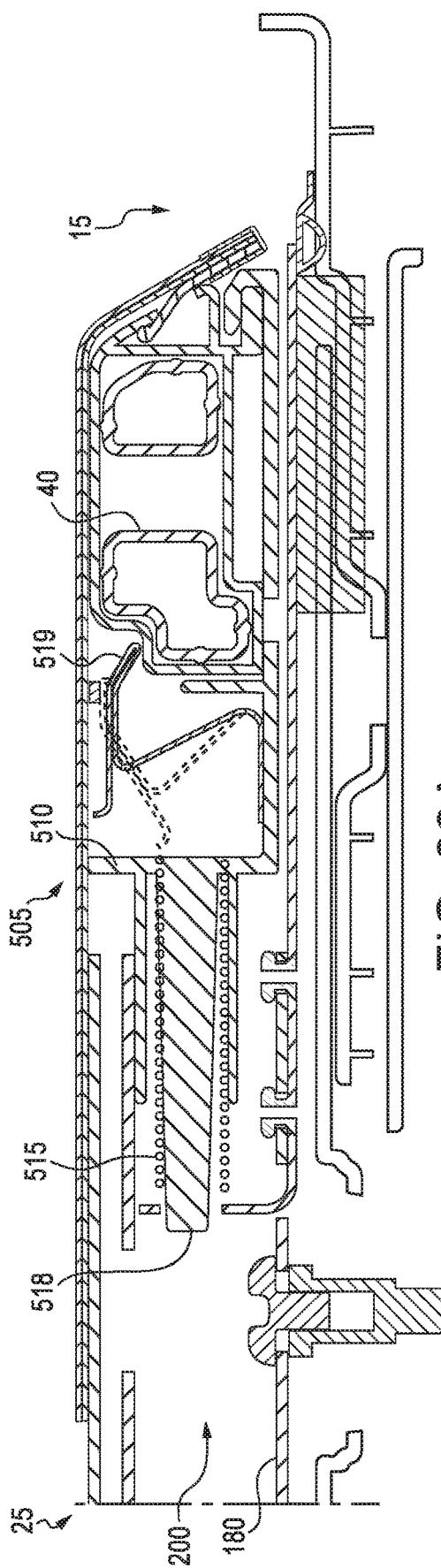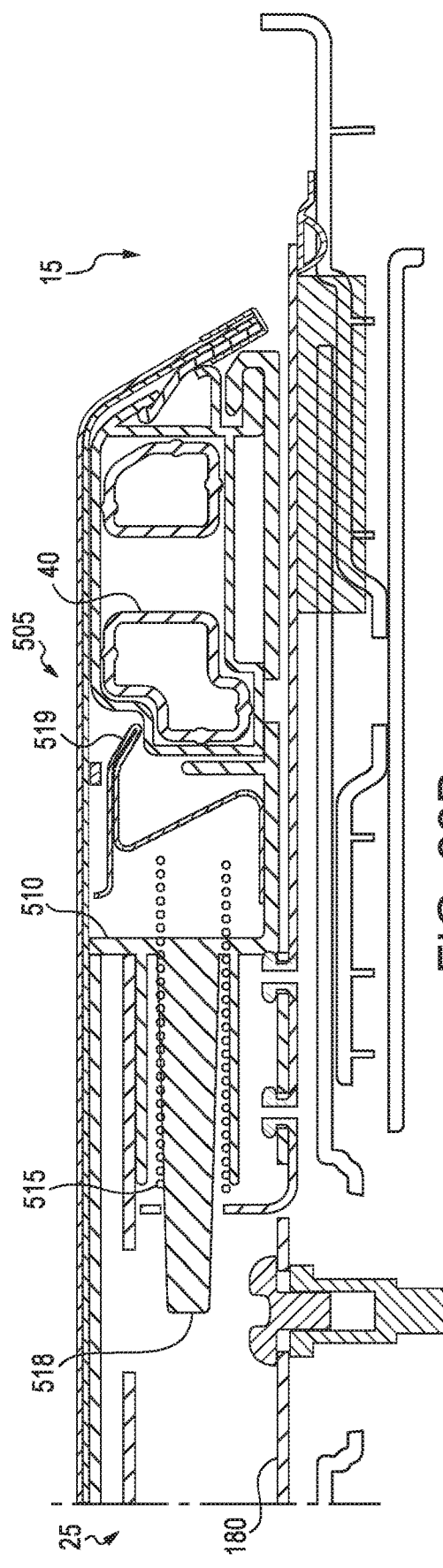

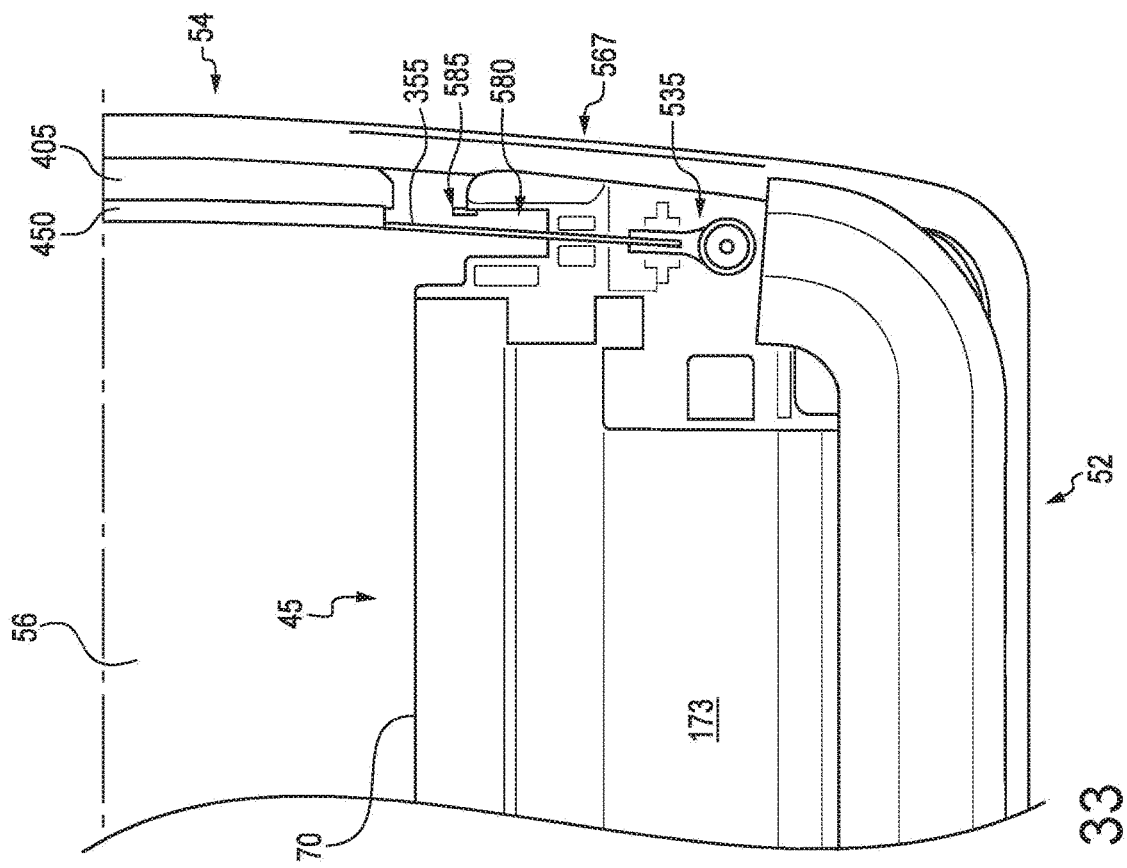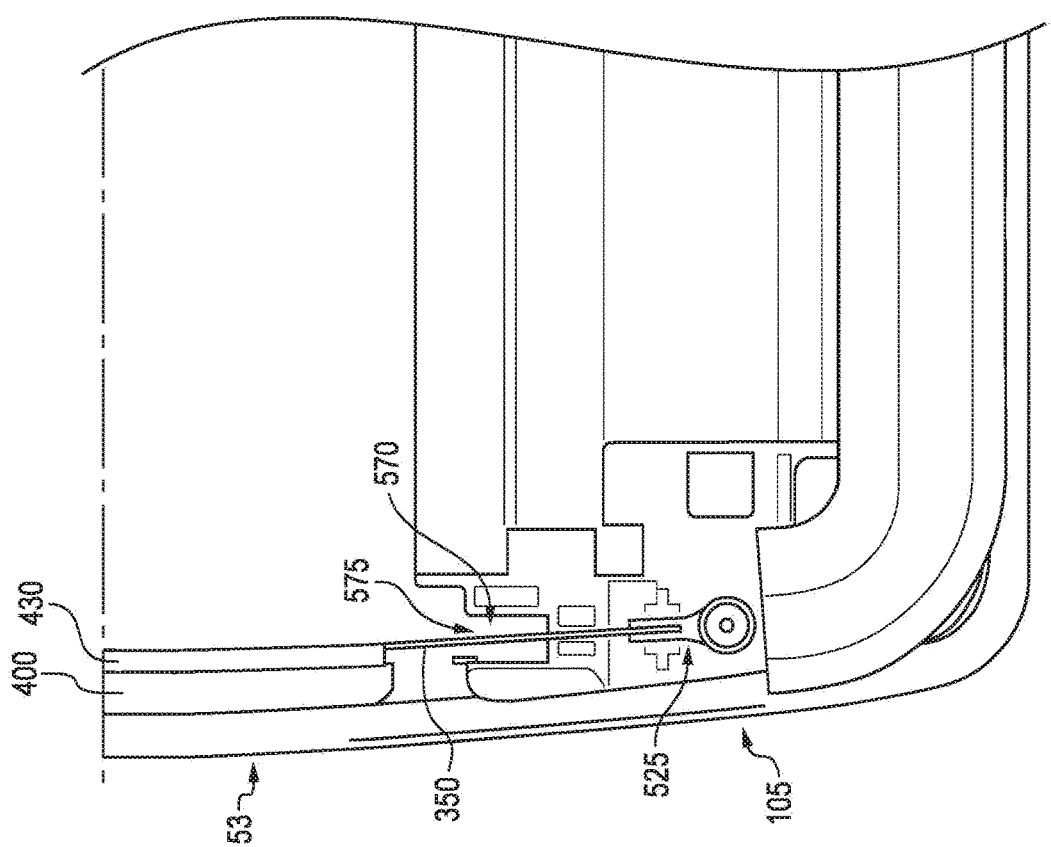
FIG. 33

FLEXIBLE TONNEAU COVER ASSEMBLY

RELATED APPLICATION

This application claims priority to U.S. Provisional Application Ser. No. 62/478,418 filed Mar. 29, 2017, which is expressly incorporated herein by reference.

BACKGROUND

Tonneau covers are generally used to cover the cargo box of a vehicle, such as a pick-up truck. A typical tonneau cover includes a cover sheet made of a flexible, waterproof material, and a frame structure to which the cover sheet is removably attached. Such tonneau cover assemblies can be problematic. For example, such frame structures often extend into the cargo space, and some covers can be opened from the exterior of the cargo box even with the tailgate closed.

SUMMARY

In accordance with one embodiment, a cover assembly for a cargo box of a vehicle is provided that includes a flexible cover, a first side rail, a securing member, a rear rail, and a latch.

The flexible cover includes a forward end that is positionable at a forward end of a cargo box, a rearward end that is positionable adjacent a rearward end of the cargo box, a first side extending from the forward end of the flexible cover to the rearward end of the flexible cover, and a second side extending from the forward end of the flexible cover to the rearward end of the flexible cover.

The first side rail includes a first end and a second end. The first side rail is positionable on or adjacent an upper surface of a side wall of the cargo box with the first end of the first side rail positioned at the forward end of the cargo box and the second end of the first side rail positioned at the rearward end of the cargo box.

The securing member defines a channel and includes a latch engagement member. The securing member is secured in a fixed position with respect to the first side rail when the cover assembly is secured to the cargo box, so that the channel of the securing member is positioned rearward of the second end of the first side rail and the latch engagement member is positioned rearward of the channel.

The rear rail is secured to the second end of the flexible cover and is removably positionable in the channel of the securing member. The rear rail includes a rearward side that is rotatable when the rear rail is positioned in the channel of the securing member between a closed position and an open position. In the closed position, the rearward side of the rear rail is lowered and the flexible cover is under tension. In the open position, the rearward side of the rear rail is raised and the flexible cover is untensioned.

The latch is movably secured to the rear rail. When the rear rail is in the closed position, the latch is movable to engage the latch engagement member of the securing member to retain the rear rail in the closed position.

In accordance with one embodiment, a cover assembly for a cargo box of a vehicle is provided that includes a flexible cover, a first cable, a second cable, a first side rail, a second side rail, a front rail, and a rear rail.

The flexible cover includes a forward end, a rearward end, a first side, and a second side. The first side of the flexible cover and the second side of the flexible cover each extends from the forward end of the flexible cover to the rearward end of the flexible cover.

The first cable is positioned along the first side of the flexible cover, and the second cable is positioned along the second side of the flexible cover.

The first side rail is positionable on or adjacent an upper surface of a first side wall of a cargo box. The first side rail defines a first continuous channel that includes a length that extends along a longitudinal axis of the first side rail. The first side rail includes an outboard wall that defines a first continuous opening to the first continuous channel.

The second side rail is positionable on or adjacent an upper surface of a second side wall of a cargo box. The second side rail defines a second continuous channel that includes a length that extends along a longitudinal axis of the second side rail. The second side rail includes an outboard wall that defines a second continuous opening to the second continuous channel.

The front rail is secured to the forward end of the flexible cover, and the front rail is securable to the first side rail and the second side rail at a forward end of the cargo box.

The rear rail is secured to the rearward end of the flexible cover, and is operatively connected to the first cable and the second cable. The rear rail is removably engageable with the first side rail and the second side rail, and includes a rearward side that is rotatable when the rear rail is engaged with the first side rail and the second side rail between a closed position and an open position. In the closed position, the rearward side of the rear rail is lowered and the first cable is positioned in the first continuous channel under tension to secure the first side of the flexible cover to the first side rail and the second cable is positioned in the second continuous channel under tension to secure the second side of the flexible cover to the second side rail. In the open position, the rearward side of the rear rail is raised and the first cable is untensioned and is removable from the first continuous channel via the first continuous opening and the second cable is untensioned and is removable from the second continuous channel via the second continuous opening.

In accordance with one embodiment, a cover assembly for a cargo box of a vehicle is provided that includes a flexible cover, a first cable, a second cable, a first side rail, a second side rail, a first securing member, a second securing member, a front rail, a rear rail, and a locking member.

The flexible cover includes a forward end, a rearward end, a first side, and a second side. The first side of the flexible cover and the second side of the flexible cover each extends from the forward end of the flexible cover to the rearward end of the flexible cover.

The first cable is positioned along the first side of the flexible cover, and the second cable is positioned along the second side of the flexible cover.

The first side rail includes a first end, a second end, and an outboard wall. The first side rail defines a first continuous channel extending along a longitudinal axis of the first side rail and the outboard wall of the first side rail defines a first continuous opening to the first continuous channel. The first side rail is positionable on or adjacent an upper surface of a first side wall of the cargo box with the first end positioned at a forward end of a cargo box and the second end positioned at a rearward end of the cargo box.

The second side rail includes a first end, a second end, and an outboard wall. The second side rail defines a second continuous channel extending along a longitudinal axis of the second side rail and the outboard wall of the second side rail defines a second continuous opening to the second continuous channel. The second side rail is positionable on or adjacent an upper surface of a second side wall of the cargo box with the first end positioned at the forward end of the cargo box and the second end positioned at the rearward end of the cargo box.

The first securing member defines a channel and includes a latch engagement member. The first securing member is secured in a first fixed position with respect to the first side rail when the assembly is secured to the cargo box, with the channel of the first securing member positioned rearward of the second end of the first side rail and the latch engagement member positioned rearward of the channel of the first securing member.

The second securing member defines a channel and is secured in a second fixed position with respect to the second side rail when the assembly is secured to the cargo box. The channel of the second securing member is positioned rearward of the second end of the second side rail when the second securing member is in the second fixed position.

The front rail is secured to the forward end of the flexible cover, and is securable to the first side rail and the second side rail at the forward end of the cargo box.

The rear rail is secured to the rearward end of the flexible cover. The rear rail is operatively connected to the first cable and the second cable and is removably positionable in the channel of the first securing member and the channel of the second securing member. The rear rail includes a rearward side that is rotatable when the rear rail is positioned in the channel of the first securing member and the channel of the second securing member between a closed position and an open position. In the closed position, the rearward side of the rear rail is lowered and the first cable is positioned in the first continuous channel under tension to secure the flexible cover to the first side rail and the second cable is positioned in the second continuous channel under tension to secure the flexible cover to the second side rail. In the open position, the rearward side of the rear rail is raised and the first cable is untensioned and the second cable is untensioned.

The latch is movingly secured to the rear rail. The latch is movable to engage the latch engagement member of the first securing member when the rear rail is in the closed position to retain the rear rail in the closed position.

BRIEF DESCRIPTION OF THE DRAWINGS

FIG. 10A is a cross-sectional view taken along the length of the rear rail and viewed from the rear to the front of the vehicle illustrating the rear rail in the open position with the latch of the rear rail disengaged from a latch engagement member of the securing member according to one aspect of the present disclosure.

FIG. 10B is a cross-sectional view of the rear rail of FIG. 10A with the rear rail in the closed position and the latch of the rear rail engaged with the latch engagement member of the securing member according to one aspect of the present disclosure.

FIG. 19A is a perspective view of the rear rail in the closed position with a first cable positioned in a continuous channel of a first side rail under tension according to one aspect of the present disclosure, wherein the flexible cover is removed for illustrative purposes.

FIG. 19B is a perspective view the rear rail in the closed position with a second cable positioned in a continuous channel of a second side rail under tension according to one aspect of the present disclosure, wherein the flexible cover is removed for illustrative purposes.

FIG. 20A is a cross-sectional view of the flexible tonneau cover assembly viewed from the rearward end toward the forward end of a cargo box with the first and second cables untensioned and positioned outside of the continuous channels of the first and second side rails according to one aspect of the present disclosure.

FIG. 20B is a cross-sectional view of the flexible tonneau cover assembly of FIG. 20A with the first and second cables in the process of being inserted or withdrawn from the continuous channels in the first and second side rails according to one aspect of the present disclosure.

FIG. 20C is a cross-sectional view of the flexible tonneau cover assembly of FIG. 20A with the cables tensioned and positioned in the continuous channels of the first and second side rails according to one aspect of the present disclosure.

FIG. 21 is a side view of the rear rail in the open position according to one aspect of the present disclosure, wherein the flexible cover is removed for illustrative purposes.

FIG. 28A is a cross-sectional view of the carriage and the side rail taken along a line parallel to the longitudinal axis of the side rail with the carriage extended outward from the forward end of the side rail according to one aspect of the present disclosure.

FIG. 28B is a cross-sectional view of the carriage and the side rail of FIG. 28A, wherein the carriage is retracted toward the forward end of the side rail according to one aspect of the present disclosure.

FIG. 33 includes portions of a view of FIG. 22 enlarged for magnification purposes.

DETAILED DESCRIPTION

It should be understood that the description and drawings herein are merely illustrative and that various modifications and changes can be made in the structures disclosed without departing from the present disclosure. In general, the figures of the exemplary flexible tonneau cover are not to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the exemplary flexible tonneau cover assembly disclosed herein are merely terms of art that may vary from one manufacturer to another and should not be deemed to limit the present disclosure.

Figure 1:
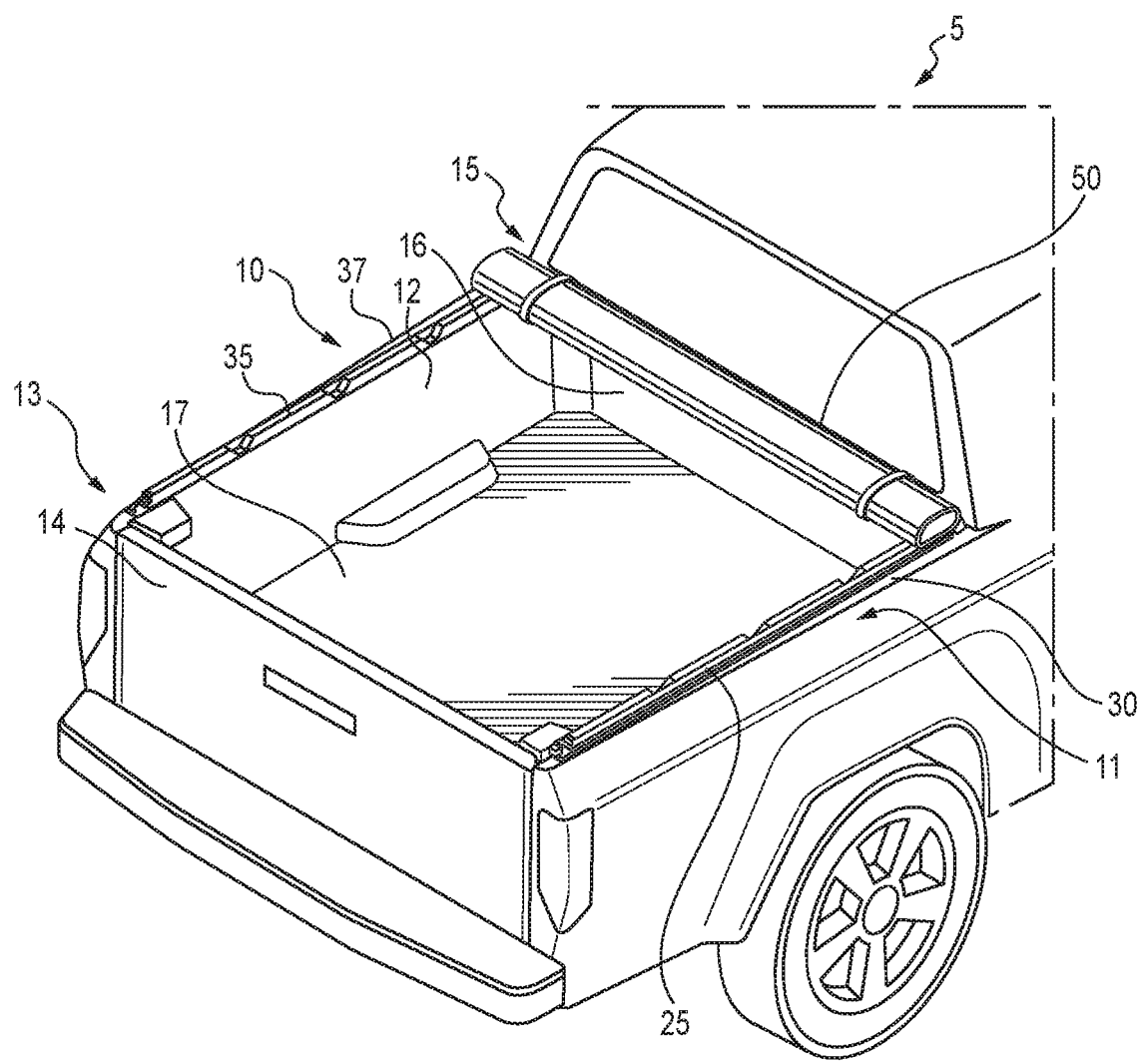
FIG. 1 is a perspective view showing a tonneau cover assembly with a flexible cover in a storage position according to one aspect of the present disclosure.
Figure 2:
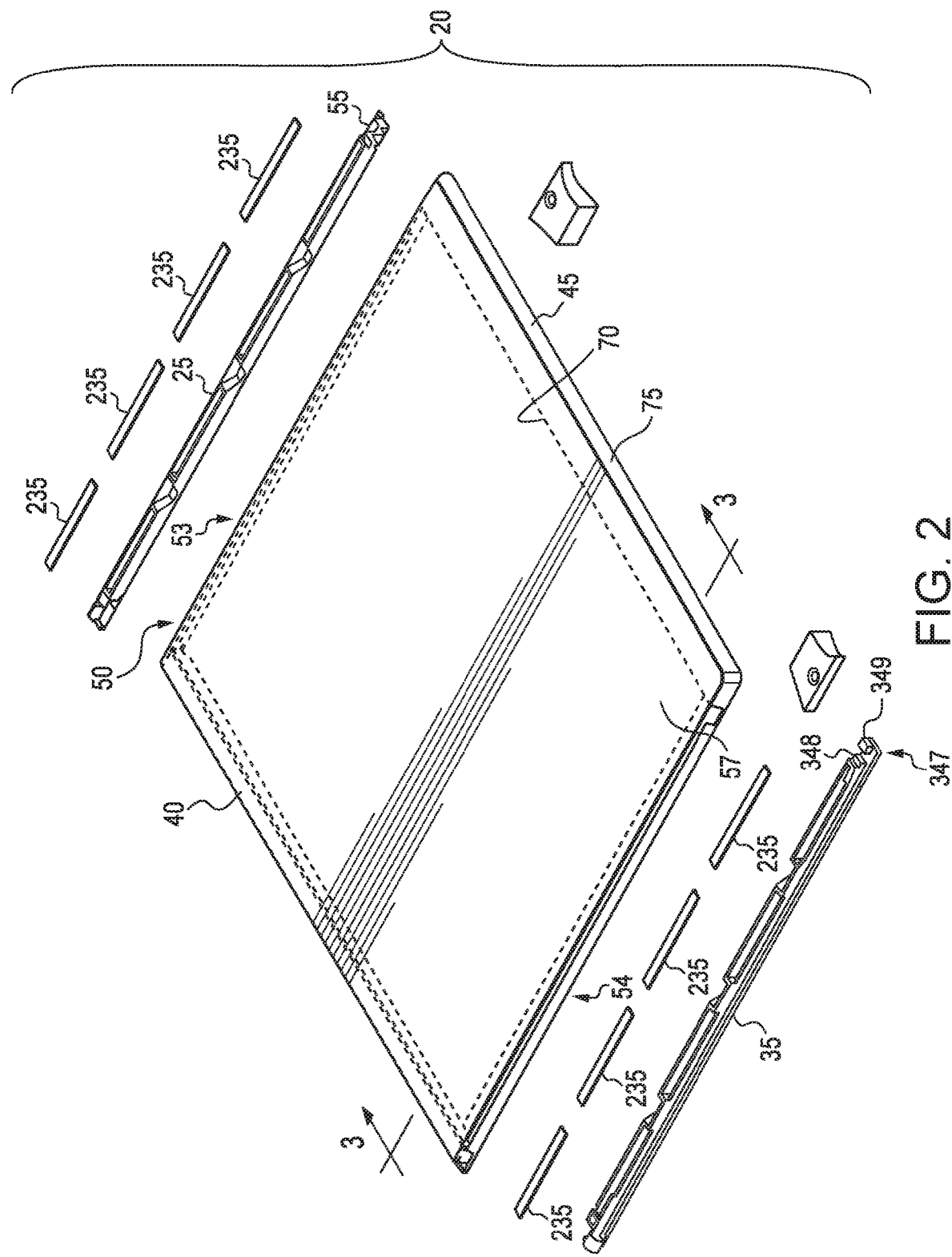
FIG. 2 is a partially exploded view of a tonneau cover assembly according to one aspect of the present disclosure.
Figure 3:
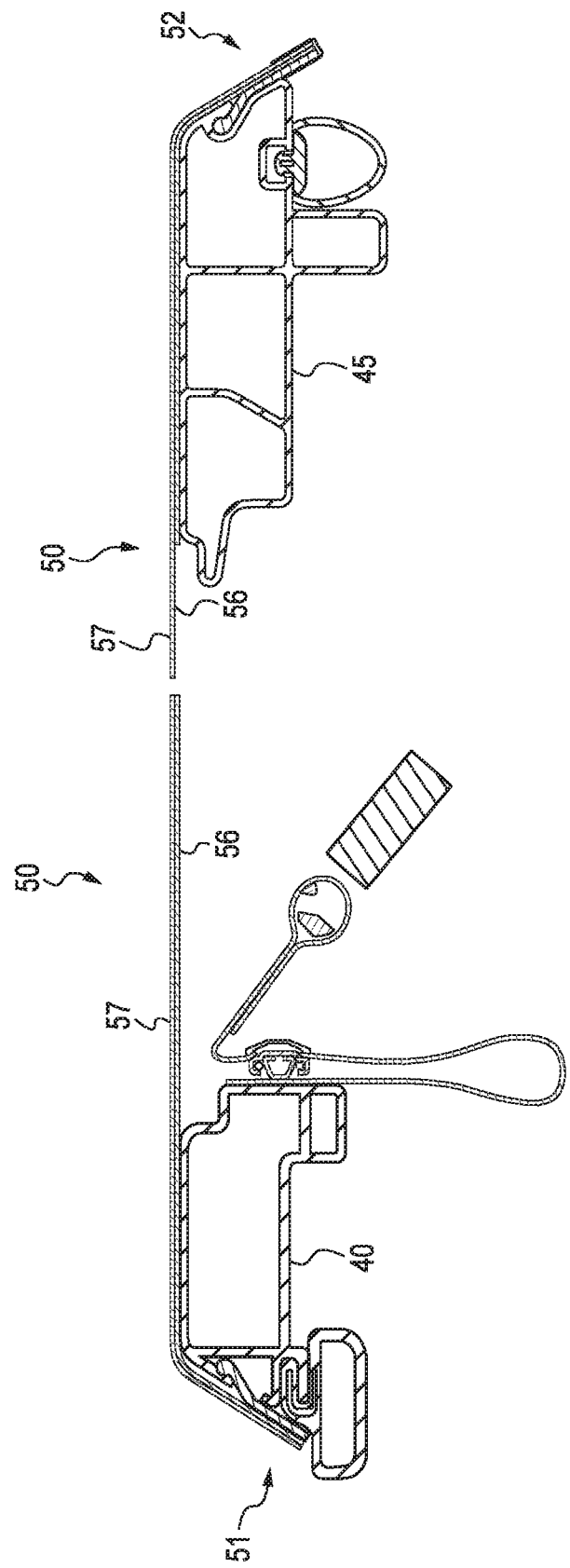
FIG. 3 is a cross-sectional view from line 3-3 in FIG. 2.
Figure 4:
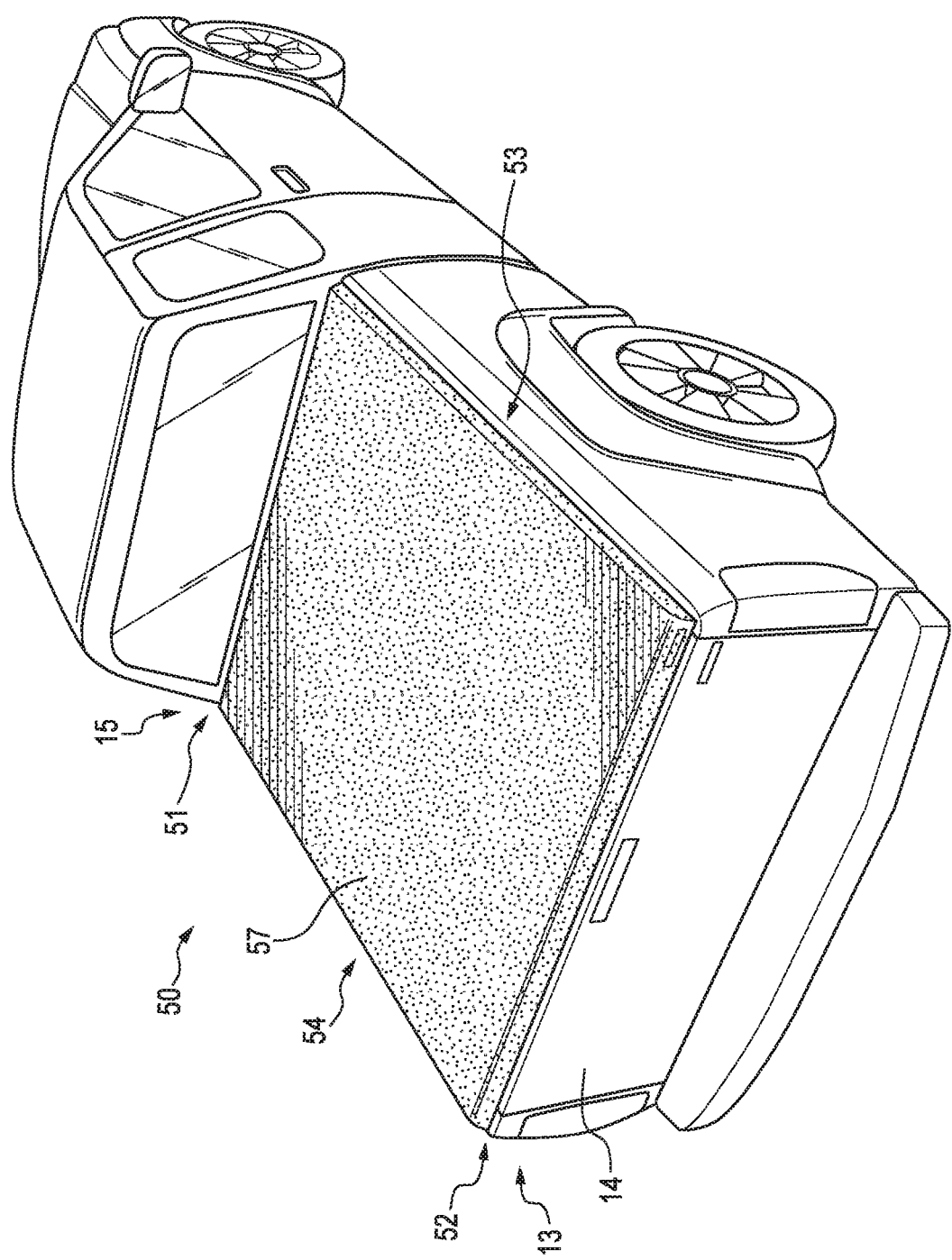
FIG. 4 is a perspective view showing a tonneau cover assembly with a rear rail in a closed position according to one aspect of the present disclosure.
Figure 5:
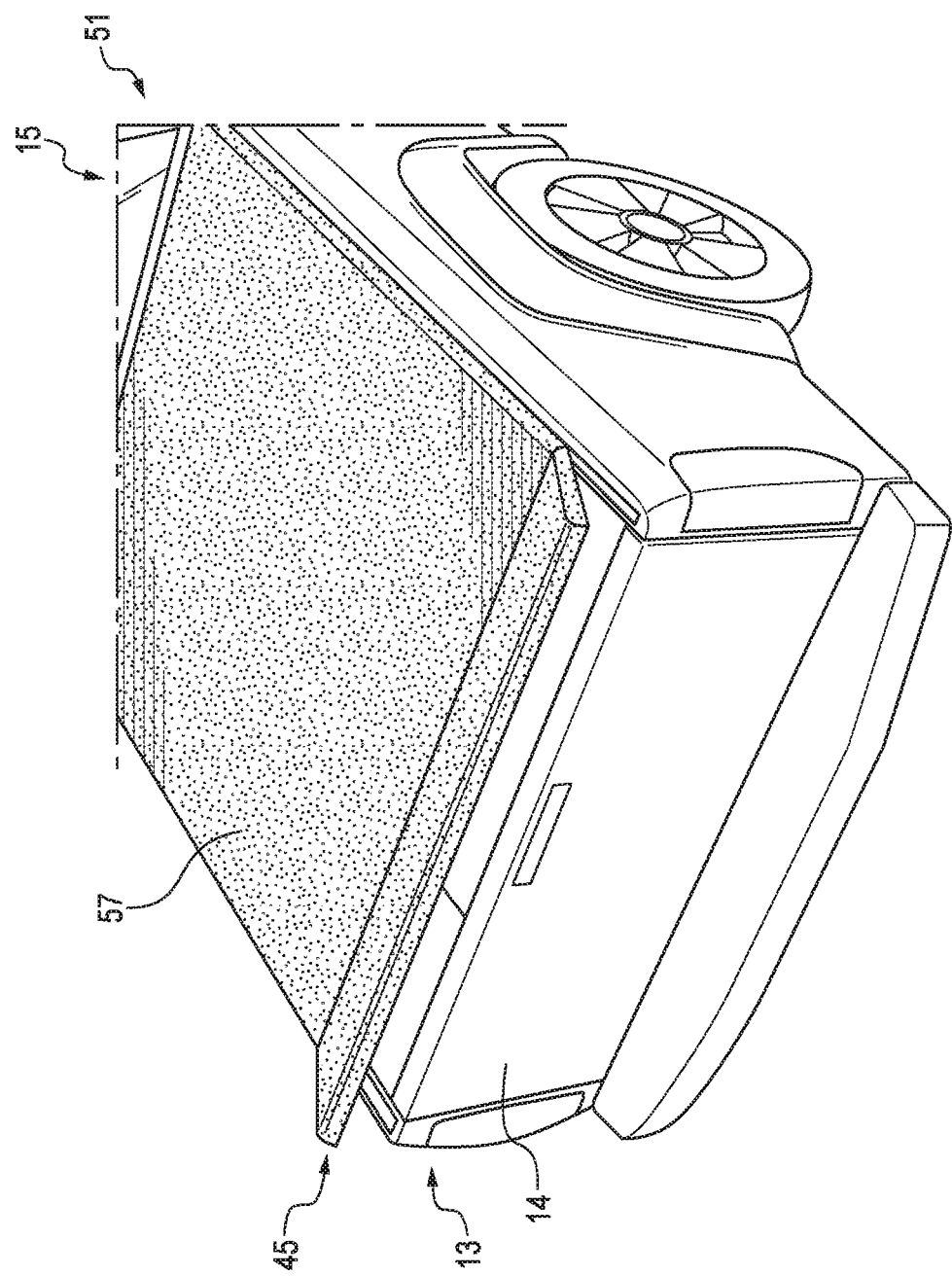
FIG. 5 is a perspective view showing the tonneau cover assembly of FIG. 4 with the rear rail in an open position according to one aspect of the present disclosure.

As shown in FIG. 1, a vehicle 5 is provided that includes a cargo box 10 defined by a first side wall 11, a second side wall 12, a rearward end 13 including a tailgate 14, a forward end 15 including a front wall 16, and a bed 17. In general, as shown in FIGS. 1 and 2, a flexible tonneau cover assembly 20 is provided that includes a first side rail 25 positionable on or adjacent an upper surface 30 of the first side wall 11, a second side rail 35 positionable on or adjacent an upper surface 37 of the second side wall 12, a front rail 40 positionable at the forward end 15 of the cargo box 10, a rear rail 45 positionable at the rearward end 13 of the cargo box 10, and a flexible cover 50. As shown in FIGS. 3 and 4, the flexible cover 50 includes a forward end 51 secured to the front rail 40, a rearward end 52 secured to the rear rail 45, a first side 53 that extends from the forward end 51 of the flexible cover 50 to the rearward end 52 of the flexible cover 50, a second side 54 that extends from the forward end 51 of the flexible cover 50 to the rearward end 52 of the flexible cover 50, a downwardly facing surface 56, and an upwardly facing surface 57. The rear rail 45 is movable between a closed position as shown in FIG. 4 and an open position as shown in FIG. 5.

Figure 6A:
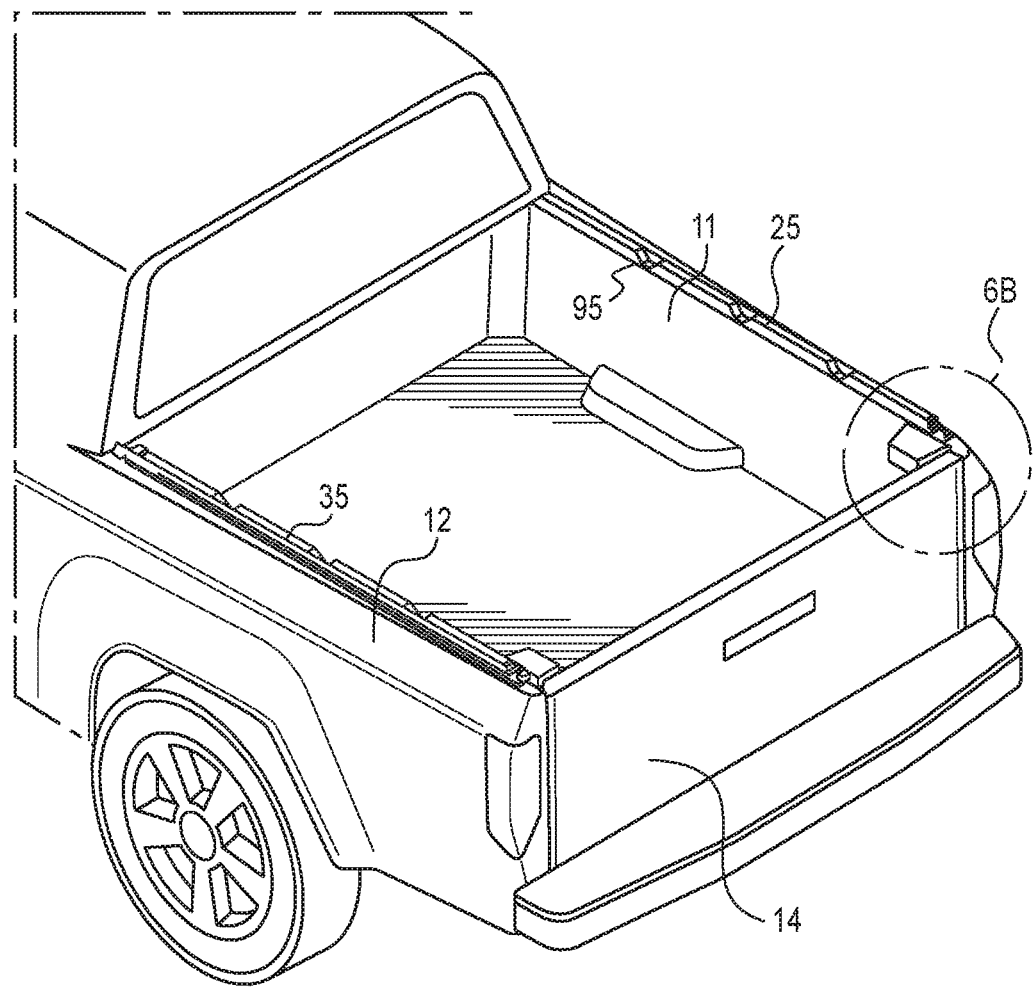
FIG. 6A is a perspective view showing two side rails of the tonneau cover assembly secured to side walls of a cargo box according to one aspect of the present disclosure.
Figure 6B:
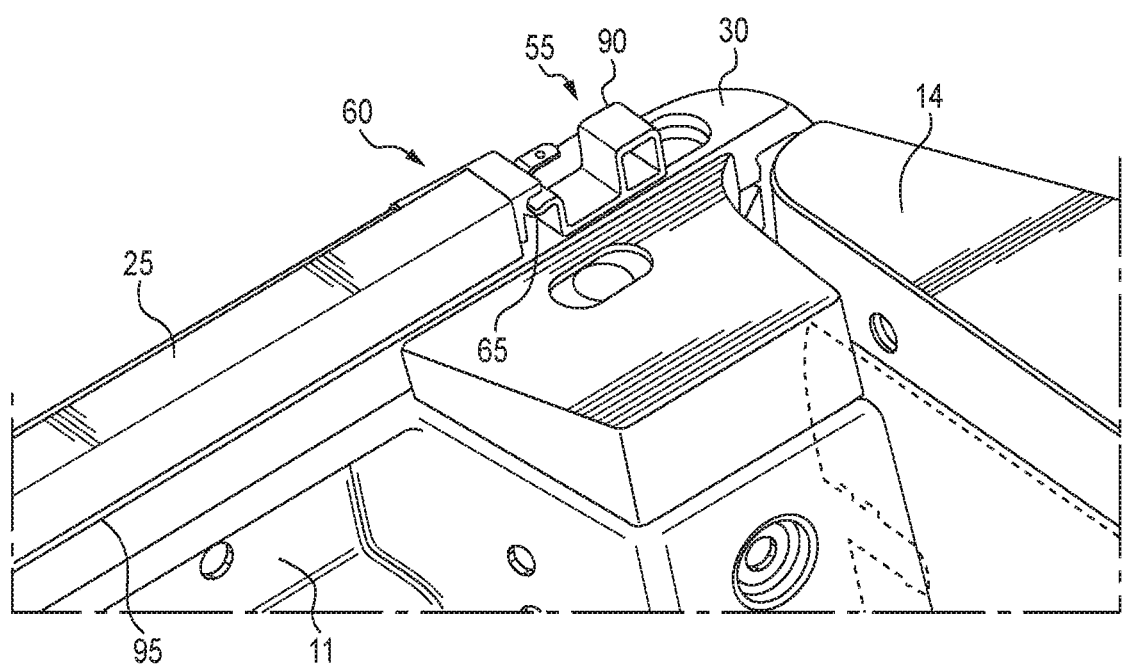
FIG. 6B is a portion of a view of FIG. 6A enlarged for magnification purposes.
Figure 7A:
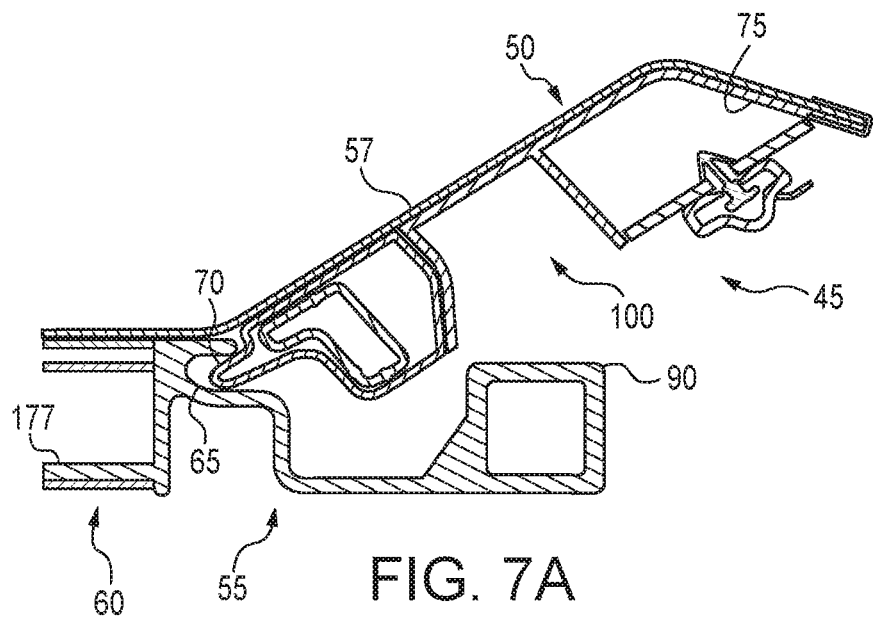
FIG. 7A is cross-sectional view of the rear rail positioned in the open position according to one aspect of the present disclosure.
Figure 7B:
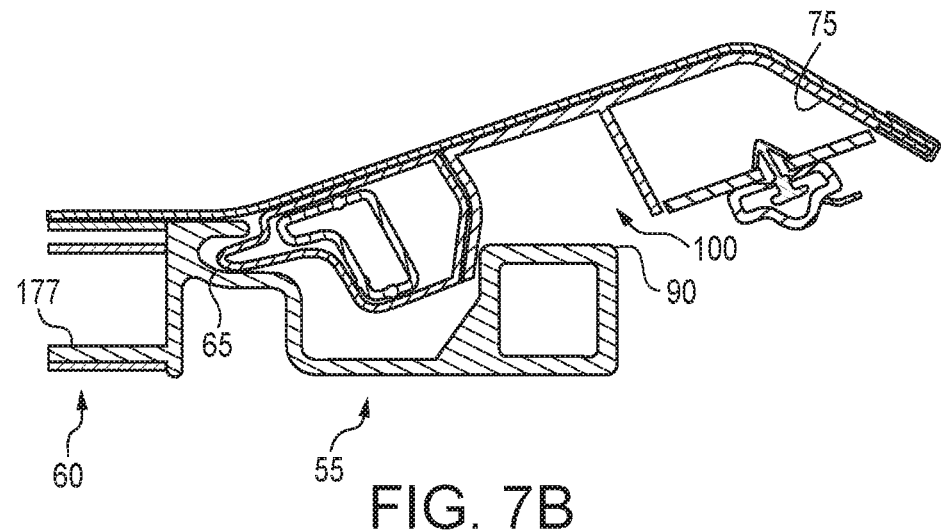
FIG. 7B is a cross-sectional view of the rear rail of FIG. 7A positioned between the open position and the closed position according to one aspect of the present disclosure.
Figure 7C:
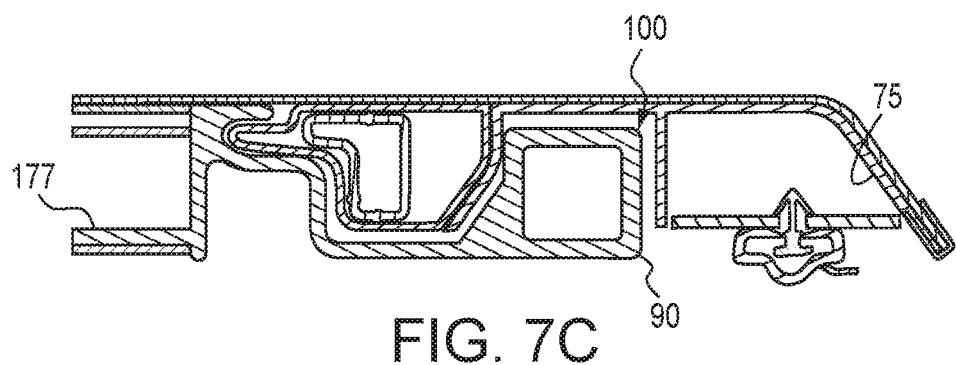
FIG. 7C is cross-sectional view of the rear rail of FIG. 7A positioned in the closed position according to one aspect of the present disclosure.

In an embodiment as shown in FIGS. 6A and 6B, the flexible tonneau cover assembly 20 includes a first securing member 55 for removably securing the rear rail 45 to the first side rail 25. The first securing member 55 defines a channel 65 for receiving the rear rail 45, and includes a latch engagement member 90. As shown in FIGS. 7A, 7B, and 7C, the rear rail 45 is rotatable between the open position and the closed position when a forward side 70 of the rear rail 45 is positioned in the channel 65 of the first securing member 55. As shown in FIG. 7A, a rearward side 75 of the rear rail 45 is raised when the rear rail 45 is in the open position so that the flexible cover 50 is untensioned. As shown in FIG. 7C, the rearward side 75 of the rear rail 45 is lowered to place the rear rail 45 in the closed position. In the closed position, the front rail 40 is secured to the first side rail 25 and the second side rail 35, and the flexible cover 50 is placed under tension and is secured to the first side rail 25 and the second side rail 35 with the downwardly facing surface 56 of the flexible cover 50 facing the bed 17 of the cargo box 10.

The first securing member 55 may be secured in a fixed position with respect to the first side rail 25 in a way that maximizes the cargo space of the cargo box 10. In a non-limiting example as shown in FIG. 6B, the first side rail 25 can be positioned on the upper surface 30 of the first side wall 11 with the first securing member 55 secured in the fixed position to the first side rail 25 with the channel 65 and the latch engagement member 90 of the first securing member 55 positioned rearward of the rearward end 60 of the first side rail 25. As used herein, the term fixed position means that the first securing member 55 is secured to the first side rail 25, the first side wall 11, or both the first side rail 25 and the first side wall 11 so that the first securing member 55 does not move with respect to the first side rail 25 when the flexible tonneau cover assembly 20 is secured to the cargo box 10. Positioning of the first securing member 55 rearward of the first side rail 25 allows both the first side rail 25 and the securing member 55 to be positioned at or outboard of an inboard edge 95 of the upper surface 30 of the first side wall 11, thereby maximizing the cargo space of the cargo box 10 and minimizing contact with any cargo contained therein.

In a non-limiting example, the rear rail 45 may be configured to receive a portion of the first securing member 55 therein when the rear rail 45 is in the closed position. As best shown in FIGS. 7A-C, 8A, and 8B, the rear rail 45 defines a first channel 100 that receives the latch engagement member 90 of the first securing member 55 therein when the rear rail 45 is in the closed position. The first channel 100 is positioned at a first end 105 of the rear rail 45 and may be partially defined by an end cap 110 of the rear rail 45. A second channel 115 is provided in the rear rail 45 that extends parallel to a longitudinal axis of the rear rail 45 and intersects the first channel 100. The second channel 115 houses a latch 120 that is movably secured therein and is capable of extending into the first channel 100 to engage the latch engagement member 90 when the rear rail 45 is in the closed position to secure the rear rail 45 to the first securing member 55. Positioning of the latch engagement member 90 in the rear rail 45 improves the appearance of the flexible tonneau cover assembly 20 by allowing the flexible cover 50 to extend over both the rear rail 45 and the first securing member 55 as shown in FIG. 4 when the rear rail 45 is in the closed position.

Figure 9A:
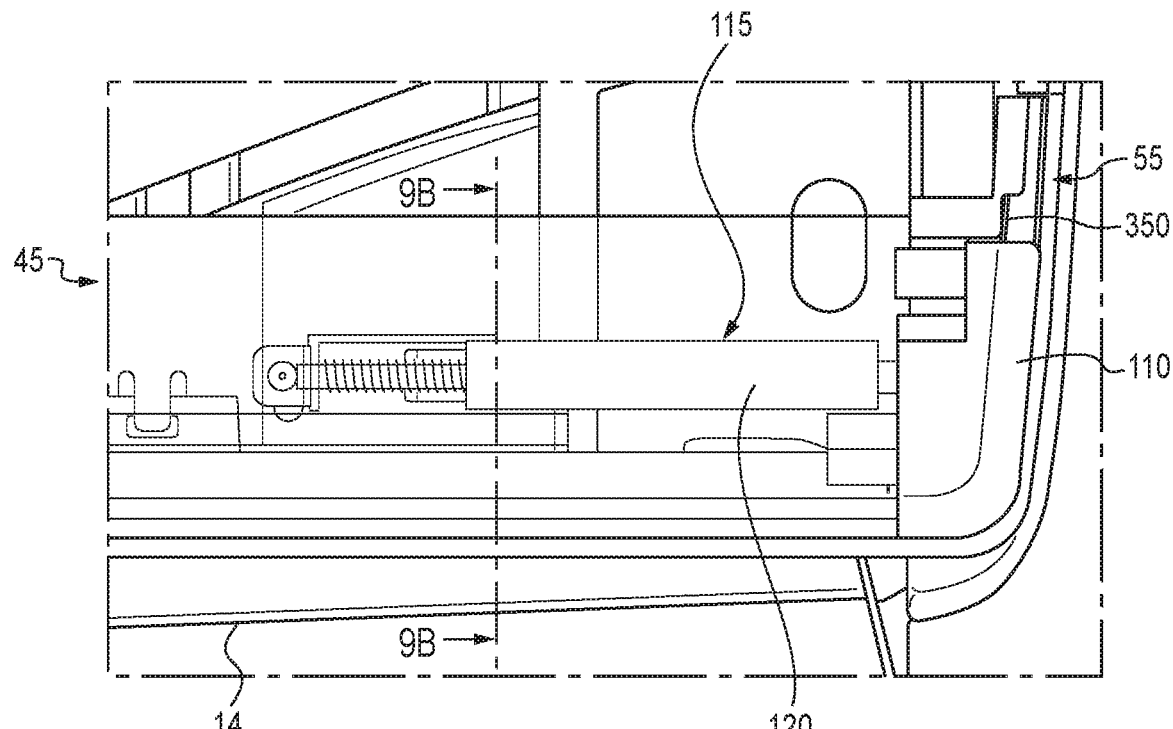
FIG. 9A is an overhead view of the rear rail in the closed position with a latch of the rear rail engaged with the securing member according to one aspect of the present disclosure, the flexible cover is removed and the rear rail is transparent for illustrative purposes.
Figure 9B:
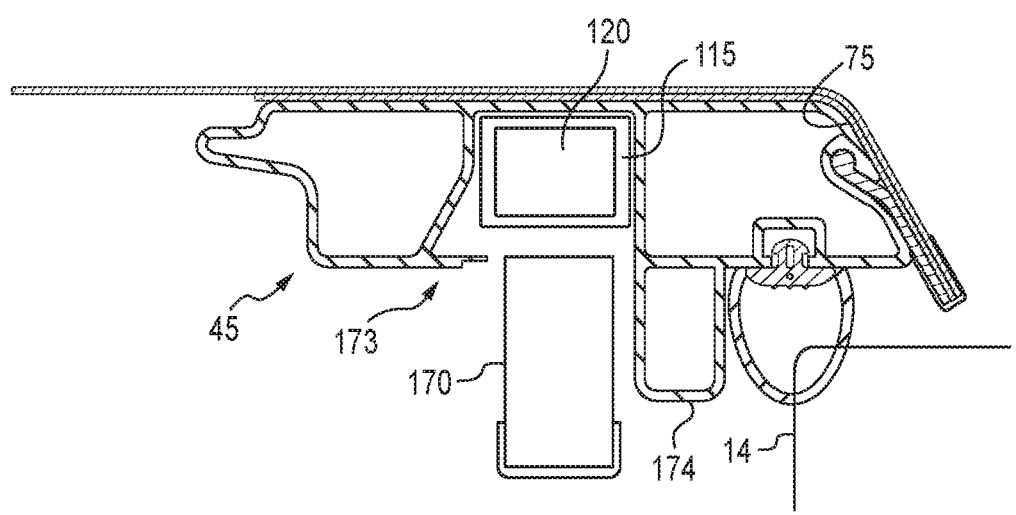
FIG. 9B is a cross-sectional view from line 9B-9B in FIG. 9A.
Figure 11A:
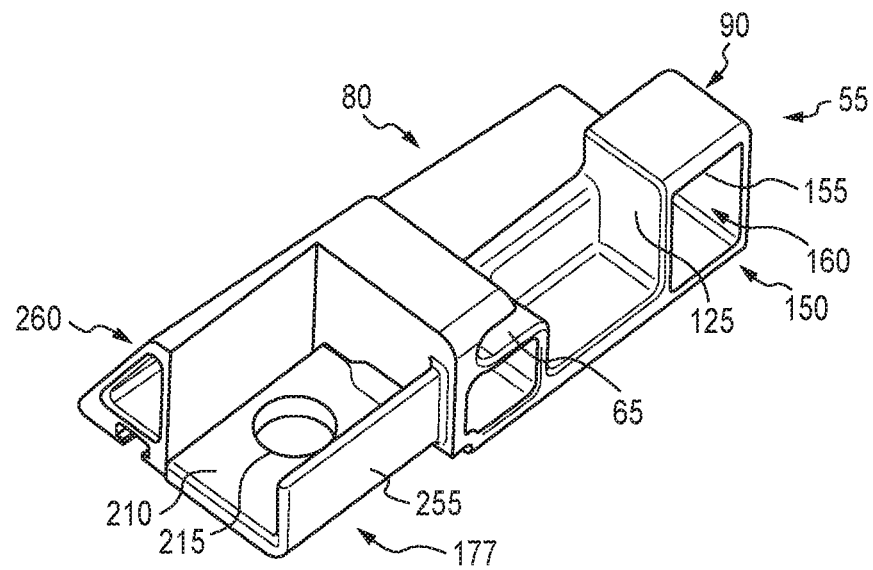
FIG. 11A is a perspective view of an inboard side of the securing member according to one aspect of the present disclosure.
Figure 11B:
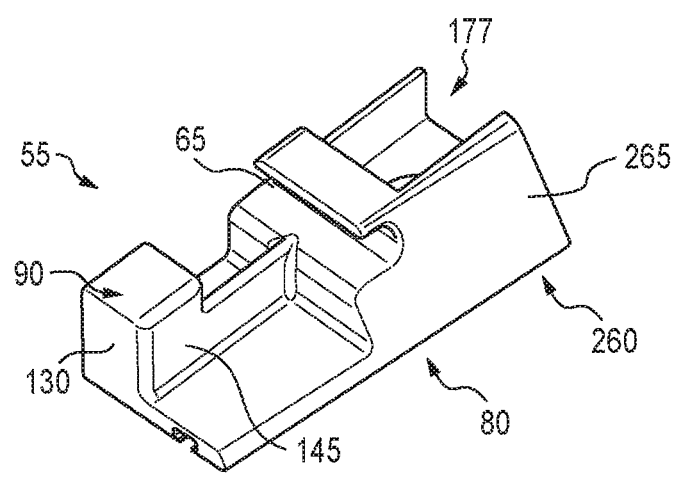
FIG. 11B is a perspective view of an outboard side of the securing member of FIG. 11A according to one aspect of the present disclosure.
Figure 11C:
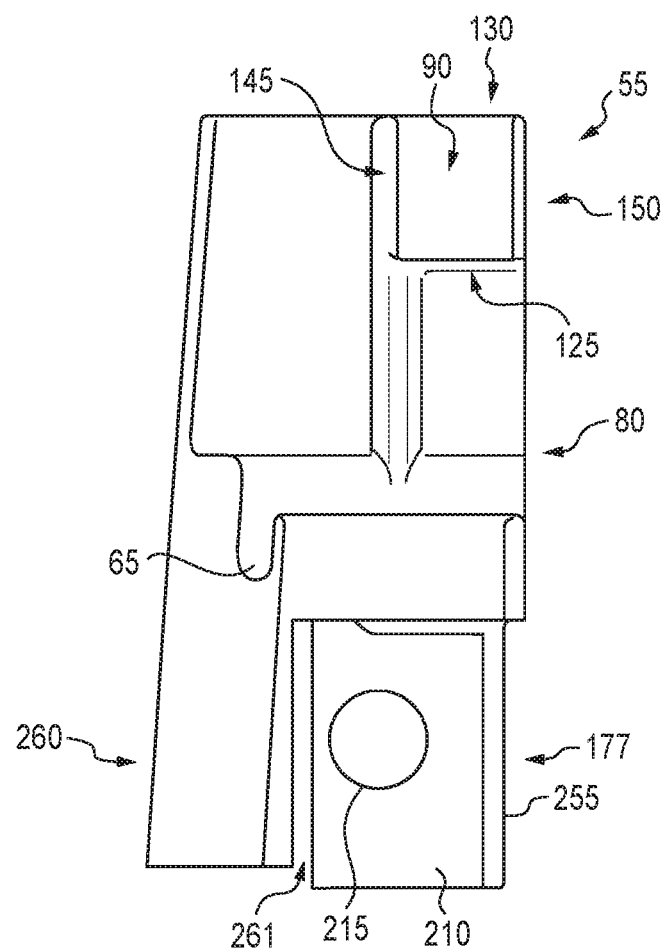
FIG. 11C is an overhead view of the securing member of FIG. 11A according to one aspect of the present disclosure.

The flexible tonneau cover assembly 20 may be configured to prevent or otherwise inhibit the rear rail 45 from being moved from the closed position from outside of the cargo box 10 when the tailgate 14 is closed (as shown in FIG. 4). As shown in FIGS. 11A, 11B, and 11C, the latch engagement member 90 may extend upward from a body 80 of the first securing member 55 and may include a forward side 125, a rearward side 130, an outboard side 145, and an inboard side 150. As shown in FIG. 11A, the inboard side 150 is provided with an engagement surface 155 and a recess 160. As shown in FIGS. 10A and 10B, the latch 120 may be biased toward the first channel 100 with, for example, a spring 165 to automatically extend the latch 120 into the recess 160 of the inboard side 150 to engage the engagement surface 155 when the rear rail 45 is in the lowered position. As shown in FIGS. 10A and 10B, the latch 120 is provided with an actuator 170 extending from an underside 173 of the rear rail 45 that allows a user to retract the latch 120 from the recess 160 and rotate the rear rail 45 to the open position. As shown in FIGS. 9A and 9B, the latch 120 and the actuator 170 are positioned forward of the rearward side 75 of the rear rail 45 and the tailgate 14 when the rear rail 45 is in the closed position and the tailgate 14 is closed so that the actuator 170 is not accessible from outside of the cargo box 10. As shown in FIG. 9B, a finger 174 may extend from the underside 173 of the rear rail 45 that is positioned between the actuator 170 and the rearward side 75 of the rear rail 45 to inhibit access to the actuator 170 when the rear rail 45 is in the closed position and the tailgate 14 is closed.

Figure 8A:
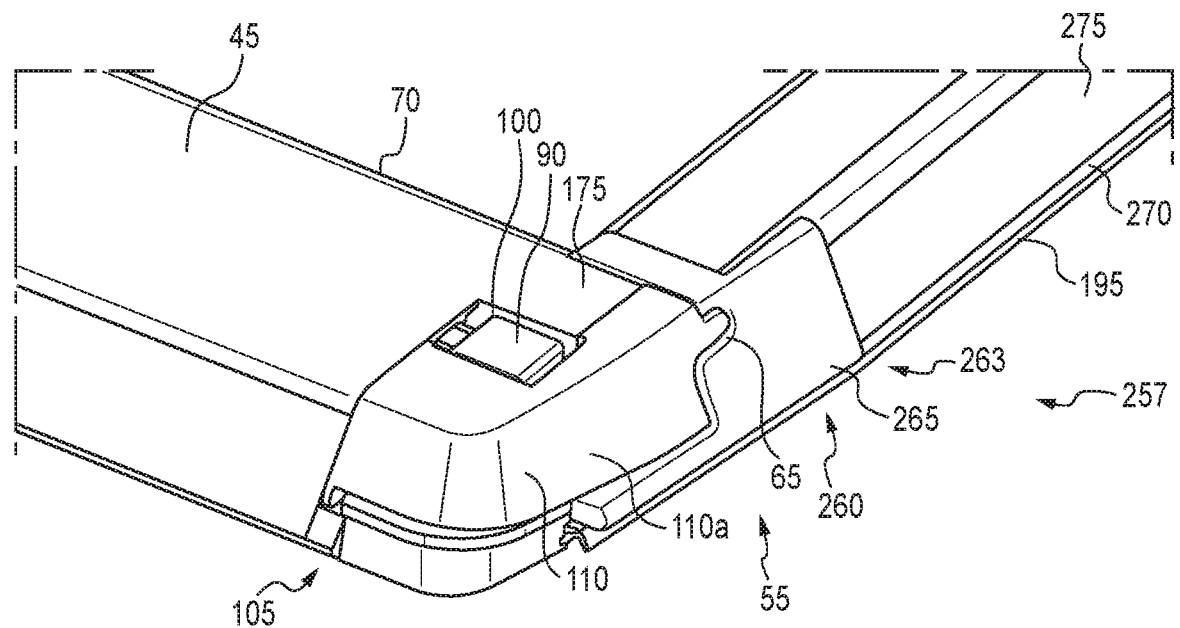
FIG. 8A is a perspective view the rear rail positioned in the closed position according to one aspect of the present disclosure, the flexible cover is removed for illustrative purposes.
Figure 8B:
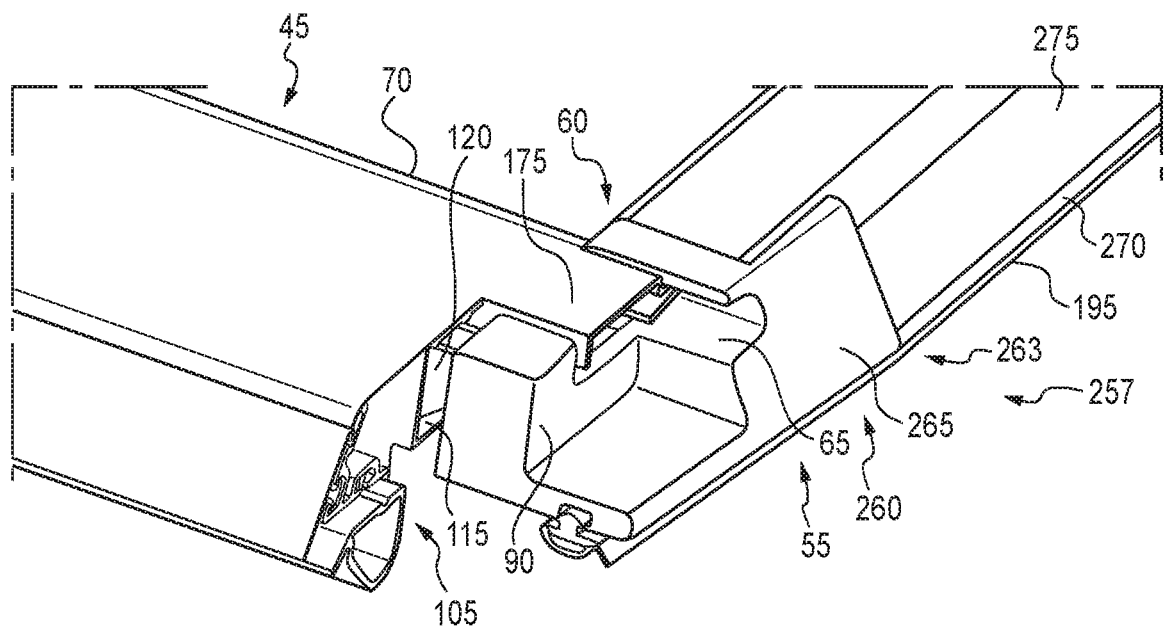
FIG. 8B is a view of the rear rail of FIG. 8A with a portion of the rear rail removed for illustrative purposes.
Figure 12:
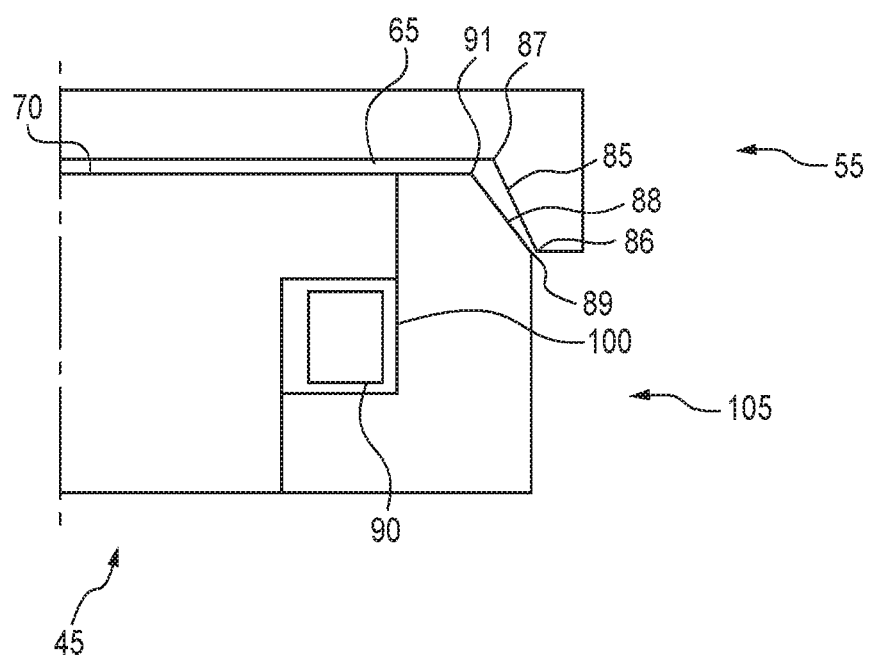
FIG. 12 is a partial overhead view of the rear rail and the securing member with the rear rail in the closed position, wherein the flexible cover and an upper portion of the securing member are removed to illustrate the position of the forward side of the rear rail in a channel of the securing member.

The flexible tonneau cover assembly 20 may include one or more features that maintain proper positioning of the rear rail 45 with respect to the first side rail 25 and the first securing member 55 when the rear rail 45 is in, or rotated to, the closed position. As shown in FIGS. 8A and 8B, a portion 175 of the rear rail 45 is positioned between the channel 65 of the first securing member 55 and the forward side 125 of the latch engagement member 90. Accordingly, the rear rail 45 entirely surrounds the forward side 125, the rearward side 130, the outboard side 145, and the inboard side 150 of the latch engagement member 90 when in the closed position. This arrangement allows the latch engagement member 90 to function as both a locating feature to facilitate the proper alignment of the rear rail 45 when it is moved from the open position to the closed position, as well as a stop for preventing movement of the rear rail 45 rearward away from the channel 65 when the rear rail 45 is in the closed position. Such a configuration also protects the latch 120 when it is engaged with the latch engagement member 90 from forces applied to the rear rail 45. In addition to, or alternatively, the channel 65 may be closed on the outboard side of the first securing member 55 with an outboard wall 85 as shown in FIG. 12. The outboard wall 85 may extend from a rearward point 86 inboardly to a forward point 87, and the rear rail 45 may be provided with a chamfered wall 88 that extends inboardly at an angle greater than the outboard wall 85 from a point 89 on the first end 105 to a point 91 on the forward side 70. The outboard wall 85 facilitates insertion of the forward end 70 of the rear rail 45 in the channel 65 by guiding the chamfered wall 88 therealong until the point 91 is positioned in the channel 65 with the point 89 positioned adjacent the rearward point 86, thereby properly aligning the first channel 100 of the rear rail 45 with the latch engagement member 90 of the securing member 55 when the rear rail 45 is rotated to the closed position.

Figure 13:
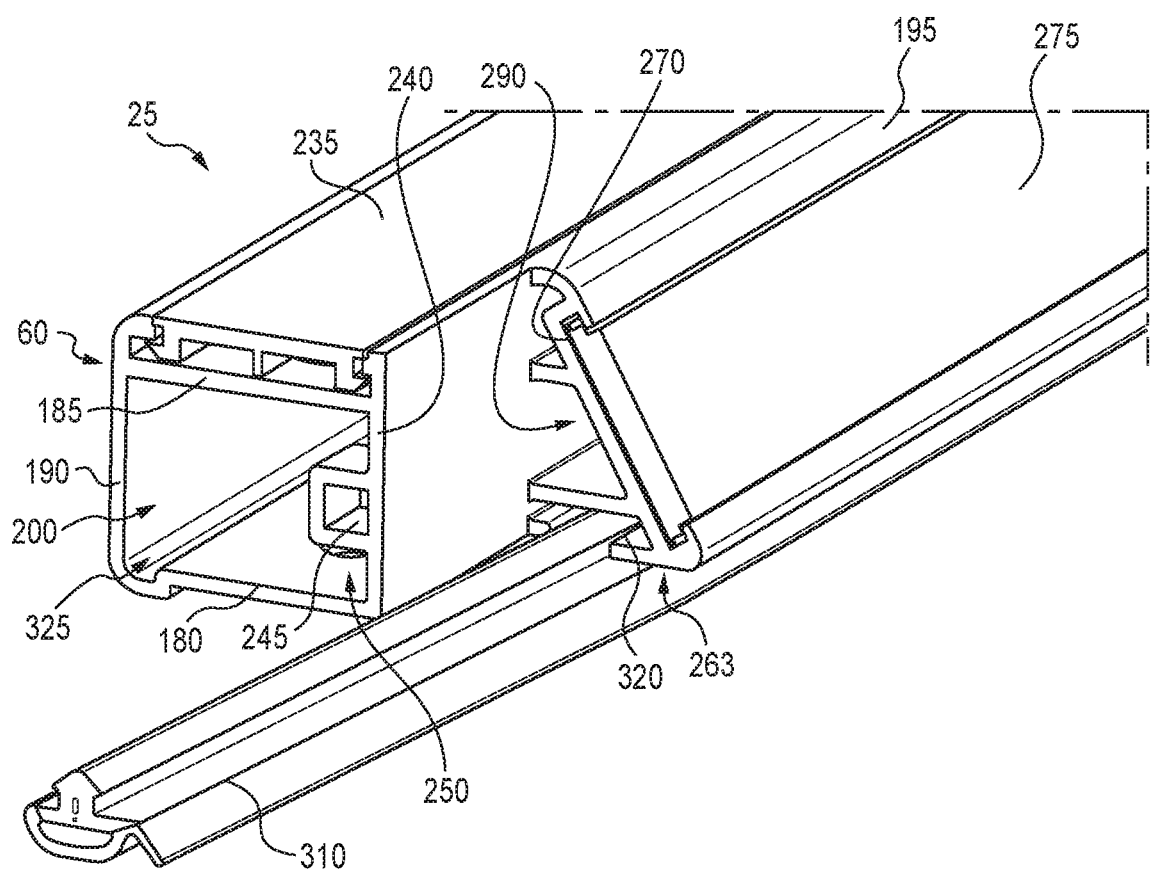
FIG. 13 is a perspective view of a rearward end of a side rail of the tonneau cover assembly according to one aspect of the present disclosure.

The first side rail 25 may receive a portion of the first securing member 55 therein for securing the first securing member 55 to the first side rail 25 in the fixed position. As shown in FIG. 13, the first side rail 25 includes a base 180 that extends along the first side rail 25 and is positionable on the upper surface 30 of the first side wall 11 of the cargo box 10. The first side rail 25 also includes an upper wall 185 that is positioned opposite the base 180, an inboard wall 190 that extends between the base 180 and the upper wall 185, and an outboard wall 195 that extends between the base 180 and the upper wall 185. The base 180, the upper wall 185, and the inboard wall 190 at least partially define a first chamber 200 inside of the first side rail 25. As shown in FIG. 11A, the first securing member 55 includes a first arm 177 that is inserted inside the first chamber 200 and is secured therein in the fixed position.

Figure 14A:
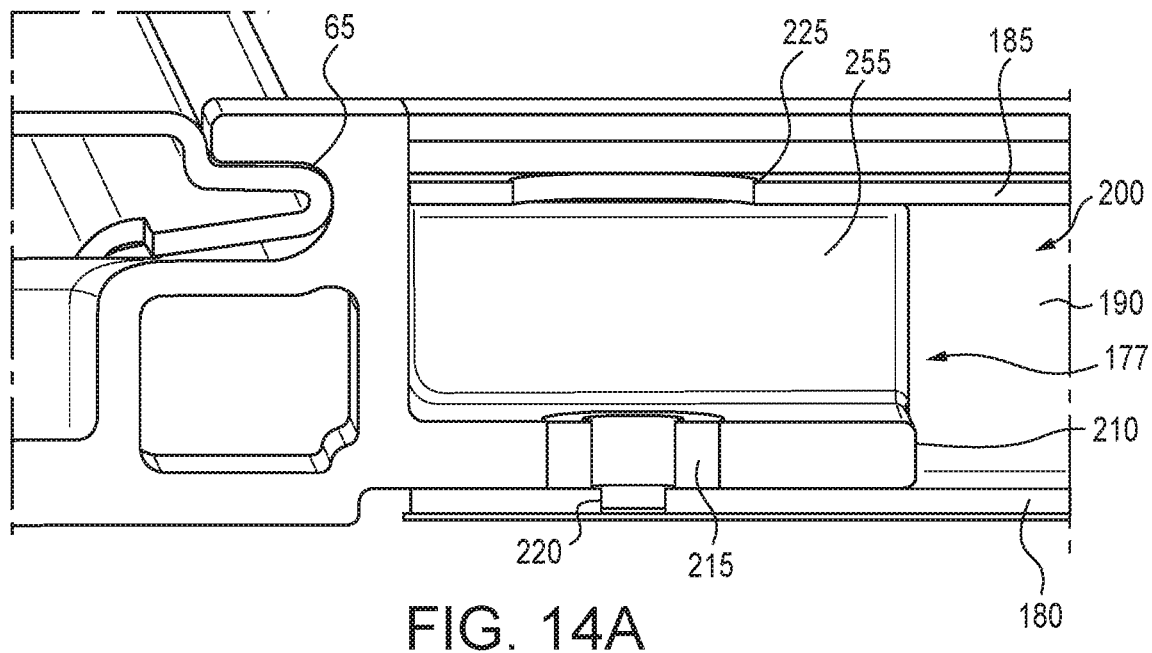
FIG. 14A is a cross-sectional view of the securing member received in a side rail in a fixed position according to one aspect of the present disclosure, the cross-sectional view is taken along a line parallel to the longitudinal axis of the side rail and viewed from the outboard side to the inboard side of the side rail, wherein the flexible cover is removed for illustrative purposes.
Figure 14B:
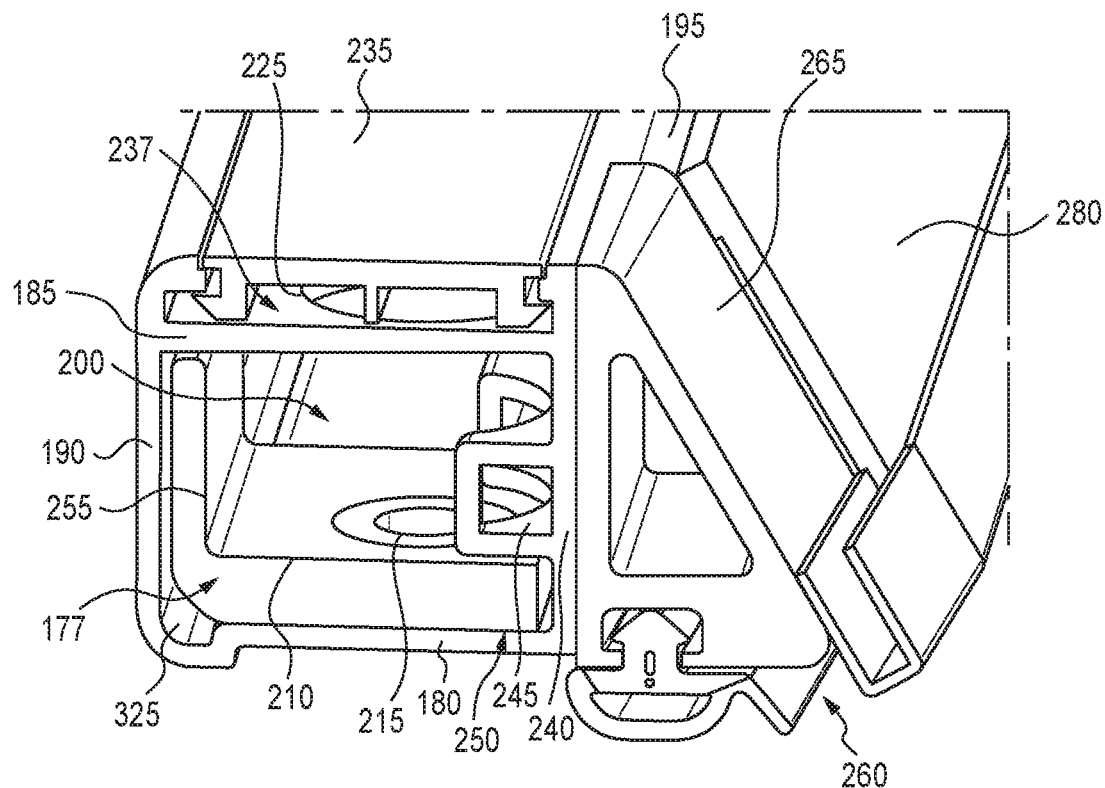
FIG. 14B is a perspective, cross-sectional view of the securing member and the side rail of FIG. 14A taken along a line perpendicular to the longitudinal axis of the side rail and viewed from the rearward end to the forward end of the side rail, wherein a portion of the flexible cover is removed for illustrative purposes.
Figure 15:
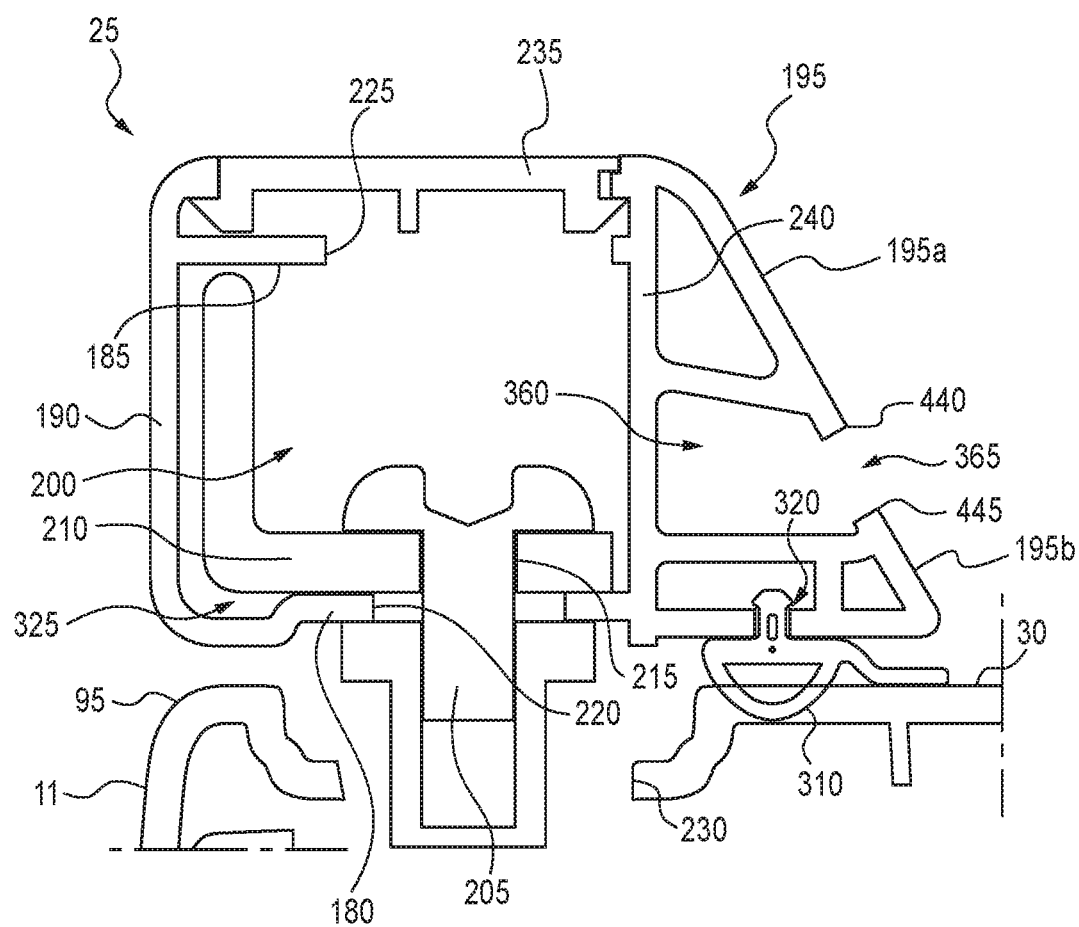
FIG. 15 is a cross-sectional view of the securing member received in the side rail in a fixed position according to one aspect of the present disclosure, the cross-sectional view is taken along a line perpendicular to the longitudinal axis of the side rail and viewed from the rearward end to the forward end of the side rail.

The first arm 177 of the first securing member 55 may be secured to the first side rail 25 by any known method including, but not limited to, adhesives, welds, mechanical fasteners, or any combination thereof. In an illustrative example as shown in FIGS. 14A and 14B, the first arm 177 is provided with a base 210 that is positioned over the base 180 of the first side rail 25 in the first chamber 200. The base 210 of the first arm 177 defines an aperture 215 that is aligned with an aperture 220 defined in the base 180 of the first side rail 25, an aperture 225 defined in the upper wall 185, and an aperture 230 (as shown in FIG. 15) defined in the upper surface 30 of the first side wall 11. Referring to FIG. 15, the first securing member 55 is secured to the first side rail 25 in the fixed position by providing a threaded fastener 205 to the first chamber 200 through the aperture 225. The threaded fastener 205 is then inserted through the aperture 215 in the first arm 177, the aperture 220 in the base 180 of the first side rail 25, and then through the aperture 230 in the upper surface 30 of the first side wall 11 where it is threadingly engaged to the side wall 11 or other part of the vehicle body. By being fixed to both the first side rail 25 and the side wall 11 with the threaded fastener 205, the stability of the first securing member 55 is improved as it is less susceptible to forces applied thereto when the rear rail 45 is rotated between the open position and the closed position. A trim piece 235 is provided in a channel 237 partially defined by the upper wall 185 to cover the aperture 225 and provide a flat upper surface on the first side rail 25 for supporting the flexible cover 50 thereon when the rear rail 45 is in the closed position.

The first securing member 55 and the first side rail 25 may include one or more features for stabilizing the first securing member 55 in the fixed position. In a non-limiting example, the first arm 177 of the first securing member 55 includes a stabilizer 255 extending perpendicularly outward from the base 210 of the first arm 177. As shown in FIG. 14B, when the first arm 177 of the first securing member 55 is in the fixed position with respect to the first side rail 25 the stabilizer 255 is positioned along the inboard wall 190 to prevent the first securing member 55 from rotating in a first direction, such as counterclockwise, about the longitudinal axis of the first side rail 25. Further, the stabilizer 255 may extend to the upper wall 185 to inhibit upward movement of the first securing member 55 in response to movement of the rear rail 45 between the open position and the closed position. In addition to, or alternatively, the first side rail 25 includes an interior wall 240 that extends from the base 180 of the first side rail 25 to the upper wall 185 and partially defines the first chamber 200. A stabilizing member 245 extends from the interior wall 240 in the first chamber 200 toward the inboard wall 190 to define a slot 250 between the stabilizing member 245 and the base 180 of the first side wall 25. The base 210 of the first arm 177 is positioned on the base 180 of the first side rail 25 and extends from the interior wall 240 to the inboard wall 190. Accordingly, a portion of the base 210 of the first arm 177 is positioned in the slot 250 between the stabilizing member 245 and the base 180 of the first side rail 25 to inhibit rotation of the first securing member 55 in either direction about the longitudinal axis of the first side rail 25. Further, the stabilizing member 245 also inhibits upward movement of the first securing member 55 in response to movement of the rear rail 45 between the open position and the closed position.

To provide uninterrupted support along the first side 53 of the flexible cover 50, the first securing member 55 and the first side rail 25 may form a continuous outboard wall 257 that extends to the channel 65 of the first securing member 55. In a non-limiting example, the first securing member 55 includes a second arm 260 extending from the body 80 that is spaced apart from the first arm 177 to define a gap 261 therebetween (as shown in FIG. 11C), and the rearward end 60 of the first side rail 25 extends rearward beyond a rearward end 263 of the outboard wall 195 of the first side rail 25 (as shown in FIG. 13). To form the continuous outboard wall 257, the first arm 177 of the first securing member 55 is placed in the fixed position in the first chamber 200 with a portion of the interior wall 240 positioned between the first arm 177 and the second arm 260 (as shown in FIG. 14B), and an outboard wall 265 of the first securing member 55 that extends along the second arm 260 abuts the outboard wall 195 of the first side rail 25 (as best shown in FIGS. 8A and 8B). Accordingly, the outboard wall 265 of the first securing member 55 and the outboard wall 195 of the first side rail 25 form the continuous outboard wall 257. As shown in FIG. 8A, the end cap 110 of the rear rail 45 may be provided with an outboard surface 110a that also defines part of the continuous outboard wall 257. It is to be understood that the continuous outboard wall 257 may include one or more channels or apertures therein, and that the term continuous describes the outboard wall 265 of the first securing member 55 abutting the outboard wall 195 of the first side rail 25 (and optionally the outboard wall 110a of the rear rail 45) to provide continuous support of the flexible cover 50 along the length of the outboard walls 195, 265 (and optionally 110a).

Figure 16A:
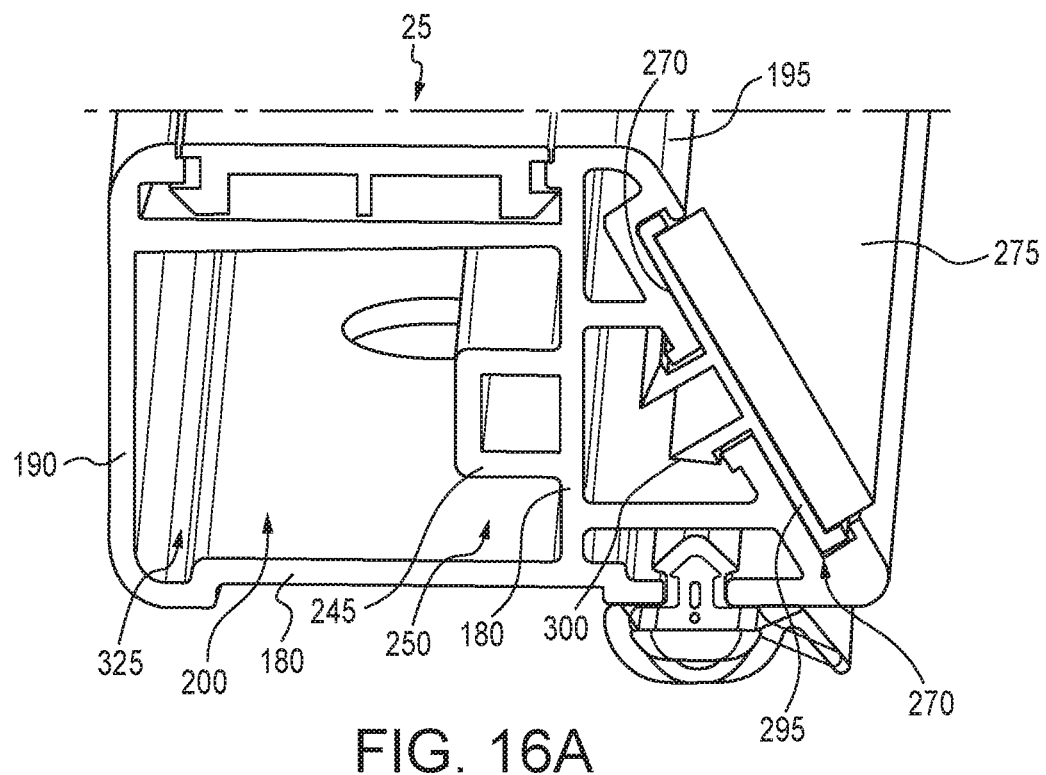
FIG. 16A is a perspective, cross-sectional view of a side rail including one of a hook or loop fastener taken along a line perpendicular to the longitudinal axis of the side rail and viewed from the rearward end to the forward end of the side rail according to one aspect of the present disclosure.
Figure 16B:
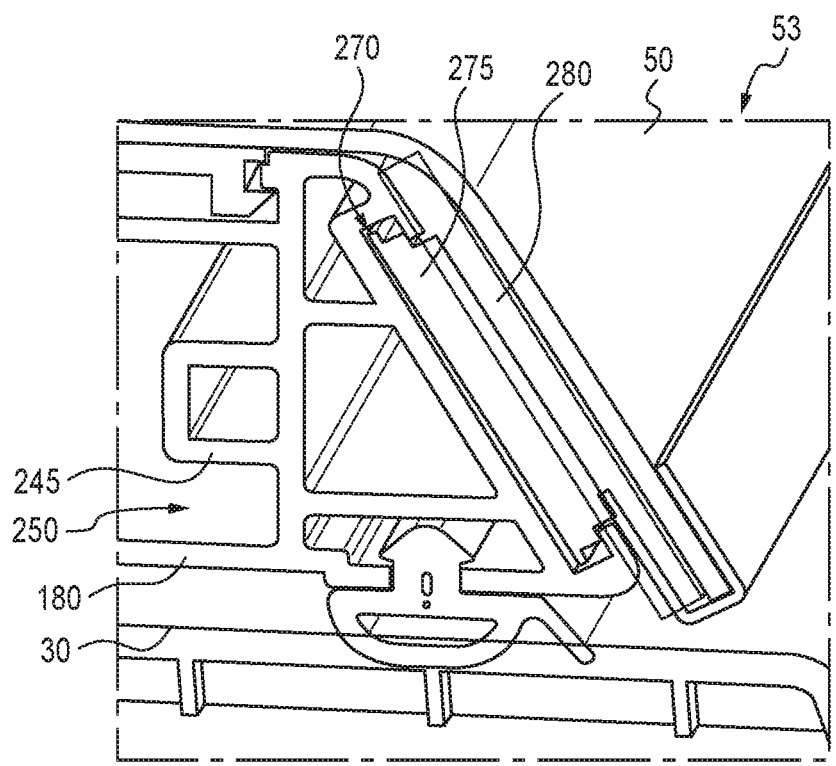
FIG. 16B is a perspective, cross-sectional view of the side rail of FIG. 16A with the one of a hook or loop fastener engaged with the other of the hook or loop fastener of the flexible cover according to one aspect of the present disclosure.

In a non-limiting example, the first securing member 55 may prevent or otherwise inhibit the removal of a flexible cover engagement member positioned on or in the first side rail 25 when the first securing member 55 is in the fixed position. As shown in FIGS. 13, 16A, and 16B, the outboard wall 195 of the first side rail 25 may define a fastener channel 270 for slidingly receiving one of a hook or loop fastener 275 therein that is engageable with the other of a hook or loop fastener 280 secured to the downwardly facing surface 56 along the first side 53 of the flexible cover 50 when the rear rail 45 is in the closed position. The one of a hook or loop fastener 275 may extend along all or a part of the length of the outboard wall 195, and the other of a hook or loop fastener 280 may extend along all or a part of the length of the first side 53 of the flexible cover 50. The fastener channel 270 includes an opening 290 defined by the rearward end 263 of the outboard wall 195, and the second arm 260 of the first securing member 55 is positioned (as shown in FIGS. 8A and 8B) to close the opening 290 of the fastener channel 270 when the first arm 177 of the first securing member 55 is secured in the fixed position to the first side rail 25 to prevent removal of the one of a hook or loop fastener 275 from the fastener channel 270 through the opening 290.

As shown in FIG. 16A, the one of a hook or loop fastener 275 may include a backing 295 that is received in the fastener channel 270. The backing 295 may include an engagement member 300, such as a spring clip, for retaining the backing 295 to the first side rail 25. It is to be understood, however, that the backing 295 may be secured to the first side rail 25 with other types of mechanical fasteners or adhesives. In a non-limiting example, the fastener channel 270 and the backing 295 are the same length and the backing 295 is fixed in the fastener channel 270 by placement of the second arm 260 of the first securing member 55 against the rearward end 263 of the outboard wall 195 of the first side rail 25 to close the opening 290. In another non-limiting example, the backing 295 is shorter than the length of the fastener channel 270 and is free to slide along the length of the fastener channel 270 when the first securing member 55 is positioned against the rearward end 263 of the outboard wall 195 of the first side rail 25 to close the opening 290. Although not shown, it is to be understood that the second side rail 35 and the second side 54 of the flexible cover 50 may be configured in the same way as the first side rail 25 and the first side 53 of the flexible cover 50 so that the second side rail 35 includes one of a hook or loop fastener therein that is engageable with the other of a hook or loop fastener secured to the downwardly facing surface 56 along the second side 54 of the flexible cover 50 when the rear rail 45 is in the closed position.

Figure 17A:
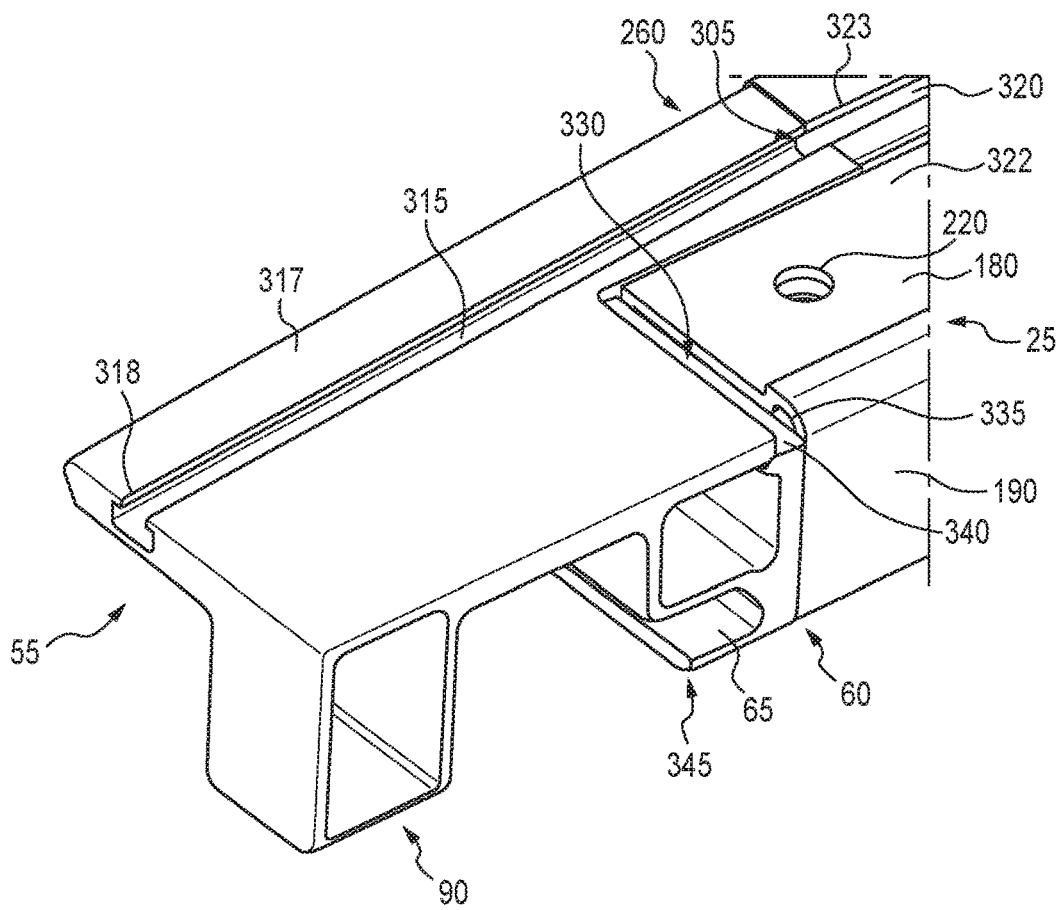
FIG. 17A is a perspective view of an underside of the securing member in a fixed position with respect to a side rail according to one aspect of the present disclosure.
Figure 17B:
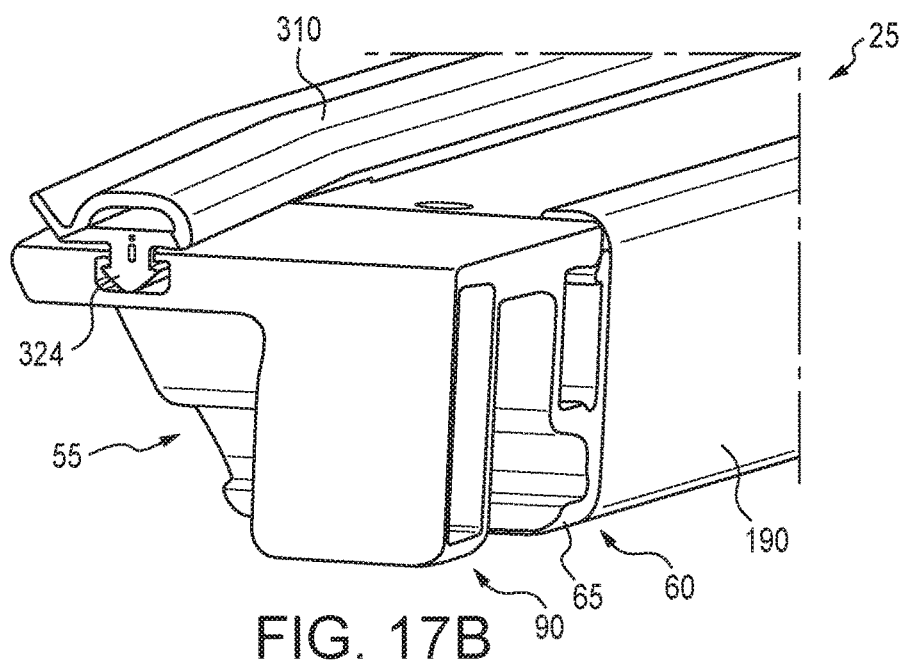
FIG. 17B is a perspective view of the underside of the securing member and the side rail of FIG. 17A with a seal according to one aspect of the present disclosure.

To inhibit water from entering the cargo box 10 when the rear rail 45 is in the closed position, a seal 310 may be provided between the first side rail 25 and the upper surface 30 of the first side wall 11 as shown in FIG. 15. In a non-limiting example as shown in FIGS. 17A and 17B, the first securing member 55 defines a bottom channel 315 that extends along the length of the first securing member 55 and the first side rail 25 defines a bottom channel 320 that extends along the length of the first side rail 25. The bottom channel 315 and the bottom channel 320 are aligned when the first securing member 55 is placed in the fixed position to form a continuous seal channel 305 (as shown in FIG. 17A) for receiving the seal 310 therein (as shown in FIG. 17B) that extends along the length of the first side rail 25 and the first securing member 55. The first securing member 55 includes a lower surface 317 that is positionable on or opposite the upper surface 30 of the first sidewall 11 and defines an opening 318 to the bottom channel 315. The base 180 of the first side rail 25 also includes a lower surface 322 that is positionable on or opposite the upper surface 30 of the first sidewall 11 and defines an opening 323 to the bottom channel 320. As shown in FIG. 17B, a portion 324 of the seal 310 is positioned in the continuous seal channel 305 to secure it to the first securing member 55 and the first side rail 25. As best shown in FIG. 15, the bottom channel 320 of the first side rail 25 is positioned outboard of the interior wall 240 of the first side rail 25, and as best shown in FIG. 17A the bottom channel 315 of the first securing member 55 extends along the second arm 260. Therefore, the continuous seal 310 is positioned outboard of the apertures 215, 220, and 230 to inhibit water from entering the vehicle body and the cargo box 10 when the rear rail 45 is in the closed position.

To the extent that moisture is present inboard of the continuous seal 310, the first side rail 25 and the first securing member 55 may route the water to a desired location in the cargo box 10. In a non-limiting example as best shown in FIG. 16A, the base 180 of the first side rail 25 defines a first drainage channel 325 positioned in the first chamber 200 that extends along the inboard wall 190. As shown in FIG. 17A, when the first arm 177 of the first securing member 55 is received in the first side rail 25 in the fixed position, the first securing member 55, the base 180 of the first side rail 25, and the upper surface 30 of the first side wall 11 (not shown in FIG. 17A) define a second drainage channel 330 that is positioned outside of the first chamber 200 and rearward of the rearward end 60 of the first side rail 25. The second drainage channel 330 is in fluid communication with the first drainage channel 325 via an opening 335 to the first drainage channel 325 that is defined by the rearward end 60 of the first side rail 25 and the underside of the first arm 177. The second drainage channel 330 is positioned to channel water out of the first drainage channel 325 and toward an outlet 340 defined by an inboard side 345 of the first securing member 55 and the inboard wall 190 of the first side rail 25.

It is to be understood that the second side rail 35 can be configured in a mirror image of the first side rail 25 and a second securing member 347 may be secured in a second fixed position with respect to the second side rail 35 in the same manner that the first securing member 55 is secured in a fixed position with respect to the first side rail 25. As shown in FIG. 2, the second securing member 347 may be configured in a mirror image of the first securing member 55 and may include a channel 348, and optionally a latch engagement member 349 for receiving a second latch (not shown) housed in the rear rail 45.

In an embodiment, a method of using the flexible tonneau cover assembly 20 is provided. As shown in FIG. 1, the flexible cover 50 may be rolled about the rear rail 45 and secured adjacent to or on top of the front rail 40 at the forward end 15 of the cargo box 10 in the storage position. From the storage position, the rear rail 45 may be rotated toward the rearward end 13 of the cargo box 10 to unroll the flexible cover 50, and the forward side 70 of the rear rail 45 may be inserted in the channels 65, 348 of the respective securing members 55, 347 to place the rear rail 45 in the open position as shown in FIGS. 5 and 7A. When in the open position, the rearward side 75 of the rear rail 45 is raised with respect to the forward side 70 of the rear rail 45 and the other of the hook or loop fastener 280 of the flexible cover 50 is at least partially disengaged from the one of a hook or loop fastener 275 of the first side rail 25. As shown in FIG. 7B, the rearward side 75 of the rear rail 45 may be lowered until the rear rail 45 is placed in the closed position (FIGS. 4 and 7C) with the latch 120 engaged with the latch engagement member 90 (FIG. 10B) and the other of the hook or loop fastener 280 of the flexible cover 50 engaged with the one of a hook or loop fastener 275 of the first side rail 25 (FIG. 16B). The rear rail 45 may be removed from the closed position by pushing or pulling the actuator 170 inboardly to withdraw the latch 120 from the latch engagement member 90 and rotating the rearward side 75 of the rear rail 45 upwardly with respect to the forward side 70 of the rear rail 45 to the open position (FIGS. 5 and 7A) to reduce the tension in the flexible cover 50 and to at least partially disengage the other of the hook or loop fastener 280 of the flexible cover 50 from the one of a hook or loop fastener 275 of the first side rail 25, thereby allowing the forward side 70 of the rear rail 45 to be withdrawn from the channels 65, 348 of the respective securing members 55, 347. The rear rail 45 may then be rolled toward the forward end 15 of the cargo box 10 to place the rear rail 45 and the flexible cover 50 wrapped thereabout in the storage position as shown in FIG. 1.

Figure 18:
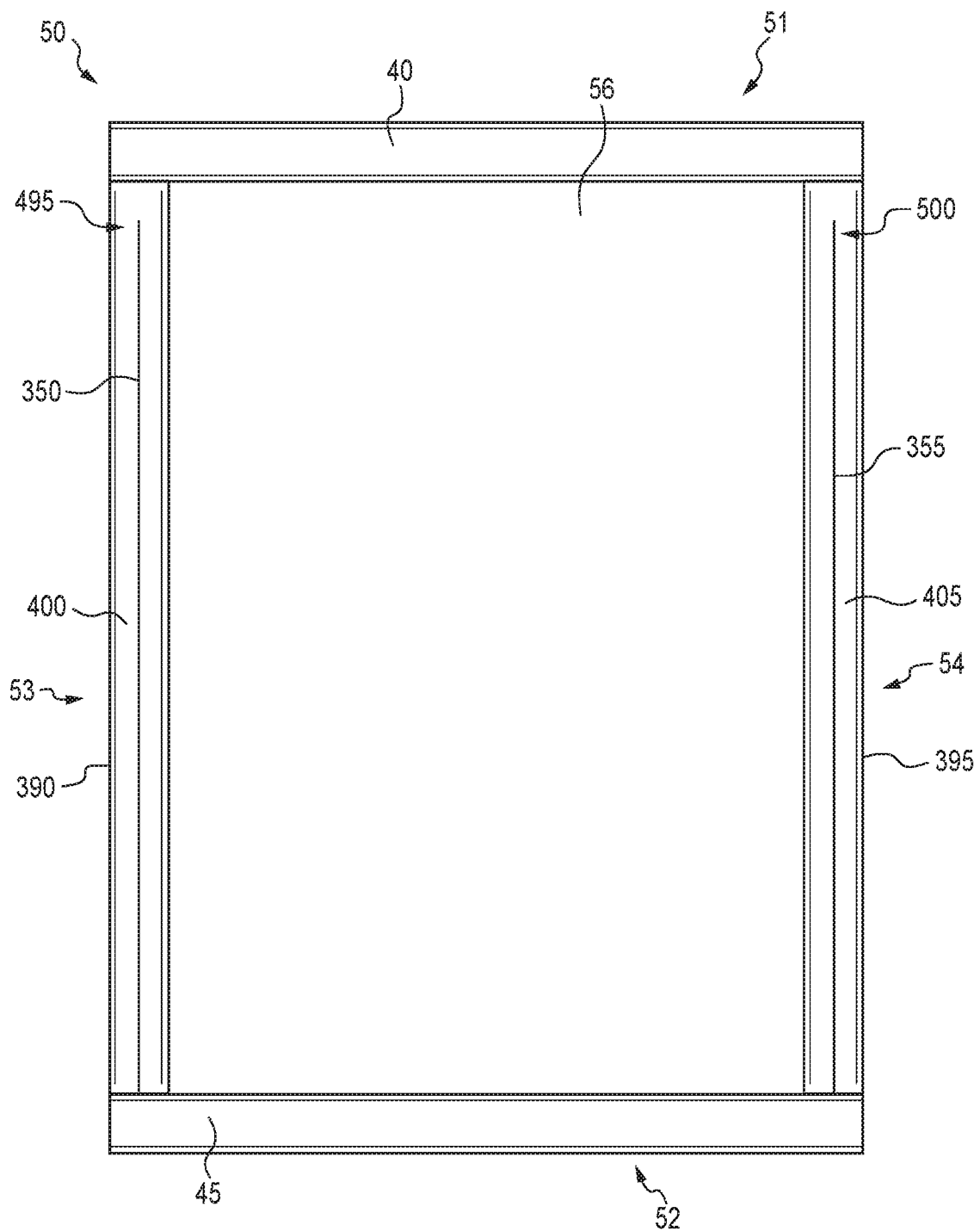
FIG. 18 is a view of a downwardly facing surface of the flexible cover according to one aspect of the present disclosure.

In an embodiment as shown in FIG. 18, the flexible cover 50 includes a first cable 350 and a second cable 355 that are each operatively connected to the rear rail 45. When the rear rail 45 is in the closed position, the flexible cover 50 is placed under tension, the first cable 350 is placed under tension and is positioned in the first side rail 25, and the second cable 355 is placed under tension and is positioned in the second side rail 35. Placement of the tensioned cables 350, 355 in the respective side rail 25, 35 when the rear rail 45 is in the closed position secures the flexible cover 50 to the first side rail 25 and the second side rail 35, and maintains cross tension between the first side 53 and the second side 54 of the flexible cover 50. Accordingly, the cables 350, 355 may be comprised of any material capable of generating tension as the rear rail 45 is moved from the open position to the closed position. In a non-limiting example, the cables 350, 355 may comprise an elastic material. In a non-limiting example, the cables 350, 355 may include one or more tension members, such as a spring. When the rear rail 45 is returned to the open position from the closed position, the cables 350, 355 are untensioned and are removable or at least partially removed from the respective side rail 25, 35. In a non-limiting example, the cables 350, 355 are untensioned and at least partially removed from the respective side rails 25, 35 when the rear rail 45 is moved from the closed position to the open position. In a non-limiting example, the cables 350, 355 are untensioned when the rear rail 45 is moved from the closed position to the open position, and the cables 350, 355 are removed from the respective side rail 25, 35 when the rear rail 45 is then rotated from the open position to the storage position at the forward end 15 of the cargo box 10 as shown in FIG. 1.

With reference to FIGS. 15 and 19A, the first side rail 25 is positionable on or adjacent the upper surface 30 of the first side wall 11 and defines a first continuous channel 360 that has a length extending along the longitudinal axis of the first side rail 25. The outboard wall 195 of the first side rail 25 defines a first continuous opening 365 to the first continuous channel 360 that also has a length extending along the longitudinal axis of the first side rail 25. Similarly, the second side rail 35 (FIG. 19B) is positionable on or adjacent the upper surface 37 of the second side wall 12 and defines a second continuous channel 375 that has a length extending along the longitudinal axis of the second side rail 35. The outboard wall 380 of the second side rail 35 defines a second continuous opening 385 to the second continuous channel 375 that also has a length extending along the longitudinal axis of the second side rail 35. The rear rail 45 is removably engageable with the first side rail 25 and the second side rail 35 and is rotatable between the open position and the closed position. When the rear rail 45 is placed in the open position as shown in FIGS. 20A and 21, the rearward side 75 of the rear rail 45 is raised and the first cable 350 is untensioned and is at least partially positioned outside of the first continuous channel 360 and the second cable 355 is untensioned and is at least partially positioned outside of the second continuous channel 375. When the rear rail 45 is placed in the closed position as shown in FIGS. 19A, 19B and 20C, the rearward side 75 of the rear rail 45 is lowered and the first cable 350 is positioned in the first continuous channel 360 via the first continuous opening 365 under tension to secure the first side 53 of the flexible cover 50 to the first side rail 25, and the second cable 355 is positioned in the second continuous channel 375 via the second continuous opening 385 under tension to secure the second side 54 of the flexible cover 50 to the second side rail 35.

As shown in FIG. 18, the first cable 350 may be positioned on the downwardly facing surface 56 of the flexible cover 50 inward of an edge 390 of the first side 53 of the flexible cover 50, and the second cable 355 may be positioned on the downwardly facing surface 56 of the flexible cover 50 inward of an edge 395 of the second side 54 of the flexible cover 50. The edges 390, 395 of the flexible cover 50 may extend continuously without interruptions, such as notches or cutouts, from the forward end 51 to the rearward end 52 of the flexible cover 50. The flexible cover 50 may include a first flange 400 positioned adjacent to or forming at least a portion of the edge 390 and a second flange 405 positioned adjacent to or forming at least a portion of the edge 395. The first flange 400 and the second flange 405 may be comprised of the same material, or a different material, than the flexible cover 50. In an illustrative example, the first flange 400 and the second flange 405 comprise a material that is more rigid than the material forming the rest of the flexible cover 50, but is still flexible enough to allow the flexible cover 50 to be rolled to the storage position. It is to be understood that the first flange 400 may extend continuously along the first side 53 of the flexible cover 50 from the front rail 40 to the rear rail 45, and the second flange 405 may extend continuously along the second side 54 of the flexible cover 50 from the front rail 40 to the rear rail 45. In a non-limiting example, the first flange 400 is positioned on the downwardly facing surface 56 and extends continuously along the first side 53 of the flexible cover 50 the entire length of the first continuous channel 360 and the second flange 405 is positioned on the downwardly facing surface 56 and extends continuously along the second side 54 of the flexible cover 50 the entire length of the second continuous channel 375.

The flanges 400, 405, the cables 350, 355, and the side rails 25, 35 may be configured to maintain a desirable appearance of the flexible cover 50 when the rear rail 45 is in the closed position and the flexible cover 50 is secured to the side rails 25, 35. As shown in FIG. 20C, the flanges 400, 405 and the cables 350, 355 of the flexible cover 50 interact with the side rails 25, 35 to allow the first side 53 of the flexible cover 50 to extend parallel to the outboard wall 195 of the first side rail 25 and the second side 54 of the flexible cover 50 to extend parallel to the outboard wall 380 of the second side rail 35 when the rear rail 45 is in the closed position, thereby giving the upwardly facing surface 57 along the first side 53 and the second side 54 of the flexible cover 50 a smooth appearance. To prevent the cables 350, 355 from disrupting the smooth appearance of the flexible cover 50, the first cable 350 may extend through at least a portion of the first flange 400 and the second cable 355 may extend through at least a portion of the second flange 405 as shown in FIGS. 20A, 20B, and 20C. The outboard wall 195 of the first side rail 25 includes a first outer surface 195a separated from a second outer surface 195b by the first continuous opening 365 through which the first cable 350 is received into the first continuous channel 360. Similarly, the outboard wall 380 of the second side rail 35 includes a first outer surface 380a separated from a second outer surface 380b by the second continuous opening 385 through which the second cable 355 is received into the second continuous channel 375. When the rear rail 45 is in the closed position the first flange 400 extends over and parallel to the first outer surface 195a and the second outer surface 195b with the first cable 350 positioned under tension in the first continuous channel 360, and the second flange 405 extends over and parallel to the first outer surface 380a and the second outer surface 380b with the second cable 355 positioned under tension in the second continuous channel 375 (FIG. 20C). Therefore, the outer surfaces 195a, 195b engage and support the first flange 400 and the outer surfaces 380a, 380b engage and support the second flange 405 as the cables 350, 355 maintain cross tension between the first side 53 and the second side 54 of the flexible cover 50 to inhibit buckling or other distortion of the flexible cover 50 along the continuous openings 365, 385 of the outboard walls 195, 380 when the rear rail 45 is in the closed position. As shown in FIGS. 20A, 20B, and 20C, the second outer surface 195b of the first side rail 25 may be positioned outboard of the first outer surface 195a of the first side rail 25, and the second outer surface 380b of the second side rail 35 may be positioned outboard of the second outer surface 380b of the second side rail 35.

The flanges 400, 405 may include one or more features capable of engaging the side rails 25, 35 when the rear rail 45 is in the closed position to retain the cables 350, 355 in the respective side rails 25, 35 when a force, such as that caused by the accumulation of snow or ice, is applied to the upwardly facing surface 57 of the flexible cover 50. In a non-limiting example as shown in FIGS. 20A, 20B, and 20C, the first flange 400 includes an arm 430 extending outwardly therefrom that terminates at a head 435 through which the first cable 350 extends. The head 435 has a width (or diameter) that is less than a width of the first continuous opening 365, as measured from an edge 440 of the first outer surface 195a positioned along the first continuous opening 365 to an edge 445 of the second outer surface 195b positioned along the first continuous opening 365, so that the head 435 can pass through the first continuous opening 365 and into the first continuous channel 360 as shown in FIG. 20C. Similarly, the second flange 405 includes an arm 450 extending outwardly therefrom that terminates at a head 455 through which the second cable 355 extends. The head 455 has a width (or diameter) that is less than a width of the second continuous opening 385 as measured from an edge 460 of the first outer surface 380a positioned along the second continuous opening 385 to an edge 465 of the second outer surface 380b positioned along the second continuous opening 385 so that the head 455 can pass through the second continuous opening 385 and into the second continuous channel 375 as shown in FIG. 20C. The arm 430 and the head 435 may extend continuously along the length of the first flange 400, and the arm 450 and the head 455 may extend continuously along the length of the second flange 405.

In the event a downward force is applied to the upwardly facing surface 57 of the flexible cover between the side rails 25, 35 when the rear rail 45 is in the closed position, the sides 53, 54 of the flexible cover 50 are drawn inboardly until the arms 430, 450 engage the respective edges 440, 460 of the side rails 25, 35 to inhibit further inboard movement of the sides 53, 54 of the flexible cover 50. Therefore, the arms 430, 450 may be configured to act as anchors to help retain the cables 350, 355 in the respective channels 360, 375. As shown in FIG. 20B, the arms 430, 450 may extend at an acute angle 'α' from their respective flange 400, 405 in an inboard direction (away from the edges 390, 395) to increase the retention capabilities of the arms 430, 450. In addition, the head 435, 455 of each arm 430, 450 may be sized or otherwise positioned to engage the respective edge 440, 460 as the heads 435, 455 are inserted in and withdrawn from the respective channel 360, 375. As shown in FIG. 20C, the arms 430, 450 are positioned substantially parallel to the upwardly facing surface 57 of a portion of the flexible cover 50 positioned between the first side rail 25 and the second side rail 35, and a portion of each head 435, 455 extends upwardly from the respective arm 430, 450 when the rear rail 45 is in the closed position. In the event a large enough downward force is applied to the upwardly facing surface 57 of the flexible cover 50 to begin withdrawing the arms 430, 450 from the respective channel 360, 375, the heads 435, 455 will engage the respective edges 440, 460 of the side rails 25, 35 to inhibit further inboard movement of the sides 53, 54 of the flexible cover 50. Therefore, the head 435, 455 increases the amount of force necessary to remove the arms 430, 450 (and the cables 350, 355) from the respective channel 360, 375 when the rear rail 45 is in the closed position.

Figure 22:
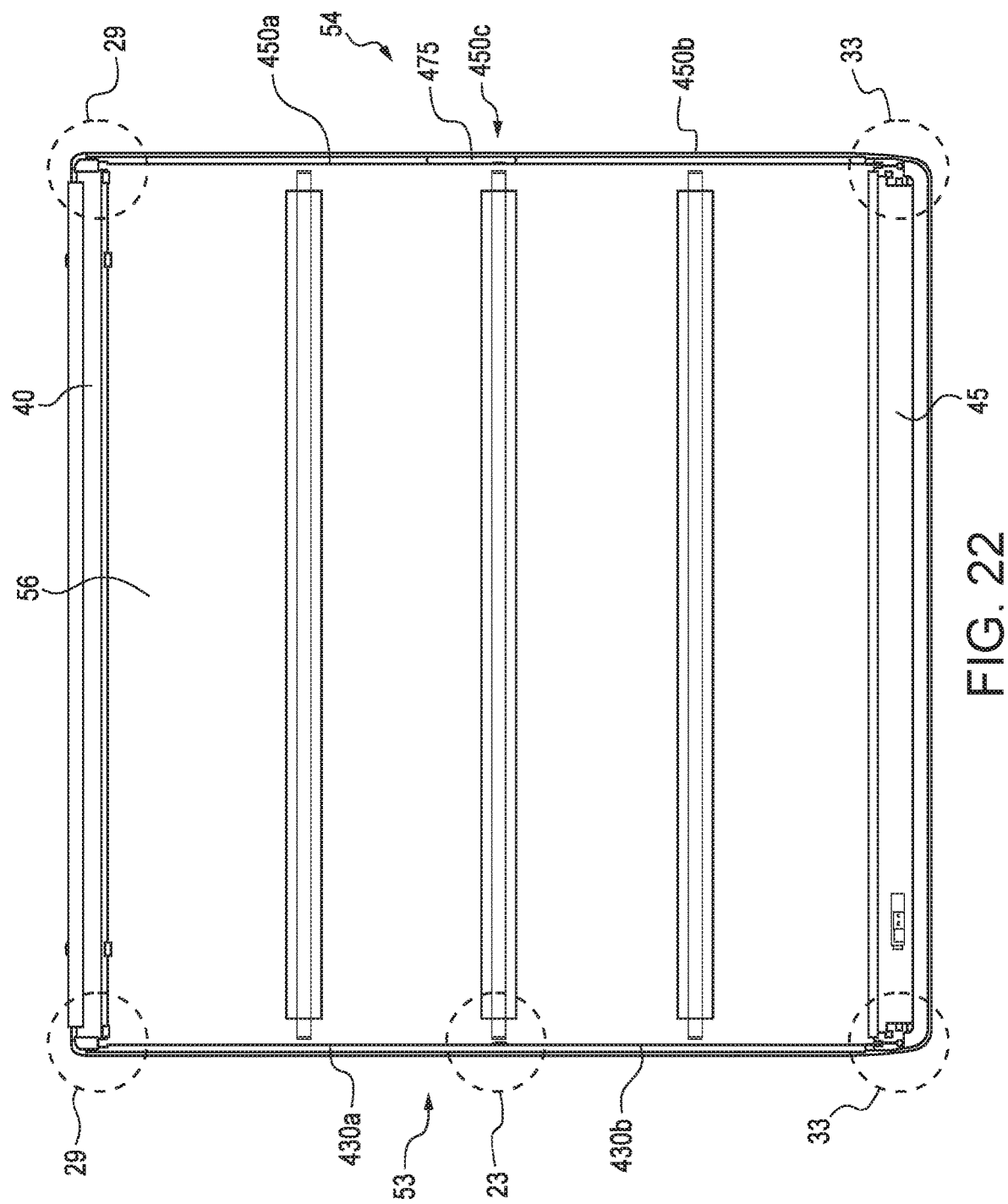
FIG. 22 is a view of the downwardly facing surface of the flexible cover according to one aspect of the present disclosure.
Figure 23:
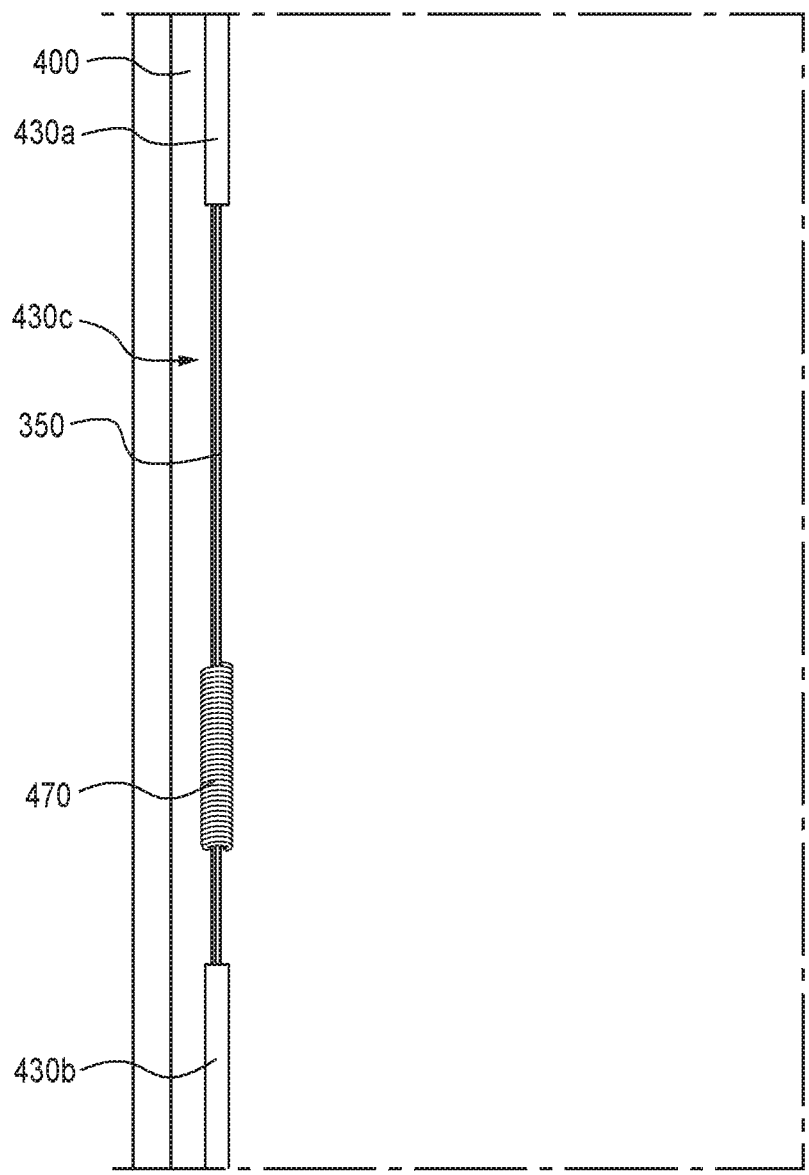
FIG. 23 is a portion of a view of FIG. 22 enlarged for magnification purposes.

Although the arms 430, 450 are described above as extending continuously along the length of the respective flanges 400, 405, they are not limited to such a configuration. In a non-limiting example as shown in FIGS. 22 and 23, the arm 430 may include a first part 430a spaced apart from a second part 430b to define a gap 430c therebetween, and the arm 450 may include a first part 450a spaced apart from a second part 450b to define a gap 450c therebetween. The first cable 350 may be provided with a first spring 470 that is positioned in the gap 430c along the first side 53 of the flexible cover 50 between the first part 430a and the second part 430b, and the second cable 355 may be provided with a second spring 475 positioned in the gap 450c between the first part 450a and the second part 450b. The springs 470, 475 are tension springs that are positioned in the respective continuous channels 360, 375 and are stretched when the rear rail 45 is in the closed position to maintain the desired tension of the flexible tonneau cover assembly 20. For example, the springs 470, 475 improve the durability of the flexible tonneau cover assembly 20 by offsetting weathering of other components that might over time lead to a decrease in the desired tension when the rear rail 45 is in the closed position.

Figure 24:
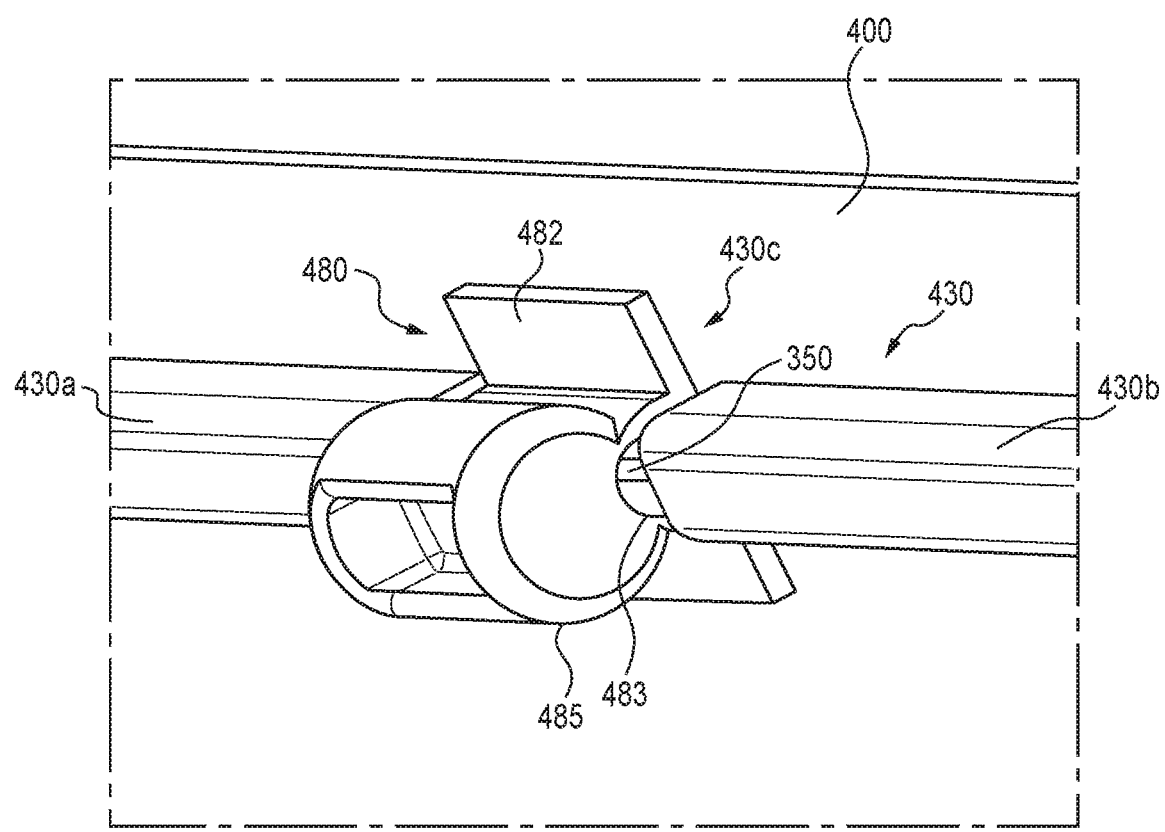
FIG. 24 is a perspective view of a clamp member according to one aspect of the present disclosure.
Figure 25:
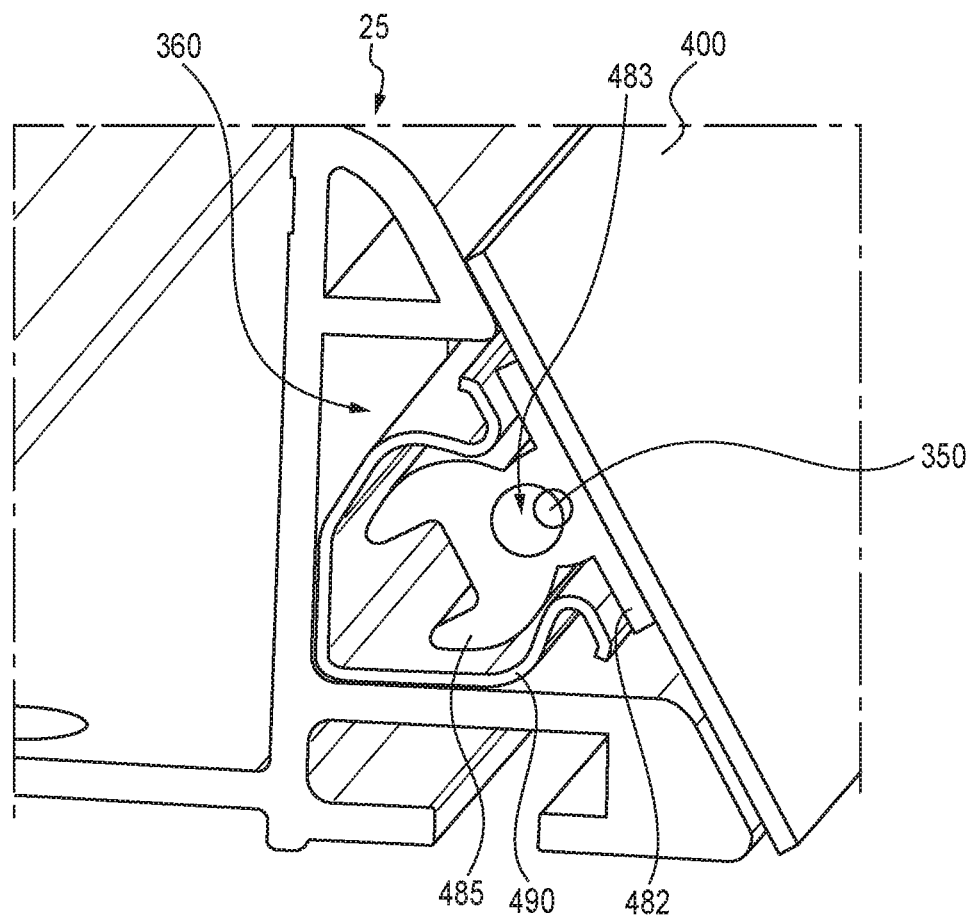
FIG. 25 is a perspective, cross-sectional view taken along a line perpendicular to the longitudinal axis of a side rail and viewed from the rearward end to the forward end of the side rail with the clamp member engaged with the side rail according to one aspect of the present disclosure, wherein a portion of the flexible cover is removed for illustrative purposes.
Figure 26:
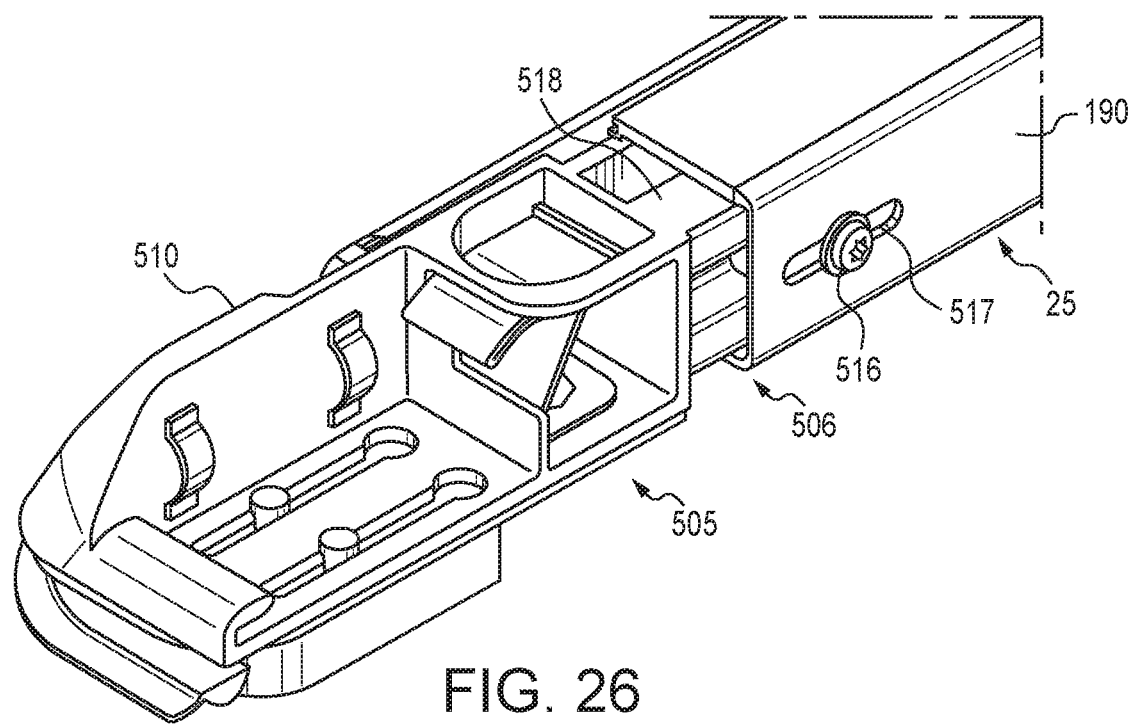
FIG. 26 is a perspective view of a carriage movably secured to a side rail according to one aspect of the present disclosure.
Figure 27:
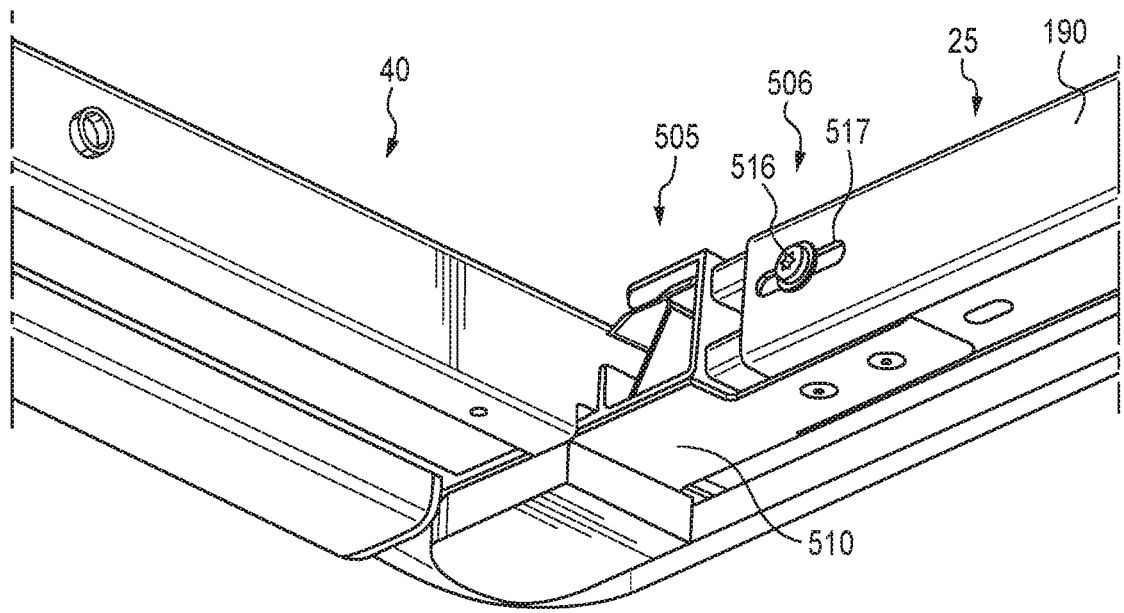
FIG. 27 is a perspective view of the bottom of the carriage of FIG. 26 that is engaged with a front rail according to one aspect of the present disclosure, wherein the flexible cover is removed for illustrative purposes.

In addition to, or alternatively, a clamp member 480 may be positioned along the first flange 400 to help maintain engagement of the flexible cover 50 with the side rails 25, 35 when the rear rail 45 is in the closed position. As shown in FIG. 24 the clamp member 480 is positioned in the gap 430c between the first part 430a and the second part 430b of the arm 430. The clamp member 480 includes a base 482 defining a chamber 483 therein and a body 485 that extends outwardly beyond the first part 430a and the second part 430b. The first cable 350 extends through the first part 430a, the chamber 483 of the clamp member 480, and the second part 430b. As shown in FIG. 25, the first part 430a, the second part 430b, and the clamp member 480 are positioned in the first continuous channel 360 and the body 485 of the clamp member 480 is removably secured to a spring clamp 490 positioned in the first continuous channel 360 of the first side rail 25 when the rear rail 45 is in the closed position. The base 482 of the clamp member 480 may be secured to the first flange 400 with an adhesive, stiches, or any other known securing mechanism. Alternatively, the clamp member 480 may only be secured in the gap 430c by the presence of the first cable 350 in the chamber 483. The chamber 483 may be oversized (having a diameter larger than the diameter of the first cable 350) to allow for movement of the clamp member 480 with respect to the first flange 400 to facilitate insertion and withdrawal of the clamp member 480 into and out of the first continuous channel 360. Although not shown, it is understood that the arm 430 may be provided with a plurality of gaps along the length of the arm 430, and that a plurality of clamp members 480 may be provided with at least one clamp member 480 positioned in each gap of the arm 430. It is also to be understood that one or more clamp members 480 may be positioned in one or more gaps provided in the second arm 450 along the second flange 405 that are configured to operate in the same manner with the second cable 355 and the second side rail 35 as the clamp member 480 operates with the first cable 350 and the first side rail 25.

In a non-limiting example, it may be desirable to secure a forward end 495 of the first cable 350 and a forward end 500 of the second cable 355 to the respective side rail 25, 35 instead of the front rail 40. As shown in FIGS. 26, 27, 28A, and 28B, the front rail 40 may be biased by a separate tensioning system 505 toward the forward end 15 of the cargo box 10. The tensioning system 505 may include a carriage 510 that is movably secured to a forward end 506 of the first rail 25 and a carriage 511 (FIG. 19B) movably secured to a forward end 507 of the second rail 35. The carriages 510, 511 are biased outward from the forward end 506, 507 of the respective side rail 25, 35 by, for example, by a compression spring 515. A screw 516 is inserted through a slot 517 in the first side rail 25 and is received in a tail 518 of the carriage 510 that is positioned inside the first chamber 200 at the forward end 506 of the first side rail 25. The screw 516 and the slot 517 serve to movably secure the carriage 510 to the first side rail 25 and allow for the range of movement of the carriage 510 to be limited by the length of the slot 517. The carriage 510 includes a spring clip 519 for removably securing the front rail 40 thereto.

When the front rail 40 is engaged with the carriage 510 and the rear rail 45 is placed in the closed position, the spring 515 pushes the carriage 510 and the front rail 40 toward the forward end 15 of the cargo box 10 to apply a desired amount of tension in the flexible cover 50 between the front rail 40 and the rear rail 45. If the cables 350, 355 are secured to the front rail 40, the tensioning force applied by the cables 350, 355 to the rear rail 45 could be offset or otherwise counteracted by the tensioning force of the compression spring 515. Accordingly, the cables 350, 355 may be secured to the respective side rails 25, 35 instead of the front rail 40 to isolate the tensioning force applied to the rear rail 45 by the cables 350, 355 from the tensioning force applied to the front rail 40 by the compression spring 515 when the rear rail 45 is in the closed position.

Figure 29:
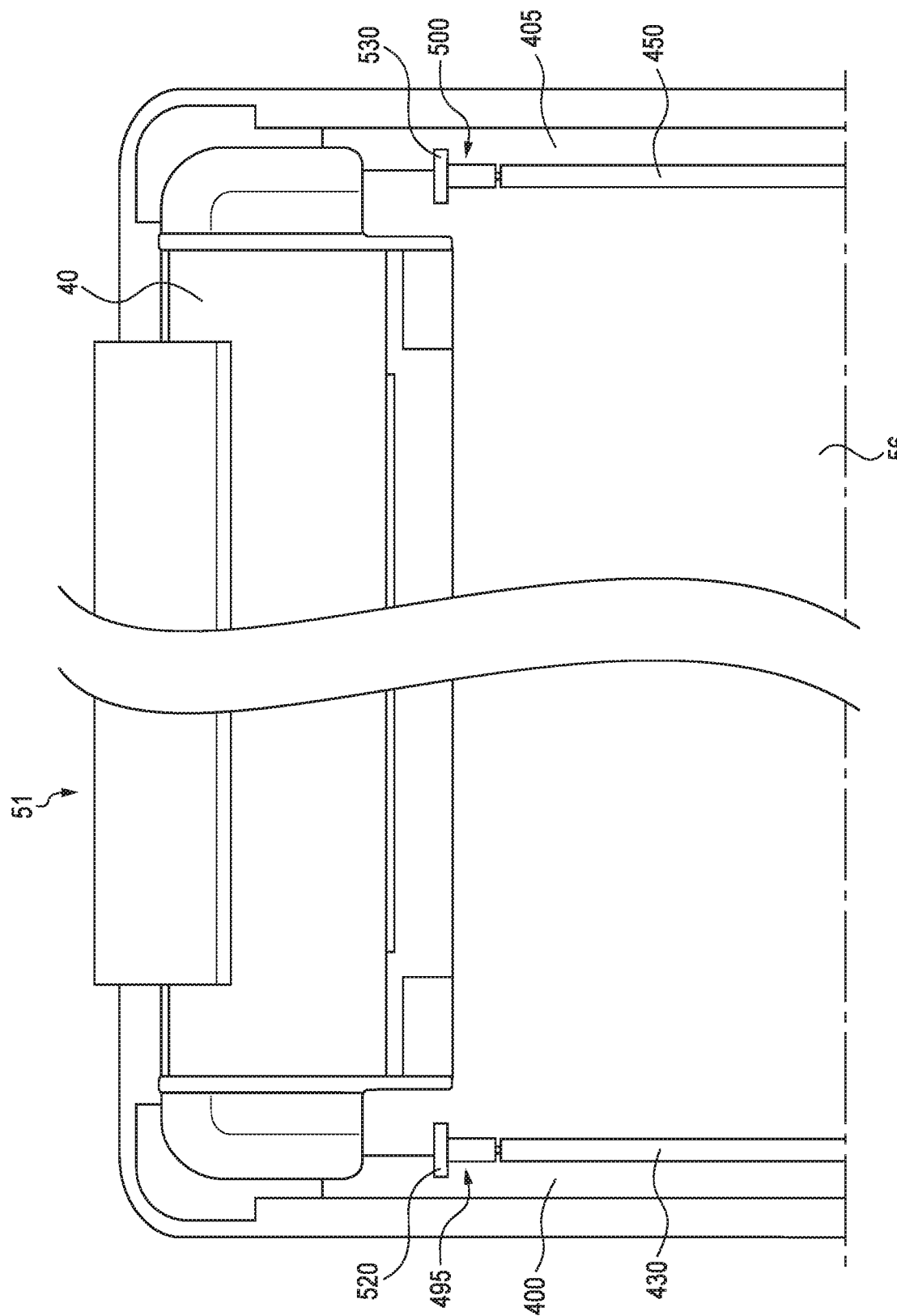
FIG. 29 includes portions of a view of FIG. 22 enlarged for magnification purposes.
Figure 30:
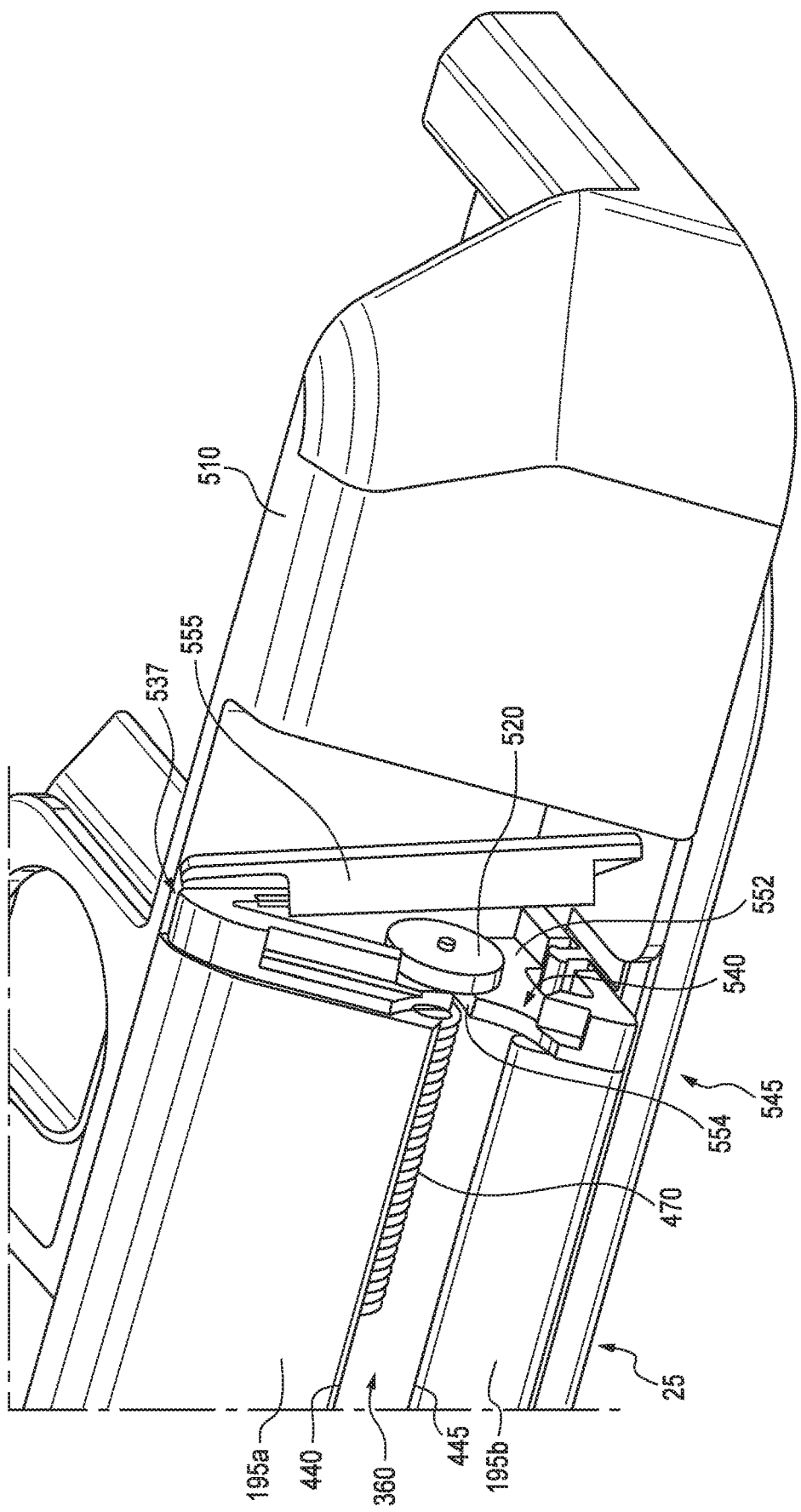
FIG. 30 is a perspective view of the forward end of the first side rail with the first cable positioned in the continuous channel of the first side rail and the head of the first cable engaged with a catch according to one aspect of the present disclosure, wherein the flexible cover is removed for illustrative purposes.
Figure 31A:
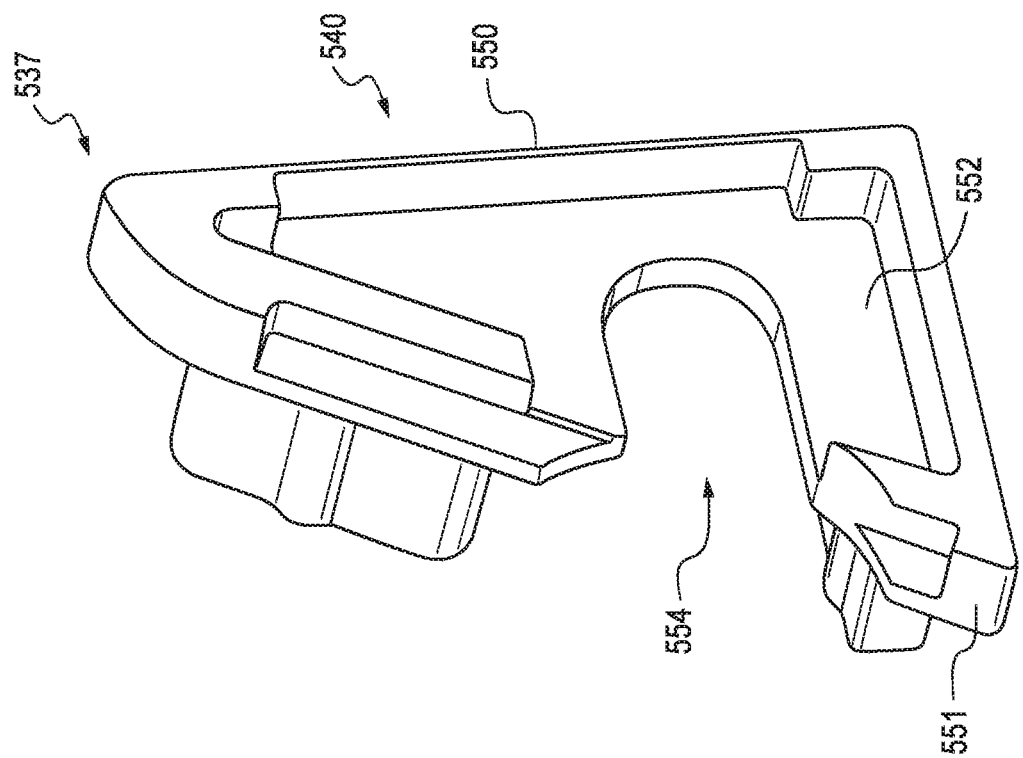
FIG. 31A is a perspective view of a forward facing surface of a catch according to one aspect of the present disclosure.
Figure 31B:
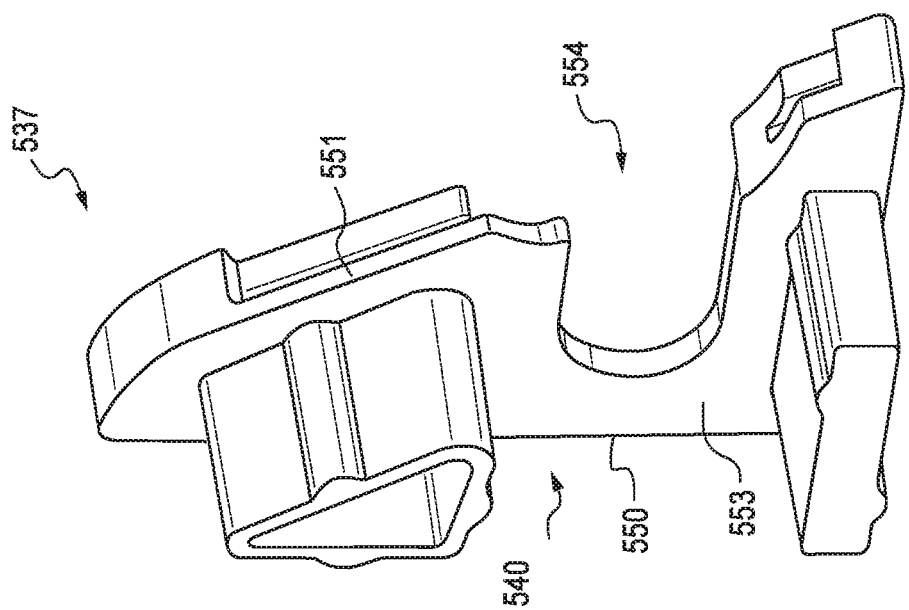
FIG. 31B is a perspective view of a rearward facing surface of the catch of FIG. 31A according to one aspect of the present disclosure.
Figure 32A:
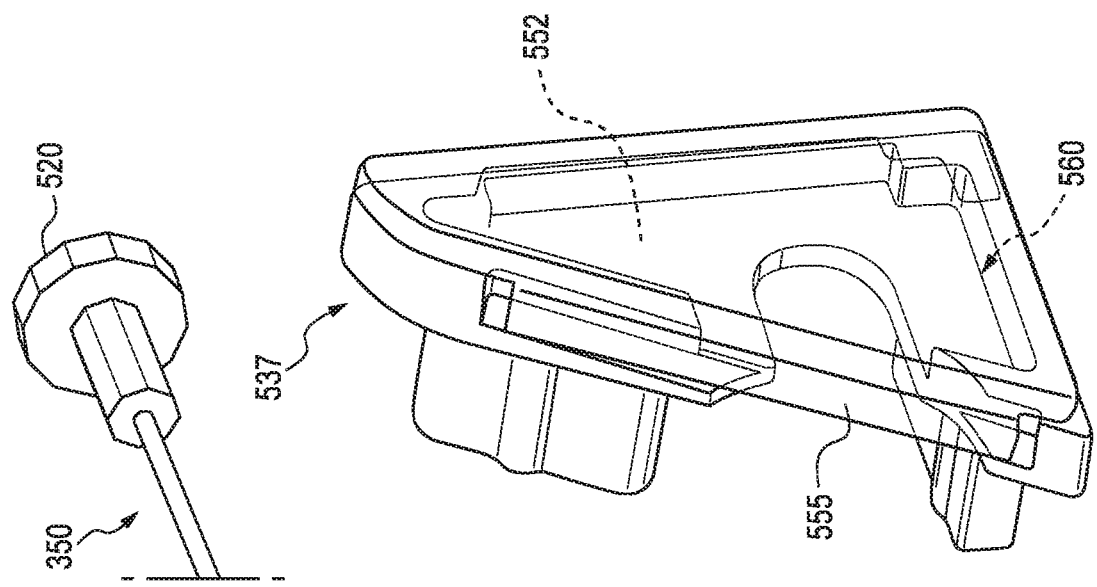
FIG. 32A is a perspective view of a catch including a cover according to one aspect of the present disclosure.
Figure 32B:
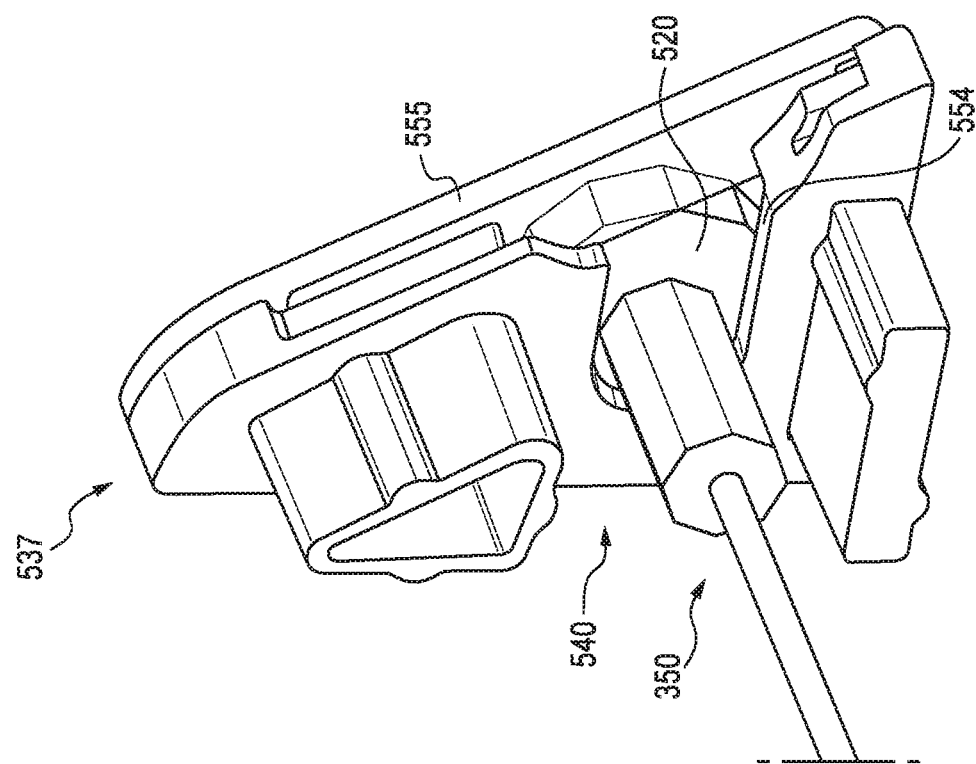
FIG. 32B is a perspective view of the catch of 32A with the head of the first cable positioned in a chamber defined by the catch when the cover is closed according to one aspect of the present disclosure, wherein the flexible cover is removed for illustrative purposes.

To secure the cables 350, 355 to the side rails 25, 35, the forward ends 495, 500 of the cables 350, 355 may terminate at a head 520, 530 that is positioned apart from the front rail 40 as shown in FIG. 29. The head 520, 530 engages the respective side rail 25, 35 when the rear rail 45 is in the closed position, and the head 520, 530 is disengagable from the respective side rail 25, 35 when the rear rail 45 is returned to the open position from the closed position. To facilitate engagement and disengagement of the head 520, 530 with the respective side rail 25, 35, the side rail 25, 35 may be provided with a catch 537 that anchors the heads 520, 530 to the side rails 25, 35 as shown in FIG. 30 (with respect to the first cable 350 and the first side rail 25). The catch 537 may be in the form of a cap that is inserted in the forward end 506 of the first side rail 25, and includes a wall 540 that is positioned at a forward end 545 of the first continuous channel 360. As shown in FIGS. 31A and 31B, the wall 540 may include an inboard side 550, an outboard side 551, a forward facing surface 552, a rearward facing surface 553, and a channel 554 defined in the wall 540 that extends from the forward facing surface 552 to the rearward facing surface 553. As shown in FIGS. 32A and 32B, the head 520 of the first cable 350 is positionable forward of the forward facing surface 552 of the wall 540 with the first cable 350 extending through the channel 554 of the catch 537. When the rear rail 45 is lowered to the closed position, the head 520 is pulled rearward into engagement with the forward facing surface 552 of the wall 540 to place the first cable 350 under tension. When the rear rail 45 is raised to the open position, the head 520 is disengaged from the forward facing surface 552 and the first cable 350 is untensioned and is removable from the channel 554 of the catch 537.

The catch 537 may be provided with a cover 555 that when closed, defines a chamber 560 with the forward facing surface 552 that houses the head 520 therein to prevent removal of the first cable 350 from the channel 554. When the cover 555 is closed as shown in FIGS. 32A and 32B (with the cover 555 shown as transparent for illustrative purposes), the cover 555 is positioned a sufficient distance from the forward facing surface 552 to allow the head 520 to travel forwardly and rearwardly in the chamber 560 during movement of the rear rail 45 between the open position and the closed position. For example, when the rear rail 45 is rotated to the closed position the head 520 travels rearwardly to engage the forward facing surface 552 to place the first cable 350 under tension. When the rear rail 45 is rotated from the closed position to the open position, the head 520 is capable of moving forwardly to disengage from the forward facing surface 552 and the cover 555 can be opened to allow the first cable 350 to be removed from the channel 554 of the catch 537. In a non-limiting example, the cover 555 is integral with the wall 540, and is connected thereto by a living hinge. As shown in FIG. 30, the first spring 470 may be positioned adjacent the head 520 of the first cable 350 rather than near the middle of the first cable 350 as shown in FIGS. 22 and 23.

Figure 34:
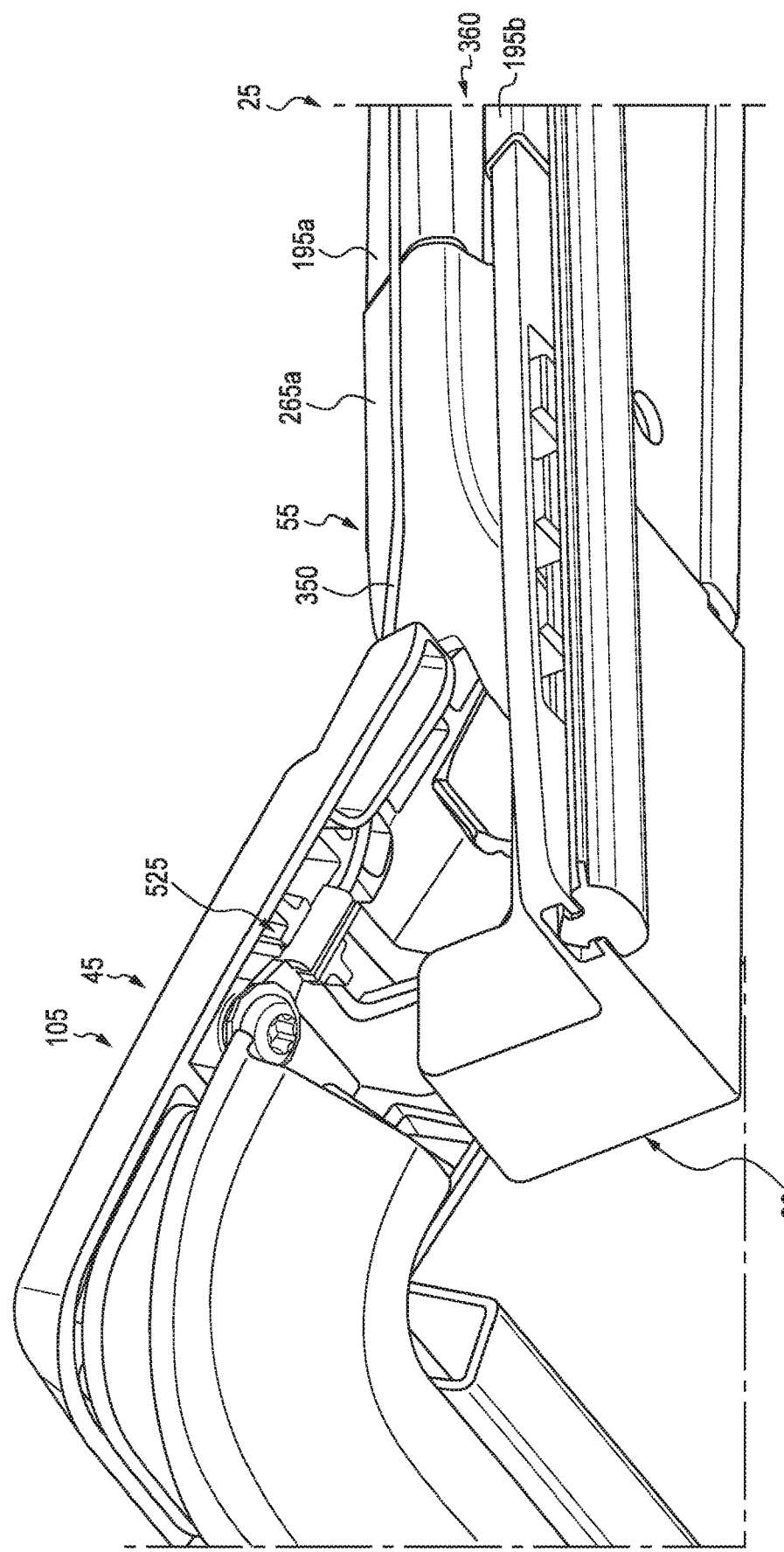
FIG. 34 is a perspective view of the underside of the rear rail that is positioned in the open position according to one aspect of the present disclosure, wherein the flexible cover and the cargo box are removed for illustrative purposes.
Figure 35:
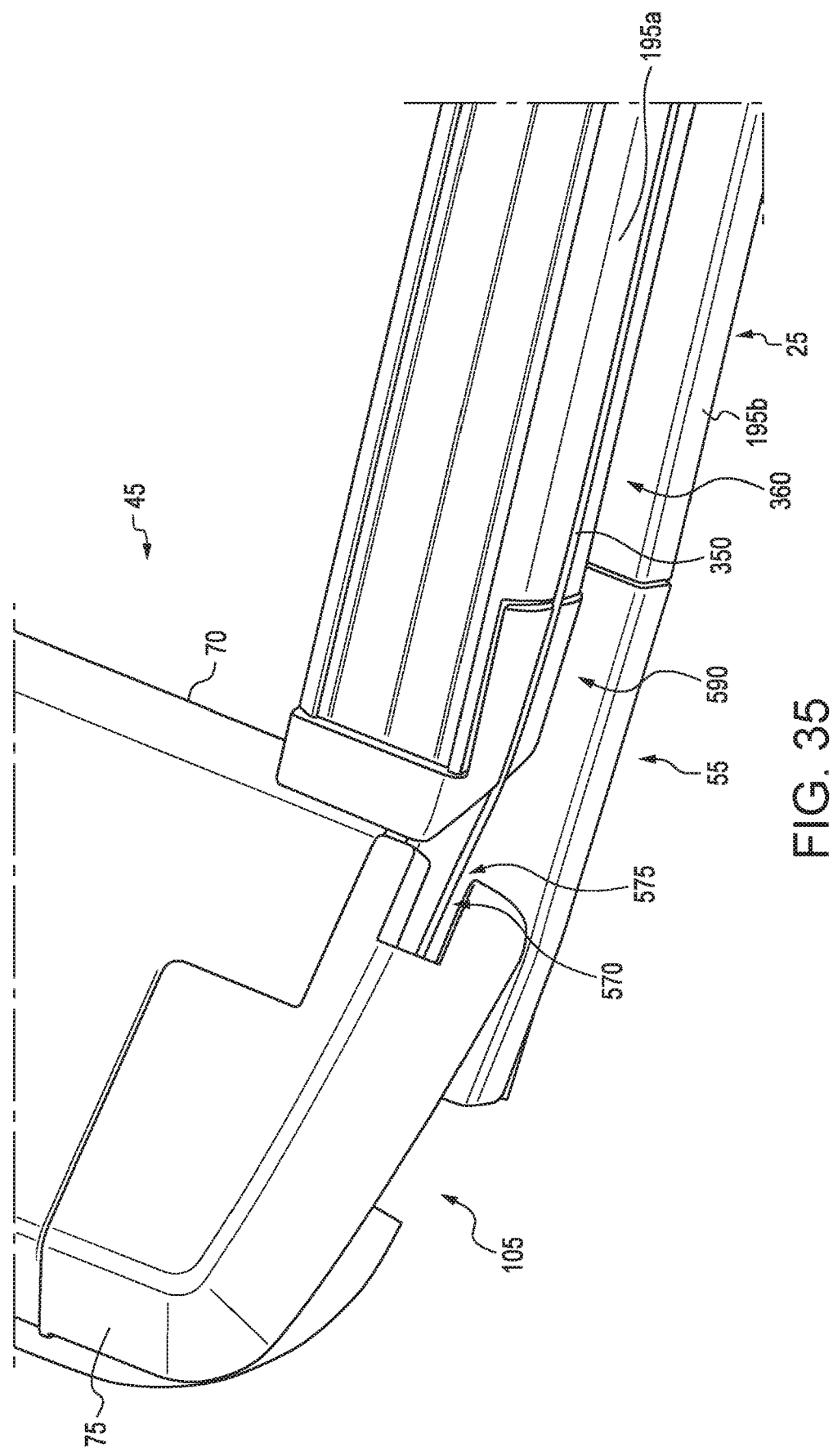
FIG. 35 is a perspective, overhead view of the rear rail of FIG. 34 in the open position.

In a non-limiting example, the cables 350, 355 each includes a rearward end 525, 535 secured to the rear rail 45 in a way that improves the appearance of the flexible tonneau cover assembly 20 and minimizes contact and wear between the cables 350, 355 and the rear rail 45 due to movement of the rear rail 45 between the open position and the closed position. As shown in FIGS. 33, 34 and 35, the rearward end 525 of the first cable 350 and the rearward end 535 of the second cable 355 are secured to the underside 173 of the rear rail 45 with the first cable 350 and the second cable 355 positioned entirely inboard of the first end 105 and a second end 567 of the rear rail 45. The rear rail 45 defines a first cable channel 570 extending rearwardly from a first aperture 575 defined in the forward side 70 of the rear rail 45 and a second cable channel 580 extending rearwardly from a second aperture 585 defined in the forward side 70 of the rear rail 45. The first cable 350 extends through the first cable channel 570 at a first angle with respect to a longitudinal axis of the first cable channel 570 when the rear rail 45 is in the closed position (best shown in FIGS. 19A, 19B, and 33), and the configuration of the first cable channel 570 allows the first cable 350 to extend through the first cable channel 570 at a second angle that is different than the first angle with respect to the longitudinal axis of the first cable channel 570 when the rear rail 45 is in the open position (best shown in FIGS. 21 and 34). Extending the cables 350, 355 through the forward side 70 of the rear rail 45 serves to conceal the cables 350, 355 when the rear rail 45 is in the closed position while the shape of the apertures 575, 585 and the cable channels 570, 580 minimize contact and wear between the rear rail 45 and the cables 350, 355 during movement of the rearward side 75 of the rear rail 45 between the open and the closed positions.

Figure 36:
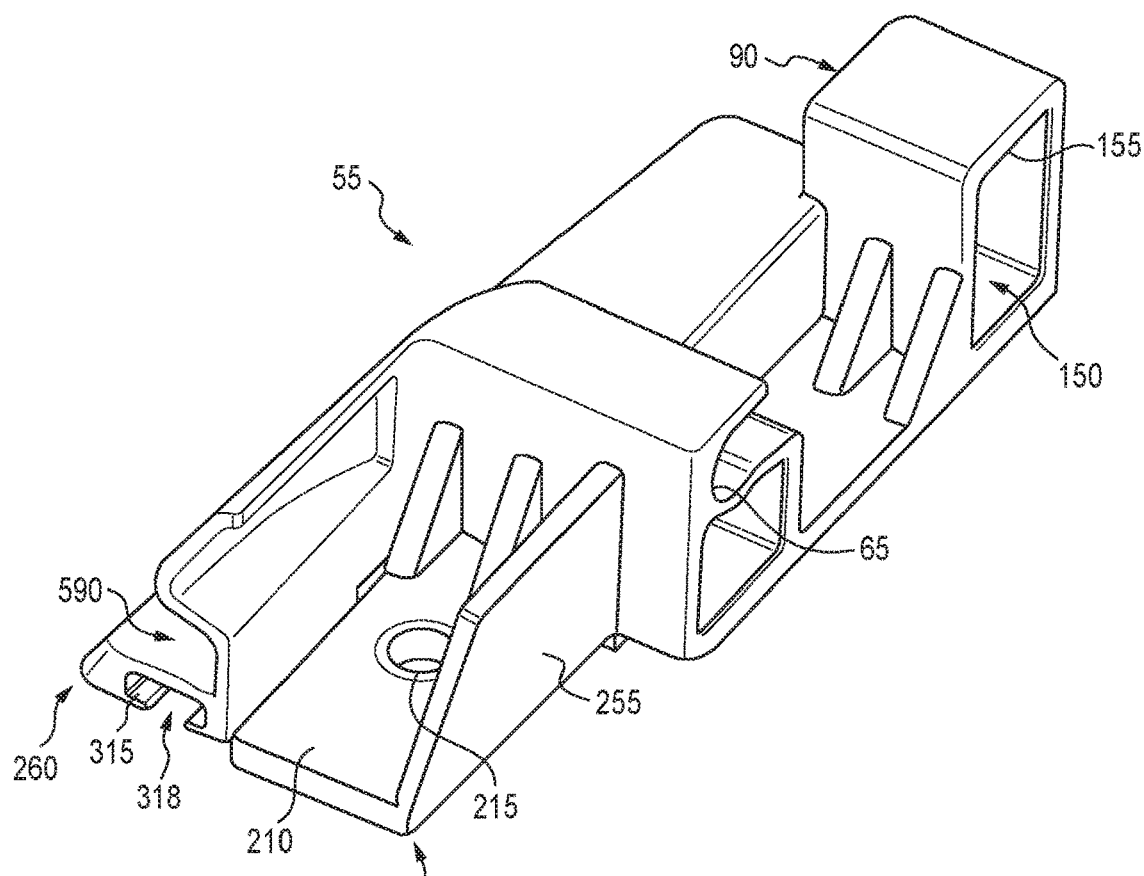
FIG. 36 is a perspective view of the inboard side of the securing member according to one aspect of the present disclosure.
Figure 37:
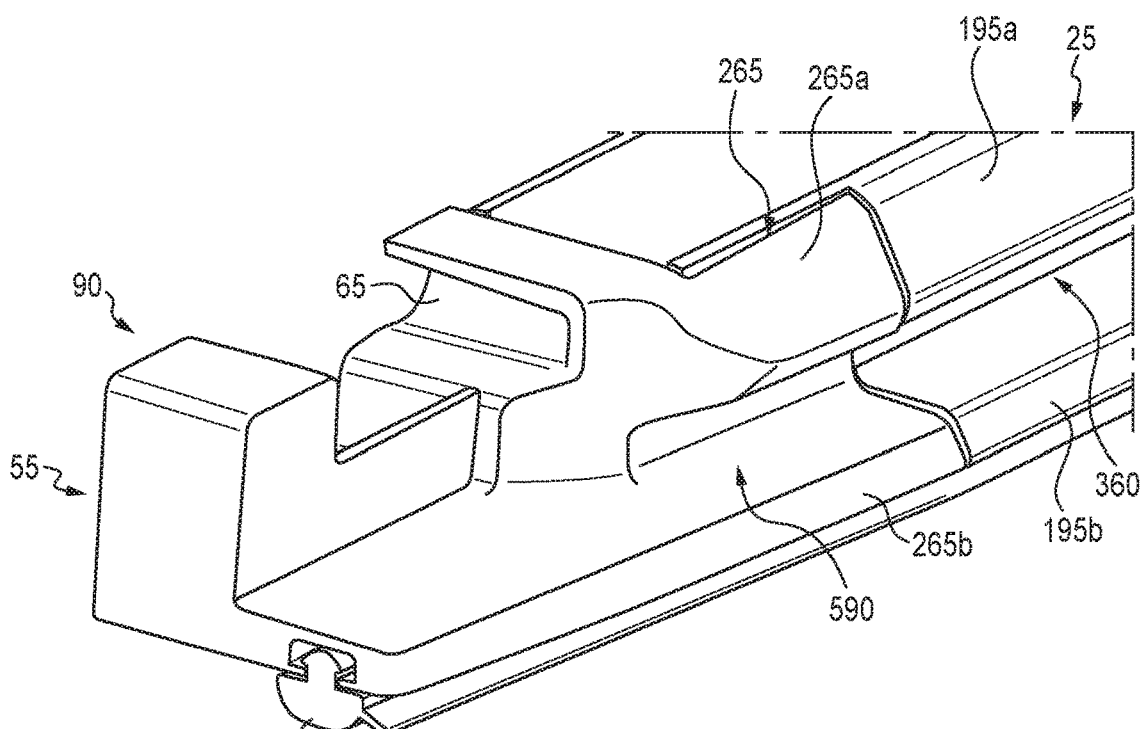
FIG. 37 is a perspective view of the outboard side of the securing member of FIG. 36 secured to a side rail in the fixed position according to one aspect of the present disclosure.
Figure 38:
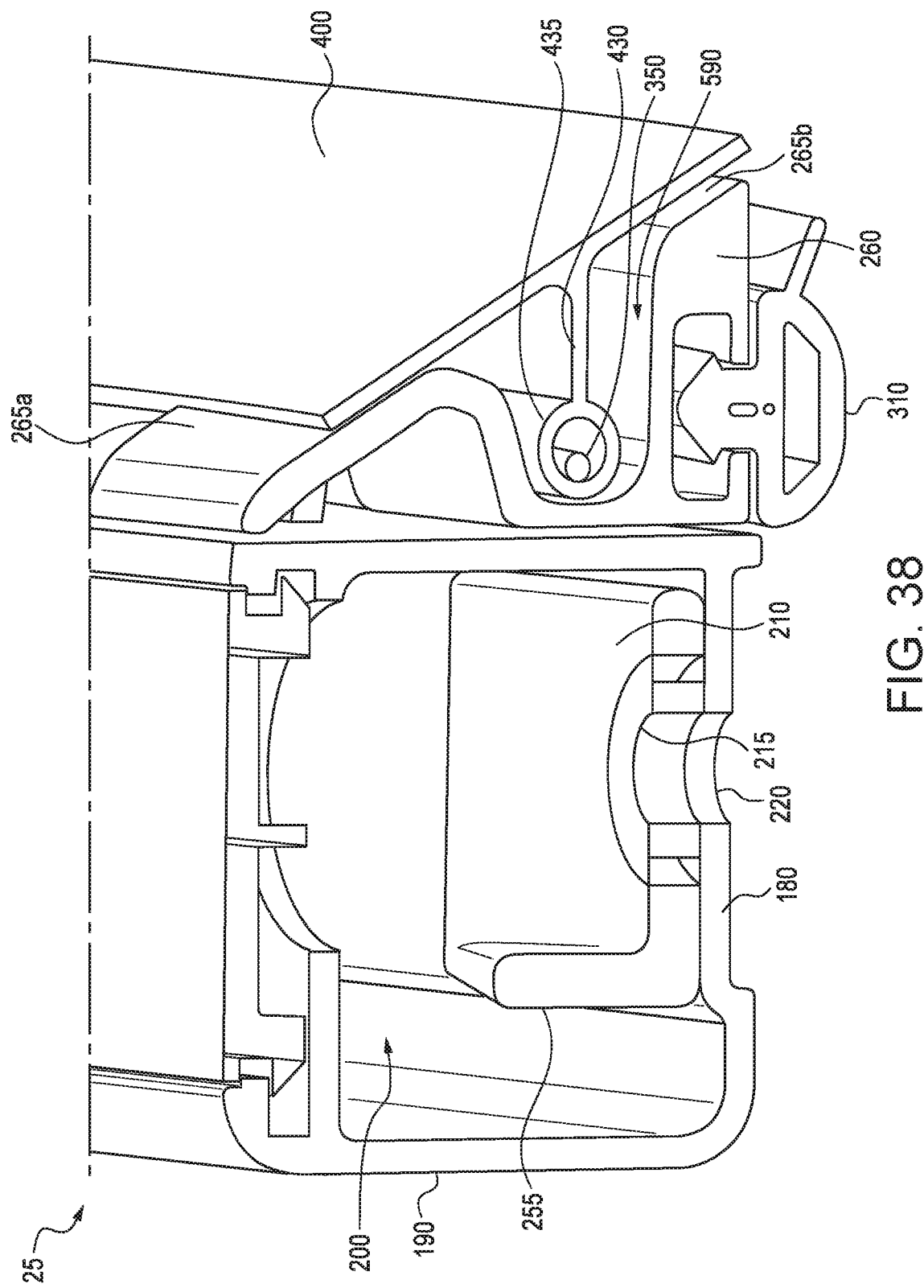
FIG. 38 is a perspective, cross-sectional view of the securing member and the side rail of FIG. 37 taken along a line perpendicular to the longitudinal axis of the side rail and viewed from the rearward end to the forward end of the side rail, wherein a portion of the flexible cover is removed for illustrative purposes.

As shown in FIGS. 36, 37, and 38, the outboard wall 265 of the first securing member 55 may include a cable channel 590 that is aligned with the first continuous channel 360 of the first side rail 25. Similarly, the outboard wall of the second securing member 347 may also include a cable channel 595 that is aligned with the second continuous channel 375 of the second side rail 35 (FIG. 19B). Therefore, the cable channel 590 of the first securing member 55 receives the first cable 350 therein and the cable channel 595 of the second securing member 347 receives the second cable 355 therein when the rear rail 45 is in the closed position as shown in FIGS. 19A and 19B.

In an embodiment, a method of using the flexible tonneau cover assembly 20 including the cables 350, 355 is provided. As shown in FIG. 1, the flexible cover 50 may be rolled about the rear rail 45 and secured adjacent to or on top of the front rail 40 at the forward end 15 of the cargo box 10 in the storage position. The rear rail 45 may be rotated toward the rearward end 13 of the cargo box 10 to unroll the flexible cover 50, and the forward side 70 of the rear rail 45 may be inserted in the channels 65, 348 of the respective securing members 55, 347 to place the rear rail 45 in the open position (as shown in FIGS. 5, 7A, 20A, 21, 34, and 35). Before or after inserting the forward side 70 of the rear rail 45 in the channels 65, 348, the first cable 350 is inserted in the channel 554 of the catch 537 with the head 520 of the first cable 350 positioned forward of the wall 540 of the catch 537. The cover 555 of the catch 537 is closed to retain the head 520 of the first cable 350 therein. The second cable 355 is similarly situated in a catch positioned on the second side rail 35.

When the rear rail 45 is in the open position, the rearward side 75 of the rear rail 45 is raised with respect to the forward side 70 of the rear rail 45, the first cable 350 is untensioned and the first cable 350 and the arm 430 of the first flange 400 are optionally positioned outside of the cable channel 590 of the first securing member 55 and optionally at least partially outside of the first continuous channel 360 of the first side rail 25, and the second cable 355 is untensioned and the second cable 355 and the arm 450 of the second flange 405 are optionally positioned outside of the cable channel 595 of the second securing member 347 and optionally at least partially outside of the second continuous channel 375 of the second side rail 35. For example, a portion of the forward end 495 of the first cable 350 and the arm 430 may be positioned in the first continuous channel 360 adjacent the catch 537 when the rear rail 45 is in the open position. The forward end 500 of the second cable 355 and the arm 450 may be similarly situated. Optionally, the rearward end 525 of the first cable 350 may extend through the first cable channel 570 of the rear rail 45 and the rearward end 535 of the second cable 355 may extend through the second cable channel 580 of the rear rail 45 when the rear rail 45 is in the open position.

As shown in FIGS. 7B and 20B, as the rearward side 75 of the rear rail 45 is lowered or rotated from the open position toward the closed position the head 520, 530 of the cables 350, 355 is pulled into engagement with the forward facing surface 552 of the wall 540 of the respective catch 537 to apply tension to the cables 350, 355 and optionally move the cables 350, 355 and the arms 430, 450 through the respective continuous openings 365, 385 and into the respective continuous channels 360, 375 in the side rails 25, 35 and the respective cable channels 590, 595 in the securing members 55, 347. When the rear rail 45 is in the closed position, the latch 120 is automatically or manually moved to engage with the latch engagement member 90 (FIG. 10B) to retain the rear rail 45 in the closed position, and the cables 350, 355 and the arms 430, 450 are positioned in the respective continuous channels 360, 375 in the side rails 25, 35 and the respective cable channels 590, 595 in the securing members 55, 347 with the cables 350, 355 under tension to secure the sides 53, 54 of the flexible cover 50 to the side rails 25, 35.

The rear rail 45 may be removed from the closed position by pushing or pulling the actuator 170 inboardly to withdraw the latch 120 from the latch engagement member 90 and rotating the rearward side 75 upwardly with respect to the forward side 70 toward the open position (FIGS. 5 and 7A) to reduce the tension in the flexible cover 50 and the cables 350, 355, and to at least partially disengage the sides 53, 54 of the flexible cover 50 from the side rails 25, 35 thereby allowing the forward side 70 of the rear rail 45 to be withdrawn or otherwise disengaged from the channels 65, 348 of the respective securing members 55, 347 and the heads 520, 530 of the cables 350, 355 to be removed from the respective catch 537 when the rear rail 45 is in the open position. Accordingly, the rear rail 45 is disengageable from the first side rail 25 and the second side rail 35 when in the open position and rollable toward the forward end 15 of the cargo box 10 to place the rear rail 45 and the flexible cover 50 wrapped thereabout in the storage position as shown in FIG. 1. It is to be understood that the heads 520, 530 of the cables 350, 355 may be removed from the respective catch 537 before or after removal of the forward side 70 of the rear rail 45 from the channels 65, 348 of the securing members 55, 347.

In a non-limiting example, the first cable 350 and the arm 430 of the first flange 400 are automatically removed from the cable channel 590 of the first securing member 55 and the second cable 355 and the arm 450 of the second flange 405 are automatically removed from the cable channel 595 of the second securing member 347 when the rear rail 45 is moved from the closed position to the open position. In addition, the first cable 350 and the arm 430 of the first flange 400 may be automatically removed from at least a portion of the first continuous channel 360 of the first side rail 25 and the second cable 350 and the arm 450 of the second flange 405 may be automatically removed from at least a portion of the second continuous channel 375 of the second side rail 35 when the rear rail 45 is moved from the closed position to the open position. In a non-limiting example, the first cable 350 and the arm 430 of the first flange 400 are removed from the first continuous channel 360 through the first continuous opening 365 in the outboard wall 195 of the first side rail 25 and the second cable 355 and the arm 450 of the second flange 405 are removed from the second continuous channel 375 through the second continuous opening 385 in the outboard wall 380 of the second side rail 35 when the rear rail 45 is rolled from the open position to the storage position.

In a non-limiting example, the first cable 350 and the arm 430 of the first flange 400 are automatically placed in the cable channel 590 of the first securing member 55 and the first continuous channel 360 of the first side rail 25, and the second cable 355 and the arm 450 of the second flange 405 are automatically placed in the cable channel 595 of the second securing member 347 and the second continuous channel 375 of the second side rail 35 when the rear rail 45 is rotated from the open position to the closed position. In a non-limiting example, as the rear rail 45 is moved from the open position to the closed position, the head 435 of the arm 430 of the first flange 400 and the first cable 350 are moved toward the first continuous channel 360 and the head 455 of the arm 450 of the second flange 405 and the second cable 355 are moved toward the second continuous channel 375. The head 435, 455 may engage the respective edge 440, 460 of the respective outer surface 195a, 380a as the rearward side 75 of the rear rail 45 is lowered as shown in FIG. 20B, and the movement of the rearward side 75 of the rear rail 45 to the closed position may provide the force necessary to overcome the resistance of the edges 440, 460 of the outer surfaces 195a, 380a to move the heads 435, 455 and the respective cables 350, 355 through the respective continuous openings 365, 385 and into the respective continuous channels 360, 375 as shown in FIG. 20C. Alternatively, movement of the rearward side 75 of the rear rail 45 to the closed position may maintain engagement of the heads 435, 455 with the respective edges 440, 460 of the outer surfaces 195a, 380a as shown in FIG. 20B, and a user may then push on the upwardly facing surface 57 along the first side 53 and the second side 54 of the flexible cover 50 to provide the force necessary to overcome the resistance of the edges 440, 460 of the outer surfaces 195a, 380a to move the heads 435, 455 and the cables 350, 355 through the respective continuous openings 365, 385 and into the respective continuous channels 360, 375 as shown in FIG. 20C.

It is to be understood that any of the features described herein for the flexible cover 50 including the other of a hook or loop fastener 280 may be combined with any of the features described herein with respect to the flexible cover 50 including the cables 350, 355. It is also to be understood that any feature included on the first side rail 25 may be included on the second side rail 35, and that any feature included on the first securing member 55 may be included on the second securing member 347. In a non-limiting example, the side rails 25, 35, the front rail 40, and the rear rail 45 may be extruded metal parts. In a non-limiting example, the securing members 55, 347 may be molded parts comprised of a polymeric material. Although described herein as separate components, it is also to be understood that the first securing member 55 may be integrally formed with the first side rail 25, and the second securing member 347 may be integrally formed with the second side rail 35.

While, for purposes of simplicity of explanation, the method has steps described as executing serially, it is to be understood and appreciated that the present disclosure is not limited by the illustrated order, and some steps could occur in different orders and/or concurrently with other steps from that shown and described herein.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A cover assembly for a cargo box of a vehicle, the assembly comprising:
a flexible cover including a forward end positionable at a forward end of the cargo box, a rearward end positionable adjacent a rearward end of the cargo box, a first side extending from the forward end of the flexible cover to the rearward end of the flexible cover, and a second side extending from the forward end of the flexible cover to the rearward end of the flexible cover;
at least a first side rail including a first end and a second end, the first side rail is positionable on or adjacent an upper surface of a side wall of the cargo box with the first end positioned at the forward end of the cargo box and the second end positioned at the rearward end of the cargo box;
a securing member defining a channel and a latch engagement member, the securing member is secured in a fixed position with respect to the first side rail when the assembly is secured to the cargo box, the channel of the securing member is positioned rearward of the second end of the first side rail and the latch engagement member is positioned rearward of the channel when the securing member is in the fixed position;
a rear rail secured to the second end of the flexible cover that is removably positionable in the channel of the securing member, the rear rail includes a rearward side that is rotatable when the rear rail is positioned in the channel of the securing member between a closed position wherein the rearward side of the rear rail is lowered and the flexible cover is under tension, and an open position wherein the rearward side of the rear rail is raised and the flexible cover is untensioned; and
a latch movably secured to the rear rail, the latch is movable to engage the latch engagement member of the securing member when the rear rail is in the closed position to retain the rear rail in the closed position.

2. The cover assembly of claim 1, wherein the latch includes an actuator and the latch and the actuator are positioned forward of a tailgate that is positioned at the rearward end of the cargo box when the rear rail is in the closed position, and wherein the actuator is inaccessible from outside the cargo box when the rear rail is in the closed position and the tailgate is closed.

3. The cover assembly of claim 1, wherein the rear rail defines a first channel and a second channel, the latch is positioned in the first channel of the rear rail, the second channel of the rear rail receives the latch engagement member of the securing member therein when the rear rail is in the closed position, and the latch is biased to extend into the second channel of the rear rail and engage the latch engagement member of the securing member when the rear rail is in the closed position.

4. The cover assembly of claim 3, wherein the securing member includes a base that is positionable on or adjacent the side wall of the cargo box and the latch engagement member extends outward from the base of the securing member, and wherein when the rear rail is in the closed position the latch engagement member is received in the second channel of the rear rail, a portion of the rear rail is positioned between the channel of the securing member and the latch engagement member, and the latch is received in a recess defined in an inboard side of the latch engagement member.

5. The cover assembly of claim 1, wherein the first side rail includes a base that is positionable on the upper surface of the side wall of the cargo box, an upper wall positioned opposite the base of the first side rail, an inboard wall, and an outboard wall, wherein the base, the upper wall, and the inboard wall of the first side rail at least partially define a first chamber inside of the first side rail, and wherein the securing member includes at least a first arm that is inserted inside the first chamber and is secured therein in the fixed position to the first side rail when the assembly is secured to the cargo box.

6. The cover assembly of claim 5, wherein the base of the first side rail at least partially defines a first drainage channel in the first chamber that extends along the inboard wall of the first side rail, wherein the securing member and the base of the first side rail at least partially define a second drainage channel therebetween when the first arm of the securing member is secured in the fixed position to the first side rail, wherein the second drainage channel is positioned outside of the first chamber and rearward of the second end of the first side rail, and wherein the second drainage channel is in fluid communication with the first drainage channel.

7. The cover assembly of claim 5, wherein the first side rail includes an interior wall positioned outboard of the inboard wall of the first side rail and inboard of the outboard wall of the first side rail, wherein a member extends from the interior wall of the first side rail to define a gap between the member of the interior wall and the base of the first side rail, wherein the first arm of the securing member includes a base and a stabilizer extending perpendicularly outward from the base of the first arm, and wherein the base of the first arm is positioned in the gap between the member of the interior wall and the base of the first side rail with the stabilizer positioned along the inboard wall of the first side rail when the first arm of the securing member is secured in the fixed position to the first side rail.

8. The cover assembly of claim 5, wherein the first side rail includes an interior wall positioned outboard of the inboard wall of the first side rail and inboard of the outboard wall of the first side rail, wherein the securing member includes a second arm extending therefrom that is spaced apart from the first arm, wherein when the first arm is secured in the fixed position to the first side rail at least a portion of the interior wall of the first side rail is positioned between the first arm of the securing member and the second arm of the securing member, and an outboard wall of the securing member extends along the second arm of the securing member and abuts the outboard wall of the first side rail to form a continuous outboard wall, and wherein the first side of the flexible cover is positioned on the continuous outboard wall when the rear rail is in the closed position.

9. The cover assembly of claim 8, wherein the securing member defines a bottom channel and the base of the first side rail defines a bottom channel that are aligned when the first arm is secured in the fixed position to the first side rail to form a continuous seal channel that extends along the length of the first side rail and the securing member, wherein the continuous seal channel receives a seal therein that engages the upper surface of the sidewall of the cargo box when the cover assembly is secured to the cargo box, and wherein the bottom channel of the first side rail is positioned outboard of the interior wall of the first side rail and the bottom channel of the securing member extends along the second arm of the securing member.

10. The cover assembly of claim 8, wherein the outboard wall of the first side rail defines a fastener channel therein for slidingly receiving one of a hook or loop fastener therein that is engageable with the other of a hook or loop fastener secured to a downwardly facing surface of the flexible cover along the first side of the flexible cover when the rear rail is in the closed position, wherein the fastener channel includes an opening defined by a rearward end of the outboard wall of the first side rail, and wherein the second arm of the securing member is positioned to block the opening to the fastener channel when the first arm of the securing member is secured in the fixed position to the first side rail.

11. A cover assembly for a cargo box of a vehicle, the assembly comprising:
 a flexible cover including a forward end, a rearward end, a first side, and a second side, the first side of the flexible cover and the second side of the flexible cover each extends from the forward end of the flexible cover to the rearward end of the flexible cover;
 a first cable positioned along the first side of the flexible cover;
 a second cable positioned along the second side of the flexible cover;
 a first side rail positionable on or adjacent an upper surface of a first side wall of the cargo box, the first side rail defines a first continuous channel that includes a length that extends along a longitudinal axis of the first side rail, the first side rail includes an outboard wall that defines a first continuous opening to the first continuous channel;
 a second side rail positionable on or adjacent an upper surface of a second side wall of the cargo box, the second side rail defines a second continuous channel that includes a length that extends along a longitudinal axis of the second side rail, and the second side rail includes an outboard wall that defines a second continuous opening to the second continuous channel;
 a front rail secured to the forward end of the flexible cover, the front rail is securable to the first side rail and the second side rail at a forward end of the cargo box; and
 a rear rail secured to the rearward end of the flexible cover, the rear rail is operatively connected to the first cable and the second cable and is removably engageable with the first side rail and the second side rail, the rear rail includes a rearward side that is rotatable when the rear rail is engaged with the first side rail and the second side rail between a closed position wherein the rearward side of the rear rail is lowered and the first cable is positioned in the first continuous channel under tension to secure the first side of the flexible cover to the first side rail and the second cable is positioned in the second continuous channel under tension to secure the second side of the flexible cover to the second side rail, and an open position wherein the rearward side of the rear rail is raised and the first cable is untensioned and is removable from the first continuous channel via the first continuous opening and the second cable is untensioned and is removable from the second continuous channel via the second continuous opening.

12. The cover assembly of claim 11, wherein the first side of the flexible cover includes a first side edge and the second side of the flexible cover includes a second side edge, the first side edge and the second side edge each extends continuously from the forward end of the flexible cover to the rearward end of the flexible cover, wherein the flexible cover includes a first flange positioned on the downwardly facing surface of the flexible cover adjacent the first side edge and a second flange positioned on the downwardly facing surface of the flexible cover adjacent the second side edge, wherein the flexible cover comprises a first material and the first flange and the second flange each comprises a second material that is more rigid than the first material, wherein the outboard wall of the first side rail includes a first outer surface separated from a second outer surface by the first continuous opening and the outboard wall of the second side rail includes a first outer surface separated from a second outer surface by the second continuous opening, and wherein when the rear rail is in the closed position the first flange of the flexible cover extends over and parallel to the first outer surface and the second outer surface of the outboard wall of the first side rail to cover the first continuous opening and the second flange of the flexible cover extends over and parallel to the first outer surface and the second outer surface of the outboard wall of the second side rail to cover the second continuous opening.

13. The cover assembly of claim 12, wherein the first flange includes at least a first arm extending outwardly therefrom, wherein the first cable extends through the first arm, and wherein the first cable and the first arm are positioned in the first continuous channel when the rear rail is in the closed position.

14. The cover assembly of claim 13, wherein the first arm extends outwardly from the first flange at an acute angle and away from the first side edge of the flexible cover.

15. The cover assembly of claim 13, further comprising a spring clamp that is positioned in the first continuous channel and a clamp member that is removably securable to the spring clamp, wherein the first flange includes a second arm spaced apart from the first arm that extends outwardly from the first flange, wherein the clamp member is positioned along the first flange between the first arm and the second arm and the first cable extends through the first arm, the clamp member, and the second arm, and wherein the first arm, the second arm, and the clamp member are positioned in the first continuous channel and the clamp member is securable to the spring clamp when the rear rail is in the closed position.

16. The cover assembly of claim 13, wherein the first cable includes a forward end terminating at a head and a rearward end secured to the rear rail, wherein a portion of the first cable between the head and the rearward end of the first cable extends through the first arm of the first flange, wherein the head is positioned apart from the front rail and engages the first side rail when the rear rail is in the closed position, and wherein the head is disengaged from the first side rail when the rear rail is in the open position.

17. The cover assembly of claim 16, wherein the first side rail includes a wall positioned at a forward end of the first continuous channel, the wall includes a forward facing surface, a rearward facing surface, and a channel defined in the wall that extends from the forward facing surface to the rearward facing surface, wherein the head of the first cable is pulled rearward into engagement with the forward facing surface of the wall and the first cable extends through the channel of the wall when the rear rail is in the closed position, and wherein the head is disengaged from the forward facing surface when the rear rail is in open position.

18. The cover assembly of claim 11, wherein the rearward side of the rear rail is rotatable from the closed position to the open position and then is disengable from the first side rail and the second side rail and rollable toward the forward end of the cargo box to remove the first cable from the first continuous channel through the first continuous opening in the outboard wall of the first side rail and the second cable from the second continuous channel through the second continuous opening in the outboard wall of the second side rail.

19. The cover assembly of claim 11, wherein rotation of the rearward side of the rear rail from the closed position to the open position at least partially removes the first cable from the first continuous channel through the first continuous opening in the outboard wall of the first side rail and at least partially removes the second cable from the second continuous channel through the second continuous opening in the outboard wall of the second side rail.

20. A cover assembly for a cargo box of a vehicle, the assembly comprising:
   a flexible cover including a forward end, a rearward end, a first side, and a second side, the first side of the flexible cover and the second side of the flexible cover each extends from the forward end of the flexible cover to the rearward end of the flexible cover;
   a first cable positioned along the first side of the flexible cover;
   a second cable positioned along the second side of the flexible cover;
   a first side rail including a first end, a second end, and an outboard wall, the first side rail defines a first continuous channel extending along a longitudinal axis of the first side rail and the outboard wall defines a first continuous opening to the first continuous channel, the first side rail is positionable on or adjacent an upper surface of a first side wall of the cargo box with the first end positioned at a forward end of the cargo box and the second end positioned at a rearward end of the cargo box;
   a second side rail including a first end, a second end, and an outboard wall, the second side rail defines a second continuous channel extending along a longitudinal axis of the second side rail and the outboard wall of the second side rail defines a second continuous opening to the second continuous channel, the second side rail is positionable on or adjacent an upper surface of a second side wall of the cargo box with the first end positioned at the forward end of the cargo box and the second end positioned at the rearward end of the cargo box;
   a first securing member defining a channel and a latch engagement member, the first securing member is secured in a first fixed position with respect to the first side rail when the assembly is secured to the cargo box, the channel of the first securing member is positioned rearward of the second end of the first side rail and the latch engagement member is positioned rearward of the channel of the first securing member when the first securing member is in the first fixed position;
   a second securing member defining a channel, the second securing member is secured in a second fixed position with respect to the second end of the second side rail when the assembly is secured to the cargo box, the channel of the second securing member is positioned rearward of the second end of the second side rail when the second securing member is in the second fixed position;
   a front rail secured to the forward end of the flexible cover, the front rail is securable to the first side rail and the second side rail at the forward end of the cargo box;
   a rear rail secured to the rearward end of the flexible cover, the rear rail is operatively connected to the first cable and the second cable and is removably positionable in the channel of the first securing member and the channel of the second securing member, the rear rail includes a rearward side that is rotatable when the rear rail is positioned in the channel of the first securing member and the channel of the second securing member between a closed position wherein the rearward side of the rear rail is lowered and the first cable is positioned in the first continuous channel under tension to secure the flexible cover to the first side rail and the second cable is positioned in the second continuous channel under tension to secure the flexible cover to the second side rail, and an open position wherein the rearward side of the rear rail is raised and the first cable is untensioned and the second cable is untensioned; and a latch movingly secured to the rear rail, the latch is movable to engage the latch engagement member of the first securing member when the rear rail is in the closed position to retain the rear rail in the closed position.

21. The cover assembly of claim 20, wherein the first cable includes a rearward end secured to the rear rail, and the rear rail defines a cable channel extending rearwardly from a forward side of the rear rail, wherein the first cable extends through the cable channel of the rear rail at a first angle with respect to a longitudinal axis of the cable channel of the rear rail when the rear rail is in the closed position, and the first cable extends through the cable channel of the rear rail at a second angle with respect to the longitudinal axis of the cable channel of the rear rail when the rear rail is in the open position, and wherein the second angle is different than the first angle.

22. The cover assembly of claim 21, wherein the first side rail includes a base that is positionable on the upper surface of the first side wall of the cargo box, and an upper wall positioned opposite the base of the first side rail, wherein the base and the upper wall of the first side rail at least partially define a chamber inside of the first side rail, wherein the first securing member includes a first arm that is inserted inside the chamber of the first side rail and is secured in the fixed position to the base of the first side rail when the assembly is secured to the cargo box, and wherein the securing member defines a cable channel that receives the first cable therein when the rear rail is in the closed position.

23. The cover assembly of claim 22, wherein the rear rail defines a latch channel and a latch engagement member channel, the latch is positioned in the latch channel, the latch engagement member channel receives the latch engagement member of the first securing member therein when the rear rail is in the closed position, and the latch is biased to extend into the latch engagement member channel to engage the latch engagement member when the rear rail is in the closed position.

* * * * *